(12) United States Patent
Merrill et al.

(10) Patent No.: US 11,941,650 B2
(45) Date of Patent: Mar. 26, 2024

(54) EXPLAINABLE MACHINE LEARNING FINANCIAL CREDIT APPROVAL MODEL FOR PROTECTED CLASSES OF BORROWERS

(71) Applicant: ZestFinance, Inc., Los Angeles, CA (US)

(72) Inventors: Douglas C. Merrill, Los Angeles, CA (US); Michael Edward Ruberry, Los Angeles, CA (US); Ozan Sayin, West Hollywood, CA (US); Bojan Tunguz, Greencastle, IN (US); Lin Song, Sugar Land, TX (US); Esfandiar Alizadeh, Venice, CA (US); Melanie Eunique DeBruin, Northridge, CA (US); Yachen Yan, Los Angeles, CA (US); Derek Wilcox, Los Angeles, CA (US); John Candido, Burbank, CA (US); Benjamin Anthony Solecki, Los Angeles, CA (US); Jiahuan He, Los Angeles, CA (US); Jerome Louis Budzik, Altadena, CA (US); Sean Javad Kamkar, Los Angeles, CA (US)

(73) Assignee: ZestFinance, Inc., Burbank, CA (US)

( * ) Notice: Subject to any disclaimer, the term of this patent is extended or adjusted under 35 U.S.C. 154(b) by 708 days.

(21) Appl. No.: 16/052,293

(22) Filed: Aug. 1, 2018

(65) Prior Publication Data

US 2019/0043070 A1    Feb. 7, 2019

Related U.S. Application Data

(60) Provisional application No. 62/682,714, filed on Jun. 8, 2018, provisional application No. 62/666,991, filed
(Continued)

(51) Int. Cl.
G06Q 30/0204 (2023.01)
G06F 9/54 (2006.01)
(Continued)

(52) U.S. Cl.
CPC .......... *G06Q 30/0205* (2013.01); *G06F 9/54* (2013.01); *G06N 5/04* (2013.01); *G06N 20/00* (2019.01); *G06Q 30/0201* (2013.01)

(58) Field of Classification Search
CPC .. G06Q 30/0201; G06Q 40/025; G06Q 40/02; G06N 3/08; G06N 7/005; G06N 20/00; G06N 20/20; G06N 5/003
See application file for complete search history.

(56) References Cited

U.S. PATENT DOCUMENTS 525,413 A    9/1894  Gates
5,745,654 A  4/1998  Titan
(Continued)

FOREIGN PATENT DOCUMENTS

WO    2014014047 A1    1/2014
WO    2014055238 A1    4/2014
(Continued)

OTHER PUBLICATIONS

Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 (Year: 2018).*
(Continued)

*Primary Examiner* — Scott L Jarrett
(74) *Attorney, Agent, or Firm* — TROUTMAN PEPPER HAMILTON SANDERS LLP; Christopher J. Forstner; Nicholas J. Gallo

(57) ABSTRACT

Systems and methods for model evaluation. A protected class model that satisfies an accuracy threshold is built by
(Continued)

using: data sets for use by a modeling system being evaluated, and protected class membership information for each data set. A target for the protected class model is a protected class membership variable indicating membership in a protected class. Each predictor of the protected class model is a predictor of an evaluated model used by the modeling system. A target of the evaluated model is different from the target of the protected class model. Each predictor is a set of one or more variables of the data sets. For each predictor of the protected class model, a protected class model impact ranking value and a modeling system impact ranking value are determined.

16 Claims, 37 Drawing Sheets

Related U.S. Application Data on May 4, 2018, provisional application No. 62/641,176, filed on Mar. 9, 2018, provisional application No. 62/540,419, filed on Aug. 2, 2017.

(51) Int. Cl.
  *G06N 5/04* (2023.01)
  *G06N 20/00* (2019.01)
  *G06Q 30/0201* (2023.01)

(56) References Cited

U.S. PATENT DOCUMENTS

| | | | |
|---|---|---|---|
| 5,999,938 A | 12/1999 | Bliss et al. | |
| 6,034,314 A | 3/2000 | Koike | |
| 6,877,656 B1 | 4/2005 | Jaros et al. | |
| 7,035,811 B2 | 4/2006 | Gorenstein | |
| 7,280,980 B1 | 10/2007 | Hoadley et al. | |
| 7,467,116 B2 | 12/2008 | Wang | |
| 7,499,919 B2 | 3/2009 | Meyerzon et al. | |
| 7,542,993 B2 | 6/2009 | Satterfield et al. | |
| 7,610,257 B1* | 10/2009 | Abrahams | G06Q 20/10 705/38 |
| 7,711,635 B2 | 5/2010 | Steele et al. | |
| 7,765,151 B1 | 7/2010 | Williams et al. | |
| 7,813,945 B2 | 10/2010 | Bonissone et al. | |
| 7,873,535 B2 | 1/2011 | Umblijs et al. | |
| 7,873,570 B2 | 1/2011 | Cagan et al. | |
| 7,921,359 B2 | 4/2011 | Friebel | |
| 7,941,363 B2 | 5/2011 | Tanaka et al. | |
| 7,941,425 B2 | 5/2011 | Sahu et al. | |
| 7,970,676 B2 | 6/2011 | Feinstein | |
| 7,987,177 B2 | 7/2011 | Beyer et al. | |
| 7,996,392 B2 | 8/2011 | Liao et al. | |
| 8,078,524 B2 | 12/2011 | Crawford et al. | |
| 8,086,523 B1 | 12/2011 | Palmer | |
| 8,166,000 B2 | 4/2012 | Labrie et al. | |
| 8,200,511 B2 | 6/2012 | Zizzamia et al. | |
| 8,219,500 B2 | 7/2012 | Galbreath et al. | |
| 8,280,805 B1* | 10/2012 | Abrahams | G06Q 40/025 705/38 |
| 8,335,741 B2 | 12/2012 | Kornegay et al. | |
| 8,442,886 B1 | 5/2013 | Haggerty et al. | |
| 8,452,699 B2 | 5/2013 | Crooks | |
| 8,515,842 B2 | 8/2013 | Papadimitriou | |
| 8,554,756 B2 | 10/2013 | Gemmell et al. | |
| 8,560,436 B2 | 10/2013 | Lau et al. | |
| 8,600,966 B2 | 12/2013 | Kravcik | |
| 8,626,645 B1* | 1/2014 | Lazerson | G06Q 40/02 705/38 |
| 8,645,417 B2 | 2/2014 | Groeneveld et al. | |
| 8,660,943 B1 | 2/2014 | Chirehdast | |
| 8,694,401 B2 | 4/2014 | Stewart | |
| 8,744,946 B2 | 6/2014 | Shelton | |
| 8,799,150 B2 | 8/2014 | Annappindi | |
| 9,047,392 B2 | 6/2015 | Wilkes et al. | |
| 9,268,850 B2 | 2/2016 | El-Charif et al. | |
| 9,405,835 B2 | 8/2016 | Wheeler et al. | |
| 9,501,749 B1* | 11/2016 | Narsky | G06N 7/023 |
| 9,639,805 B1 | 5/2017 | Feller | |
| 9,686,863 B2 | 6/2017 | Chung et al. | |
| 10,121,115 B2 | 11/2018 | Chrapko | |
| 10,581,887 B1* | 3/2020 | Dinerstein | G06N 3/08 |
| 10,684,598 B1 | 6/2020 | Alanqar | |
| 10,719,301 B1 | 7/2020 | Dasgupta | |
| 10,824,959 B1* | 11/2020 | Chatterjee | G06N 3/08 |
| 10,977,558 B2 | 4/2021 | Herbster | |
| 11,296,971 B1 | 4/2022 | Jain | |
| 11,615,331 B2* | 3/2023 | Li | G06N 5/042 706/52 |
| 2002/0038277 A1 | 3/2002 | Yuan | |
| 2002/0091650 A1 | 7/2002 | Ellis | |
| 2002/0138414 A1* | 9/2002 | Baker, IV | G06Q 40/02 705/38 |
| 2002/0178113 A1 | 11/2002 | Clifford et al. | |
| 2003/0009369 A1 | 1/2003 | Gorenstein | |
| 2003/0033242 A1 | 2/2003 | Lynch et al. | |
| 2003/0033587 A1 | 2/2003 | Ferguson | |
| 2003/0046223 A1 | 3/2003 | Crawford et al. | |
| 2003/0101080 A1 | 5/2003 | Zizzamia et al. | |
| 2003/0147558 A1* | 8/2003 | Loui | G06K 9/6226 382/225 |
| 2003/0176931 A1 | 9/2003 | Pednault | |
| 2004/0068509 A1 | 4/2004 | Garden et al. | |
| 2004/0107161 A1 | 6/2004 | Tanaka et al. | |
| 2004/0199456 A1 | 10/2004 | Flint et al. | |
| 2005/0055296 A1 | 3/2005 | Hattersley et al. | |
| 2005/0114279 A1 | 5/2005 | Scarborough et al. | |
| 2005/0234762 A1 | 10/2005 | Pinto | |
| 2005/0278246 A1 | 12/2005 | Friedman et al. | |
| 2006/0047613 A1 | 3/2006 | Labreuche | |
| 2006/0083214 A1 | 4/2006 | Grim, III | |
| 2006/0106570 A1* | 5/2006 | Feldman | G06F 17/18 702/179 |
| 2006/0112039 A1 | 5/2006 | Wang | |
| 2006/0167654 A1 | 7/2006 | Keinan et al. | |
| 2006/0200396 A1 | 9/2006 | Satterfield et al. | |
| 2006/0218067 A1 | 9/2006 | Steele | |
| 2007/0005313 A1 | 1/2007 | Sevastyanov | |
| 2007/0011175 A1 | 1/2007 | Langseth | |
| 2007/0016542 A1 | 1/2007 | Rosauer et al. | |
| 2007/0050286 A1* | 3/2007 | Abrahams | G06Q 40/04 705/38 |
| 2007/0055619 A1* | 3/2007 | Abrahams | G06Q 40/02 705/38 |
| 2007/0067284 A1 | 3/2007 | Meyerzon et al. | |
| 2007/0106550 A1 | 5/2007 | Umblijs et al. | |
| 2007/0112668 A1 | 5/2007 | Celano et al. | |
| 2007/0124236 A1 | 5/2007 | Grichnik et al. | |
| 2007/0288338 A1 | 12/2007 | Hoadley et al. | |
| 2008/0133402 A1 | 6/2008 | Kurian et al. | |
| 2008/0208820 A1 | 8/2008 | Usey et al. | |
| 2008/0222061 A1 | 9/2008 | Soetjahja | |
| 2008/0306893 A1 | 12/2008 | Saidi | |
| 2008/0307006 A1 | 12/2008 | Lee | |
| 2009/0006283 A1 | 1/2009 | Labrie et al. | |
| 2009/0006356 A1 | 1/2009 | Liao et al. | |
| 2009/0015433 A1 | 1/2009 | James | |
| 2009/0024517 A1 | 1/2009 | Crooks | |
| 2009/0030888 A1 | 1/2009 | Sahu et al. | |
| 2009/0037308 A1 | 2/2009 | Feinstein | |
| 2009/0192980 A1 | 7/2009 | Beyer et al. | |
| 2009/0216748 A1 | 8/2009 | Kravcik | |
| 2009/0254572 A1 | 10/2009 | Redlich | |
| 2009/0299911 A1* | 12/2009 | Abrahams | G06Q 40/00 705/36 R |
| 2009/0319521 A1 | 12/2009 | Groeneveld et al. | |
| 2010/0005018 A1 | 1/2010 | Tidwell | |
| 2010/0010878 A1 | 1/2010 | Pinto et al. | |
| 2010/0010935 A1 | 1/2010 | Shelton | |
| 2010/0082476 A1 | 4/2010 | Bowman | |
| 2010/0257459 A1 | 10/2010 | Galbreath et al. | |
| 2010/0325067 A1 | 12/2010 | Cagan et al. | |
| 2011/0071969 A1 | 3/2011 | Doctor et al. | |

(56) References Cited

U.S. PATENT DOCUMENTS

| | | | |
|---|---|---|---|
| 2011/0078073 | A1 | 3/2011 | Annappindi |
| 2011/0112957 | A1 | 5/2011 | Ingram et al. |
| 2011/0161263 | A1 | 6/2011 | Lee |
| 2011/0173116 | A1 | 7/2011 | Yan |
| 2011/0178902 | A1 | 7/2011 | Imrey |
| 2011/0184941 | A1 | 7/2011 | El-Charif et al. |
| 2011/0320423 | A1 | 12/2011 | Gemmell et al. |
| 2012/0053951 | A1 | 3/2012 | Kowalchuk et al. |
| 2012/0059819 | A1 | 3/2012 | Wheeler et al. |
| 2012/0066106 | A1 | 3/2012 | Papadimitriou |
| 2012/0066116 | A1 | 3/2012 | Kornegay et al. |
| 2012/0072029 | A1 | 3/2012 | Persaud et al. |
| 2012/0082476 | A1 | 4/2012 | Ito et al. |
| 2012/0239613 | A1 | 9/2012 | Danciu |
| 2013/0091050 | A1 | 4/2013 | Merrill |
| 2013/0103569 | A1 | 4/2013 | Gopinathan |
| 2013/0138553 | A1 | 5/2013 | Nikankin et al. |
| 2013/0185189 | A1 | 7/2013 | Stewart |
| 2014/0012794 | A1* | 1/2014 | Dillon ............... G06N 5/04 706/46 |
| 2014/0014047 | A1 | 1/2014 | Garcia et al. |
| 2014/0025872 | A1 | 1/2014 | Flynn |
| 2014/0052604 | A9 | 2/2014 | Stewart |
| 2014/0081832 | A1 | 3/2014 | Merrill et al. |
| 2014/0108665 | A1 | 4/2014 | Arora |
| 2014/0122355 | A1 | 5/2014 | Hardtke et al. |
| 2014/0149177 | A1 | 5/2014 | Frank et al. |
| 2014/0172886 | A1 | 6/2014 | Wilkes et al. |
| 2014/0180790 | A1 | 6/2014 | Boal |
| 2014/0181267 | A1 | 6/2014 | Wadkins |
| 2014/0310661 | A1 | 10/2014 | Frederickson |
| 2014/0310681 | A1 | 10/2014 | Poozhiyil |
| 2015/0019912 | A1 | 1/2015 | Darling et al. |
| 2015/0056229 | A1 | 2/2015 | Nandy et al. |
| 2015/0081602 | A1 | 3/2015 | Talley et al. |
| 2015/0161098 | A1 | 6/2015 | Granshaw |
| 2015/0213361 | A1* | 7/2015 | Gamon ............... G06N 20/00 706/12 |
| 2015/0317337 | A1 | 11/2015 | Edgar |
| 2015/0347485 | A1 | 12/2015 | Cai |
| 2015/0379428 | A1 | 12/2015 | Dirac et al. |
| 2016/0042292 | A1 | 2/2016 | Caplan |
| 2016/0088723 | A1 | 3/2016 | Chung et al. |
| 2016/0110353 | A1 | 4/2016 | Merrill et al. |
| 2016/0132787 | A1 | 5/2016 | Drevo et al. |
| 2016/0300252 | A1 | 10/2016 | Frank |
| 2016/0371238 | A1 | 12/2016 | Heavenrich |
| 2017/0061326 | A1 | 3/2017 | Talathi et al. |
| 2017/0109657 | A1 | 4/2017 | Marcu |
| 2017/0124464 | A1 | 5/2017 | Crabtree et al. |
| 2017/0140518 | A1* | 5/2017 | Liang ............... G06T 7/0002 |
| 2017/0220633 | A1 | 8/2017 | Porath |
| 2017/0222960 | A1 | 8/2017 | Agarwal et al. |
| 2017/0316311 | A1 | 11/2017 | Pilly |
| 2017/0330058 | A1 | 11/2017 | Silberman et al. |
| 2018/0018578 | A1 | 1/2018 | Yoshizumi |
| 2018/0025273 | A1* | 1/2018 | Jordan ............... G06Q 40/025 706/21 |
| 2018/0060738 | A1 | 3/2018 | Achin |
| 2018/0068219 | A1* | 3/2018 | Turner ............... G06Q 40/08 |
| 2018/0268262 | A1 | 9/2018 | Osada |
| 2018/0293712 | A1 | 10/2018 | Vogels |
| 2018/0322406 | A1 | 11/2018 | Merrill et al. |
| 2018/0349986 | A1* | 12/2018 | Fidanza ............... G06N 20/00 |
| 2019/0042887 | A1 | 2/2019 | Nguyen |
| 2019/0043070 | A1 | 2/2019 | Merrill et al. |
| 2019/0114704 | A1* | 4/2019 | Way ............... G06N 5/045 |
| 2019/0228006 | A1 | 7/2019 | Tormasov |
| 2019/0244122 | A1* | 8/2019 | Li ............... G06N 5/042 |
| 2019/0279111 | A1* | 9/2019 | Merrill ............... B60Q 9/00 |
| 2019/0287025 | A1 | 9/2019 | Perez |
| 2019/0303404 | A1* | 10/2019 | Amer ............... G06N 3/084 |
| 2019/0311298 | A1 | 10/2019 | Kopp |
| 2019/0318202 | A1 | 10/2019 | Zhao |
| 2019/0318421 | A1* | 10/2019 | Lyonnet ............... G06N 20/20 |
| 2019/0325514 | A1 | 10/2019 | Hong |
| 2019/0340518 | A1 | 11/2019 | Merrill |
| 2019/0340684 | A1 | 11/2019 | Belanger |
| 2019/0354806 | A1 | 11/2019 | Chhabra |
| 2019/0354853 | A1* | 11/2019 | Zoldi ............... G06N 3/08 |
| 2019/0370697 | A1* | 12/2019 | Ramachandra Iyer .. G06N 5/02 |
| 2019/0378210 | A1 | 12/2019 | Merrill |
| 2020/0005136 | A1 | 1/2020 | Spryn |
| 2020/0012917 | A1 | 1/2020 | Pham |
| 2020/0082299 | A1 | 3/2020 | Vasconcelos |
| 2020/0160177 | A1 | 5/2020 | Durand |
| 2020/0175586 | A1 | 6/2020 | McKenna |
| 2020/0183047 | A1 | 6/2020 | Denli |
| 2020/0231466 | A1 | 7/2020 | Lu |
| 2020/0242492 | A1 | 7/2020 | Goel |
| 2020/0257927 | A1 | 8/2020 | Nomi |
| 2020/0257961 | A1 | 8/2020 | Hua |
| 2021/0019603 | A1 | 1/2021 | Friedman |
| 2021/0133631 | A1 | 5/2021 | Prendki |
| 2021/0209688 | A1 | 7/2021 | Krishnamurthy |
| 2021/0224605 | A1 | 7/2021 | Zhang |
| 2021/0256392 | A1 | 8/2021 | Zhengzhang |
| 2021/0281491 | A1 | 9/2021 | Yelahanka Raghuprasad |
| 2021/0406815 | A1 | 12/2021 | Mimassi |
| 2022/0019741 | A1 | 1/2022 | Roy |
| 2022/0122171 | A1 | 4/2022 | Hubard |
| 2022/0188519 | A1 | 6/2022 | Briody |
| 2022/0188568 | A1 | 6/2022 | Singh |
| 2022/0191332 | A1 | 6/2022 | Ahmadi |

FOREIGN PATENT DOCUMENTS

| | | | |
|---|---|---|---|
| WO | 2014121019 | A1 | 8/2014 |
| WO | 2014184381 | A2 | 11/2014 |
| WO | 2015056229 | A1 | 4/2015 |
| WO | 2015081160 | A1 | 6/2015 |
| WO | 2019028179 | A1 | 2/2019 |

OTHER PUBLICATIONS

Chen, Jiahao, Fair lending needs explainable models for responsible recommendation Proceedings of the Second Workshop on Responsible Recommendation, 2018 (Year: 2018).*

Ribeiro, Marco Tulio et al., Why Should I Trust You?—Explaining Predictions of Any Classifier ACM, 2016 (Year: 2016).*

Gates, Susan Wharton et al., 4/3 Automated Underwriting: Friend or Foe to Low-Mod Households and Neighborhoods? Building Assets, Building Credit, Symposium, Nov. 2003 (Year: 2003).*

Wattenber, Martin et al., Attacking discrimination with smarter machine learning Google Research, 2016 (Year: 2016).*

Data Bias and Algorithmic Discrimination University of Montreal, 2017 (Year: 2017).*

"International Search Report and Written Opinion of the ISA, dated Sep. 16, 2019, for application No. PCT/US19/029148."

Abadi, Martin , et al., "TensorFlow: Large-Scale Machine Learning on Heterogeneous Distributed Systems", Preliminary White Paper, Nov. 9, 2015.

Chen, Tianqi, et al., "XGBoost: A Scalable Tree Boosting System", KDD '16, Aug. 13-17, 2016, San Francisco, CA, USA.

Cortes, Corinna , et al., "Support-Vector Networks", AT&T Labs-Research, USA, Journal Machine Learning, vol. 20, Issue 3, Sep. 1995.

Friedman, Jerome H., "Greedy Function Approximation: A Gradient Boosting Machine", IMS 1999 Reitz Lecture, Feb. 24, 1999.

Garcia-Pedradas, Nicolas , et al., "Nonlinear Boosting Projections for Ensemble Contruction", Journal of Machine Learning Research 8 (2007) 1-33.

Geurts, Pierre , et al., "Extremely randomized trees", Springer Science + Business Media, Inc., rec'd Jun. 14, 2005, pub. online Mar. 2, 2006.

Louppe, Gilles , et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.

(56) References Cited

OTHER PUBLICATIONS

Merrill, John W. L., et al., "Generalized Integrated Gradients: A practical method for explaining diverse ensembles". Journal of Machine Learning Research Under Review (2019).
Merrill, Douglas C, et al., "Systems and Methods for Decomposition of Non-Differentiable and Differentiable Models", U.S. Appl. No. 16/434,731, filed Jun. 7, 2019.
Merrill, Douglas C, et al., "Systems and Methods for Enriching Modeling Tools and Infrastructure with Semantics", U.S. Appl. No. 16/394,651, filed Apr. 25, 2019.
Rumelhart, David E., et al., "Learning representations by back-propagating errors", Nature vol. 323, Oct. 9, 1986.
Shapley, L. S., "A Value For n-Person Games", p. 295, The Rand Corporation, Mar. 18, 1952.
Fonk, Stun, "Towards fairness in ML with adversarial networks", https://blog.godatadriven.com/fairness-in-ml, Apr. 27, 2019.
Wolpert, David H., "Stacked Generalization", Original contribution: Stacked generalization. Neural Netw., 5(2):241 {259, Feb. 1992.
"International Search Report and Written Opinion of the ISA, dated Aug. 23, 2019, for application No. PCT/US19/036049."
Strumbelj, Eric, et al., "An Efficient Explanation of Individual Classifications using Game Theory", Journal of Machine Learning Research 11 (2010) 1-18.
"International Search Report and Written Opinion of the ISA, dated Jul. 5, 2019, for application No. PCT/US19/021381."
Breiman, Leo, et al., "Random Forests", Machine Learning, 45, 5-32, 2001.
Kamkar, Sean Javad, "Mesh Adaption Strategies for Vortex-Dominated Flows", Standard University, Feb. 2011.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.
Modarres, Ceena, et al., "Towards Explainable Deep Learning for Credit Lending: A Case Study", arXiv:1811.06471v2 [cs.LG], Nov. 30, 2018.
Richardson, L. F., "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.
Richardson, L. F., "The deferred approach to the limit", Philosophical Transactions of the Royal Society A. 226 (636-646): 299-349. doi:10.1098/rsta.1927.0008, Oct. 14, 1926.
International Search Report and Written Opinion for International Application No. PCT/US2018/030966, dated Jul. 20, 2018.
Gehrlein, William et al., A two-stage least cost credit scoring model, 1997, Annals of Operations Research, pp. 159-171.
International Search Report and the Written Opinion of the International Searching Authority, Application No. PCT/US18/44874, dated Oct. 10, 2018.
Saabas, Ando, "Diving into data, A blog on machine learning, data mining and visualization, Interpreting random forests", http://blog.datadive.net/interpreting-random-forests/ (spec), Oct. 19, 2014.
Saabas, Ando, "Diving into data, A blog on machine learning, data mining and visualization, Random forest interpretation— conditional feature contributions", http://blog.datadive.net/random-forest-interpretation-conditional-feature-contributions/ (spec), Oct. 26, 2016.
Saabas, Ando, "Diving into data, A blog on machine learning, data mining and visualization, Random forest interpretation with scikit-learn", http://blog.datadive.net/random-forest-interpretation-with-scikit-learn/ (spec), Aug. 12, 2015.
Sundararajan, Mukund, et al., "Axiomatic Attribution for Deep Networks", Proceeding of the 34th International Conference on Machine Learning, Sydney, Australia, PMLR 70, Jun. 13, 2017.

Bit Array, Wikipedia Search, May 5, 2021 at https://en.wikipedia.org/wiki/Bit_array.
Genetic algorithm, Wikipedia Search, May 5, 2021 at https://en.wikipedia.org/wiki/Gentic_algorithm.
International Search Report and the Written Opinion, Application No. PCT/US14/014047, dated May 5, 2014.
"Feature Selection" from Wikipedia and obtained in the Wayback machine at URL "https://en.wikipedia.org/wiki/Feature_selection" for Feb. 25, 2021.
"On the Convergence of Generalized Hill Climbing Algorithms" by A.W. Johnson et al. copyright 2002, Elsevier Science B.V., Discrete Applied Mathematics (Year: 2002).
"Feature Selection", Wikipedia and obtained in the Wayback machine at URL http://en.wikipedia.org/wiki/Feature_selection, Sep. 1, 2011.
Bittencourt, H.R. et al., "Feature Selection by Using Classification and Regression Trees (CART)", dated Aug. 23, 2004.
Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129.
Demaine, Erik D., et al., "Correlation clustering in general weighted graphs", Theorectical Computer Science 361 2006)172-187.
European Extended Search Report issued in EP19764112.9, dated Jun. 27, 2022, 11 pages.
European Extended Search Report issued in EP19764112.9, dated Mar. 24, 2022, 14 pages.
International Preliminary Report on Patentability dated Aug. 4, 2015 in corresponding PCT Application No. PCT/US2014/014047.
International Preliminary Report on Patentability issued in PCT/US2013/060208, dated Mar. 24, 2015, 8 pages.
International Search Report and Written Opinion for application No. PCT/US20/062235, dated Mar. 10, 2021.
International Search Report and Written Opinion for application No. PCT/US20/062271 dated Feb. 26, 2021.
International Search Report and Written Opinion issued in PCT/US2020/062235, dated Mar. 10, 2021, 8 pages.
International Search Report and Written Opinion issued in PCT/US2020/062271, dated Feb. 26, 2021, 8 pages.
International Search Report and Written Opinion of the ISA for application No. PCT/20/23370 dated Jun. 18, 2020.
International Search Report dated May 5, 2014 in corresponding PCT Application No. PCT/US2014/014047.
International Search Report issued in PCT/US2013/060208, dated Jan. 7, 2014, 2 pages.
Vanov, Alexei, et al., "Kolmogorov-Smirnov test for feature selection in emotion recognition from speech", IEEE International Conference on acoustics, speech and signal processing (ICASSP), 2012, pp. 5125-5128.
Johnson, Kristen, et al., "Artificial Intelligence, Machine Learning, and Bias in Finance: Toward Responsible Innovation", Fordham Law Review, vol. **, Issue 2, Article 5,2019, pp. 499-529.
Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110 (Year: 2019).
Lippert, John, "ZestFinance Issues small, high-rate loans, uses big data to weed out deadbeats", The Washington Post, Oct. 12, 2014.
Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780.
Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192.
Nesiba, Reynold F., "The Color of Credit: Mortgage Discrimination, Research Methodology, and Fair-Lending Enforcement", Journal of Economic Issues, 37 (3), 813-815, 2003.
Office Action (Final Rejection) dated Dec. 7, 2021 for U.S. Appl. No. 16/109,545 (pp. 1-17).
Office Action (Non-Final Rejection) dated Mar. 2, 2022 for U.S. Appl. No. 16/434,731 (pp. 1-6).

(56) References Cited

OTHER PUBLICATIONS

Office Action (Non-Final Rejection) dated May 24, 2022 for U.S. Appl. No. 16/688,789 (pp. 1-17).
Office Action (Non-Final Rejection) dated Jun. 24, 2022 for U.S. Appl. No. 17/385,452 (pp. 1-14).
Office Action (Non-Final Rejection) dated Dec. 16, 2021 for U.S. Appl. No. 15/977,105 (pp. 1-19).
Office Action (Notice of Allowance and Fees Due (PTOL-85)) dated Nov. 19, 2021 for U.S. Appl. No. 16/292,844 (pp. 1-8).
Strobl, Carolin, et al., "Conditional Variable Importance for Random Forests", BMC Bioinformatics 2008, 9:307, published Jul. 11, 2008.
Tuv, Eugene, et al., "Feature Selection with Ensembles, Artificial Variables, and Redundancy Elimination", Journal of Machine Learning Research, pp. 1341-1366, Jul. 2009.
Ward, et al., "An exploration of the influence of path choice in game-theoretic attribuution algorithms," Journal of Machine Learning Research Under Review (2020), 21 pages.
Wikipedia entry on "Autoencoder". https://en.wikipedia.org/wiki/Autoencoder Downloaded Jun. 15, 2022 (Year: 2022).
ZestFinance releases new software tool to reduce bias in AI-powered credit scoring models: New fairness filter can put 170,000 more minority families into homes. (Mar. 19, 2019). PR Newswire Retrieved from https://dialog.proquest.com/professional/docview/2193594346?accountid=131444 (Year: 2019).
Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.
Zhao, Zheng, et al., "On Similarity Preserving Feature Selection", IEEE Transactions on Knowledge and Data Engineering 25,2011, pp. 619-632.
Sean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.
Office Action (Final Rejection) dated Aug. 16, 2022 for U.S. Appl. No. 15/977,105 (pp. 1-17).
Office Action (Non-Final Rejection) dated Aug. 26, 2022 for U.S. Appl. No. 16/394,651 (pp. 1-8).
Office Action (Non-Final Rejection) dated Sep. 15, 2022 for U.S. Appl. No. 17/535,511 (pp. 1-11).
Office Action (Non-Final Rejection) dated Sep. 22, 2022 for U.S. Appl. No. 17/223,698 (pp. 1-8).
Zhao, Q., Li, Q. and Wen, J., 2018. Construction and application research of knowledge graph in aviation risk field. In MATEC Web of Conferences (vol. 151, p. 05003). EDP Sciences.
Dong Yue et al, "Threaded ensembles of autoencoders for stream learning : Neural Networks for Stream Learning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).
European Extended Search Report issued in EP19796824.1, dated Jun. 13, 2022, 9 pages.
International Preliminary Report on Patentability in International Appln. No. PCT/US2019/029148, dated Nov. 19, 2020, 6 pages.
Li, Hongxiang, et al. "A novel method for credit scoring based on feature transformation and ensemble model." PeerJ Computer Science 7 (2021): e579. 19 pages.
Office Action (Final Rejection) dated Dec. 7, 2022 for U.S. Appl. No. 16/688,789 (pp. 1-24).
Office Action (Non-Final Rejection) dated Oct. 28, 2022 for U.S. Appl. No. 17/389,789 (pp. 1-19).
Office Action (Non-Final Rejection) dated Dec. 8, 2022 for U.S. Appl. No. 17/147,025 (pp. 1-20).
Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

\* cited by examiner

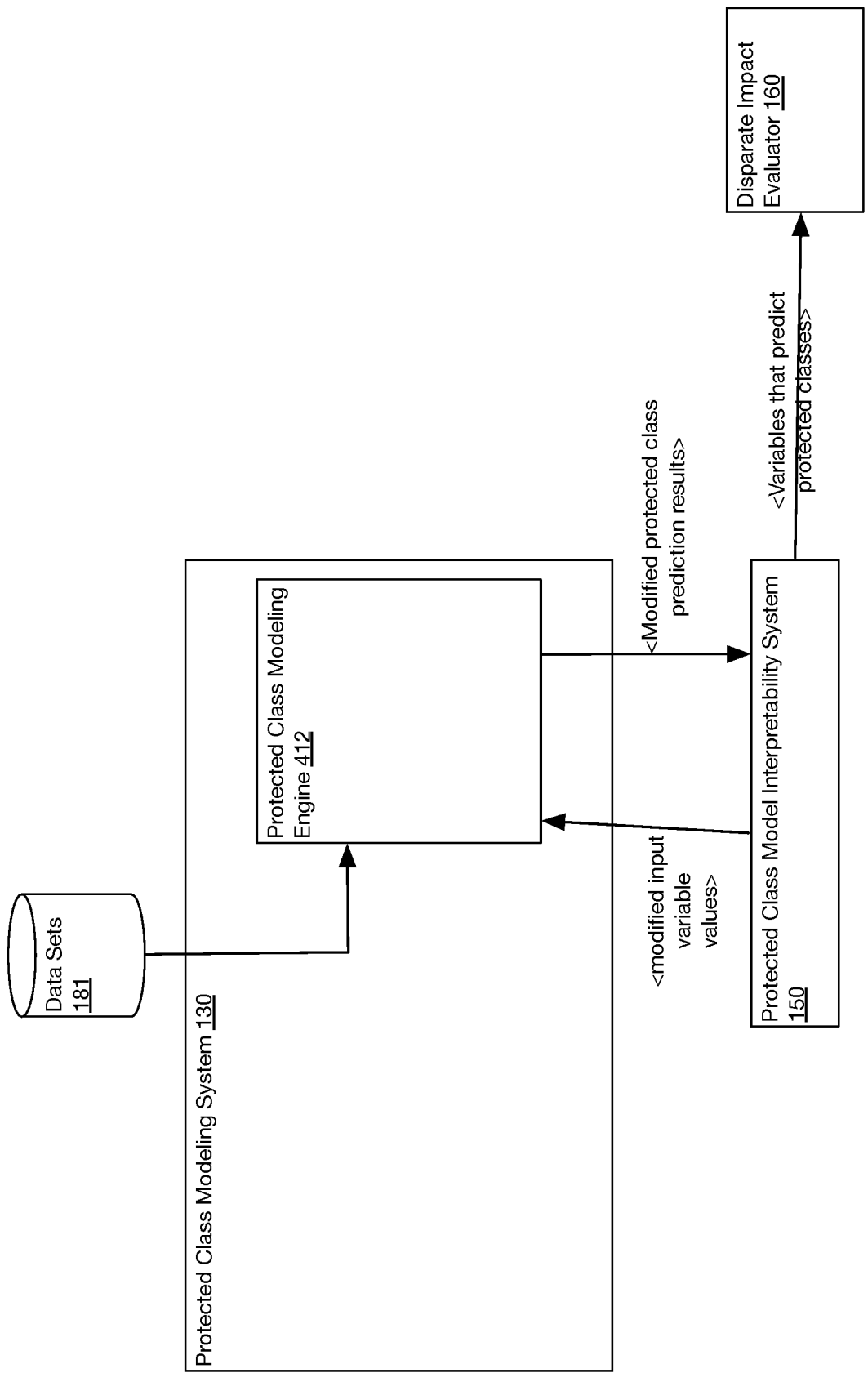

| Impactful Variables for Protected Class Prediction | Rank of Impact on Protected Class Prediction for Data Set 1 |
|---|---|
| Variable A | 1 |
| Variable B | 2 |
| Variable C | 3 |
| Variable D | 4 |
| Variable P | 5 |

| Impactful Variables for Protected Class Prediction | Rank of Impact on Protected Class Prediction for Data Set 2 |
|---|---|
| Variable A | 1 |
| Variable D | 2 |
| Variable E | 3 |
| Variable L | 4 |

. . .

| Impactful Variables for Protected Class Prediction | Rank of Impact on Protected Class Prediction for Data Set 1000 |
|---|---|
| Variable D | 1 |
| Variable X | 2 |
| Variable Y | 3 |
| Variable X | 4 |

FIGURE 9A

| Impactful Variables for Protected Class Prediction | Rank of Impact on Protected Class Prediction across all Datasets 1-1000 |
|---|---|
| Variable D | 1 |
| Variable A | 2 |
| Variable B | 3 |
| Variable C | 3 |
| Variable E | 3 |
| Variable L | 3 |
| Variable X | 3 |
| Variable Y | 3 |
| Variable Z | 3 |

FIGURE 9B

| Impactful Variables for Modeling System Score | Rank of Impact on Modeling System Score for Data Set 1 |
|---|---|
| Variable Q | 1 |
| Variable R | 2 |
| Variable S | 3 |
| Variable T | 4 |
| Variable U | 5 |

| Impactful Variables for Modeling System Score | Rank of Impact on Modeling System Score for Data Set 2 |
|---|---|
| Variable Q | 1 |
| Variable J | 2 |
| Variable K | 3 |
| Variable A | 4 |

...

| Impactful Variables for Modeling System Score | Rank of Impact on Modeling System Score for Data Set 1000 |
|---|---|
| Variable Q | 1 |
| Variable F | 2 |
| Variable H | 3 |
| Variable A | 4 |

FIGURE 9C

| Impactful Variables for Modeling System Score | Rank of Impact on Modeling System Score across all Datasets 1-1000 |
|---|---|
| Variable Q | 1 |
| Variable A | 2 |
| Variable F | 3 |
| Variable H | 3 |
| Variable J | 3 |
| Variable K | 3 |
| Variable R | 3 |
| Variable S | 3 |
| Variable T | 3 |
| Variable U | 3 |

FIGURE 9D

| Impactful Variables for Protected Class Prediction | Rank of Impact on Protected Class Predition across all Datasets 1-1000 | Rank of Impact on Modeling System Score across all Datasets 1-1000 |
|---|---|---|
| Variable D | 1 | 121 |
| Variable A | 2 | 2 |
| Variable B | 3 | 345 |
| Variable C | 3 | 235 |
| Variable E | 3 | 736 |
| Variable L | 3 | 663 |
| Variable X | 3 | 347 |
| Variable Y | 3 | 105 |
| Variable Z | 3 | 984 |

FIGURE 9E

EXPLAINABLE MACHINE LEARNING FINANCIAL CREDIT APPROVAL MODEL FOR PROTECTED CLASSES OF BORROWERS

CROSS-REFERENCE TO RELATED APPLICATIONS

This application claims the benefit of U.S. Provisional Application Ser. No. 62/540,419, filed on 2 Aug. 2017, U.S. Provisional Application Ser. No. 62/641,176, filed on 9 Mar. 2018, U.S. Provisional Application Ser. No. 62/666,991, filed on 4 May 2018, and U.S. Provisional Application Ser. No. 62/682,714, filed on 8 Jun. 2018, which are incorporated in their entirety by this reference.

TECHNICAL FIELD

This disclosure relates generally to the machine learning field, and more specifically to new and useful systems and methods for providing disparate impact information for a machine learning model.

BACKGROUND

Disparate impact under some laws and regulations refers to practices in employment, housing, insurance, and other areas that adversely affect one group of people of a protected characteristic more than another, even though rules applied by government entities, businesses, employers or landlords, for example, are formally neutral. Some protected classes include classes based on race, color, religion, national origin, sex, age, and disability status as protected characteristics.

A violation of a law or regulation may be proven by showing that an employment practice or policy has a disproportionately adverse effect on members of the protected class as compared with non-members of the protected class. Therefore, the disparate impact theory prohibits employers from using a facially neutral employment practice that has an unjustified adverse impact on members of a protected class. A facially neutral employment practice is one that does not appear to be discriminatory on its face, but is discriminatory in its application or effect. Where a disparate impact is shown, a plaintiff can prevail in a lawsuit without the necessity of showing intentional discrimination unless the defendant entity demonstrates that the practice or policy in question has a demonstrable relationship to business requirements. This is the "business necessity" defense.

It is useful for an entity (e.g., government, business) that uses machine learning systems to make decisions to understand whether decisions generated by such machine learning systems have a disproportionately adverse effect on members of a protected class as compared with non-members of a protected class.

However, as complexity of machine learning systems increases, it becomes increasingly difficult to determine whether outcomes generated by machine learning systems disparately impact a protected class. While computer scientists understand the specific algorithms used in machine learning modelling, the field has generally been unable to provide useful explanations of how a particular model generated by anything but the simplest of algorithms works. This has limited their adoption by businesses seeking to solve high stakes problems which require transparency into a model's inner workings. Without transparency into how a machine learning model works, business stakeholders might lack confidence in a model's ability to consistently meet business, legal and regulatory requirements. Business owners might not be able to determine whether decisions informed by results of a machine learning model will disparately impact a protected class. This limitation is present in the most basic machine learning techniques such as neural networks, and it extends to many more advanced and complex methods such as, without limitation, multilayer perceptrons, and recurrent neural networks. This limitation of machine learning model transparency extends to ensembled models, including, without limitation, stacked and blended models, which combine the power of many modeling methods such as, regression models including logistic regression, tree models including classification and regression trees (CART), gradient boosted trees, ridge regression, factorization machines, including field-aware factorization machines, support vector machines, follow the regularized leader (FTRL), greedy step averaging (GSA), time-decaying adaptive prediction (TDAP), neural networks, multilayer perceptrons, recurrent nets, deep networks, and other methods, without limitation, which are combined to achieve more predictive power. There is a need in the machine learning field for new and useful systems for determining whether a machine learning model is likely to generate results that disparately impact a protected class. The disclosure herein provides such new and useful systems and methods.

BRIEF DESCRIPTION OF THE FIGURES

FIGS. 4A and 4B are schematic representations of a protected class modeling system, according to embodiments;

FIG. 9A depicts results of protected class prediction impactful variable determination for multiple data sets, according to embodiments;

FIG. 9B depicts results of protected class prediction impactful variable determination across all data sets, according to embodiments;

FIG. 9C depicts results of modeling system score impactful variable determination for multiple data sets, according to embodiments;

FIG. 9D depicts results of protected class prediction impactful variable determination across all data sets, according to embodiments;

FIG. 9E depicts a comparison of impactful variables for modeling system score and impactful variables for protected class prediction, according to embodiments;

DESCRIPTION OF EMBODIMENTS

Figure 1A:
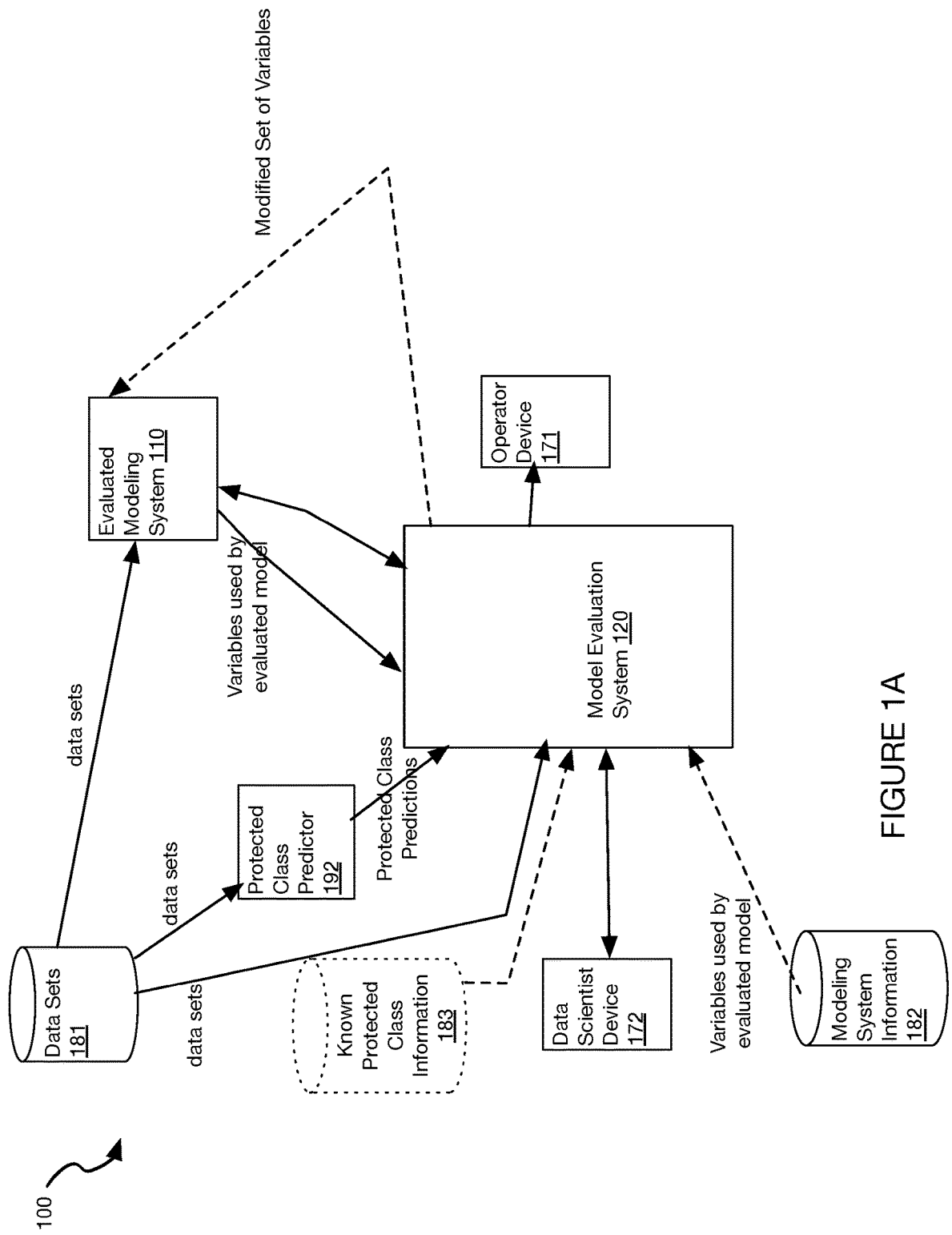
FIGS. 1A and 1B are schematic representations of a system, according to embodiments.

The following description of embodiments is not intended to limit the disclosure to these embodiments, but rather to enable any person skilled in the art to make and use the embodiments disclosed herein.

1. OVERVIEW

A model evaluation system and related methods for determining whether a machine learning model is likely to generate results that disparately impact a protected class are provided. In some embodiments, the model evaluation system (e.g., 120 of FIG. 1A) is communicatively coupled to a modeling system (e.g., 110 of FIG. 1A) that is to be evaluated for possible disparate impact effects, and the model evaluation system is constructed to receive a plurality of data sets, protected class information for each data set of the plurality of data sets, and a set of variables (predictors) used by the modeling system to generate a score for each data set. In some embodiments, the protected class information is protected class membership information that indicates membership in a protected class (e.g., a specific protected class or any one of several protected classes). In some embodiments, the protected class membership information includes information for each of the received plurality of data sets. In some embodiments, the protected class membership information for each data set is associated with a protected class membership variable (feature).

In some embodiments, each data set of the plurality of data sets includes information for a person; for each person, the modelling system is constructed to generate a score based on the data set for the person and the set of variables, and the score is a score used by an entity to make a decision that affects the person. In some embodiments, the entity is one of a government entity, a business, an employer and a landlord. In some embodiments, the modeling system is a credit underwriting modelling system. In some embodiments, the protected class information for a data set indicates whether the person associated with the data set is a member of a protected class being evaluated, including, in some embodiments, which protected class. In some embodiments, the protected class information for a data set indicates a probability of the person associated with the data set being a member of a protected class being evaluated. In some embodiments, the protected class being evaluated includes one of a class of race, ethnicity, national origin, religion, sex, sexual orientation, age, and disability status. In some embodiments the protected class being evaluated includes families with children.

In some embodiments, the model evaluation system generates a protected class prediction for each data set by executing computer-executable instructions for a protected class model, and for each data set, the model evaluation system compares the generated prediction with the protected class information for the data set to generate a comparison result. The model evaluation system then evaluates the accuracy of the protected class model based on the generated comparison results. In some embodiments, the model evaluation system provides a data scientist device (e.g., 172 of FIG. 1A) with information indicating accuracy of the protected class model, and the data scientist device responds with information indicating whether to continue using the predicted class model or with user-specified modeling instructions for a new protected class model. In some embodiments, the user-specified modeling instructions may include adjusting a tunable parameter. In some embodiments, the user-specified modeling instructions include instructions specifying a set of at least one predictor for the new protected class model. In some embodiments, the model evaluation system automatically determines to use the protected class model if the determined accuracy satisfies a threshold condition. In some embodiments, the threshold is set automatically based on historical model performance data. In other embodiments the tunable parameters associated with the modeling instructions are set based on an automated method, wherein combinations of values of tunable parameters are generated and used to train and evaluate a new model; through a repeated process of testing and evaluating, a set of optimal tunable modeling parameters may be determined automatically.

In some embodiments, the model evaluation system automatically selects set of at least one predictor for the new protected class model. In some embodiments, the model evaluation system automatically selects set of at least one predictor for the new protected class model, wherein combinations of predictors are generated and used to train and evaluate new protected class models; through a repeated process of testing and evaluating, a set of new predictors that result in a protected class model that satisfies the threshold condition is determined automatically In some embodiments, after building a protected class model that satisfies an accuracy threshold condition, the model evaluation system accesses protected class predictions for each data set of a population of a plurality of data sets (either the plurality of data sets used to generate the protected class model or a new plurality of data sets) and accesses scores for each data set of the plurality of data sets by using the modeling system (e.g., 110 of FIG. 1A) that is to be evaluated for possible disparate impact effects. In some embodiments, the model evaluation system accesses scores for each data set of the plurality of data sets by providing each data set of the plurality of data sets (the same plurality of data sets used by the protected class model) to the modeling system via an API of the modeling system, and receiving a score for each data set from the modeling system via the API.

In some embodiments, for each data set used by the protected class model, the model evaluation system determines a set of variables (predictors) used by the protected class model that impact the protected class prediction for the data set. FIG. 9A depicts exemplary impactful variables for protected class predictions for data sets 1 to 1000. Based on the determined sets of variables of the plurality of data sets (e.g., as depicted in FIG. 9A), the model evaluation system determines a set of variables that impact protected class predictions across all of the data sets of the population. FIG. 9B depicts exemplary impactful variables for protected class predictions across all data sets of the population. Similarly, for each data set used by the modeling system (e.g., 110), the model evaluation system determines a set of variables (predictors) used by the modeling system (the modeling system and the protected class model use the same variables) that impact the modeling system score for the data set. FIG. 9C depicts exemplary impactful variables for modeling system scores for data sets 1 to 1000. Based on the determined sets of variables (of the plurality of data sets) for the modeling system (e.g., as depicted in FIG. 9C), the model evaluation system determines a set of variables that impact modeling system scores across all of the data sets of the population. FIG. 9D depicts exemplary impactful variables for modeling system scores across all data sets of the population.

In some embodiments, for each variable in the set of variables that impact protected class predictions across all of the data sets (e.g., each variable identified in FIG. 9B) of the population, the model evaluation system determines whether the variable is also included in the set of variables that impact modeling system scores across all of the data sets (e.g., the set of variables depicted in FIG. 9D). For example, for each variable in the set of variables depicted in FIG. 9B, the model evaluation system determines whether the variable is also included in the set of variables depicted in FIG. 9D. In some embodiments, the model evaluation system ranks the variables that impact modeling system scores across all of the data sets according to score impact (e.g., rankings as shown in FIG. 9D), and in a case where a variable in the set of variables that impact protected class predictions across all of the data sets is also included in the set of variables that impact modeling system scores across all of the data sets, an identifier of the variable is stored in association with the score impact ranking (e.g., FIG. 9D). In some embodiments, the model evaluation system ranks the variables that impact protected class predictions across all of the data sets according to protected class prediction impact (e.g., rankings as shown in FIG. 9B), and stores an identifier of the variable in association with the protected class prediction impact ranking (e.g., FIG. 9D). FIG. 9E depicts a comparison of impactful variables for modeling system score and impactful variables for protected class prediction, according to embodiments. As shown in FIG. 9D, Variable A has a high ranking (2) with respect to impact on protected class predictions, and also has a high ranking (2) with respect to impact on modeling system scores. In contrast, Variable D has a high ranking (1) with respect to impact on protected class predictions, but it has a lower ranking (121) with respect to impact on modeling system scores. In other words, although Variable A might be used to identify membership in a protected class, it has a high importance in terms of modeling system scores, and therefore it might be helpful to include Variable A in the scoring model. On the other hand, Variable D is less important in terms of modeling system scores, and therefore it might be possible to remove Variable D from the scoring model without significantly reducing accuracy of the scoring model.

In other embodiments, each variable identifier, a first quantity representing the protected class impact, and a second quantity representing the score impact are stored and then transmitted to an operator device 171 for review, for example, as follows:

| Feature | Relative Influence in Protected-Class | Relative Influence in Underwriting | Rank of Influence in Protected-Class | Rank of Influence in Underwriting |
| --- | --- | --- | --- | --- |
| 3PD1_Var20 | 13.36% | 0.41% | 1 | 26 |
| 3PD3_Var5 | 5.2% | 1.67% | 2 | 13 |
| 3PD5_Var8 | 4.65% | 0.41% | 3 | 24 |
| 3PD4_Var6 | 4.44% | 0.39% | 4 | 28 |
| 3PD1_Var20 | 3.33% | 1.56% | 12 | 14 |
| 3PD3_Var11 | 3.31% | 10.23% | 13 | 5 |
| 3PD2_Var24 | 3.19% | 3.38% | 14 | 9 |

In some embodiments, sets of variables that impact protected class predictions include both identifiers of individual variables that impact protected class predictions in isolation and identifiers of combinations of variables that impact protected class predictions in combination. In some embodiments, sets of variables that impact modeling system scores include both identifiers of individual variables that impact modeling system scores in isolation and identifiers of combinations of variables that impact modeling system scores in combination. In other embodiments these combinations of variable identifiers and a plurality of numeric values including, without limitation, a first value indicating the multivariate protected class impact, and a second quantity representing the multivariate score impact are stored and then transmitted to an operator device 171 for review. In other embodiments this information is visualized by the operator device 171 using visualization techniques such as heat maps, self-organizing maps (SOM), self-organizing feature maps, kahonen maps, trees, histograms, or charts, without limitation.

In some embodiments, the model evaluation system provides the set of variables that impact protected class predictions across all of the data sets (e.g., the set of variables of FIG. 9B) to an operator device (e.g., 171 of FIG. 1A). In some embodiments, the model evaluation system provides the set of variables that impact protected class predictions across all of the data sets to an operator device (e.g., 171 of FIG. 1A), along with the score impact ranking for each variable (or combination of variables). In some embodiments, the model evaluation system provides the set of variables that impact protected class predictions across all of the data sets to an operator device (e.g., 171 of FIG. 1A), along with the score impact ranking and the prediction impact ranking for each variable (or combination of variables).

In some embodiments, for each variable (or combination of variables) of the set of variables that impact protected class predictions across all of the data sets, in a case where the score impact ranking of a variable (or combination of variables) is below a score impact threshold, the model evaluation system modifies a model (scorer) (e.g., 212a of FIGS. 3A and 3B) of the modeling system by removing the variable (or combination of variables) and evaluating the modeling system with the modified model, as described herein.

In some embodiments, for each variable (or combination of variables) of the set of variables that impact protected class predictions across all of the data sets, in a case where the prediction impact ranking of a variable (or combination of variables) is above a prediction impact threshold, the model evaluation system modifies a model (scorer) (e.g., 212a of FIGS. 3A and 3B) of the modeling system by removing the variable (or combination of variables) and evaluating the modeling system with the modified model, as described herein.

In some embodiments, for each variable (or combination of variables) of the set of variables that impact protected class predictions across all of the data sets, in a case where the score impact ranking of a variable (or combination of variables) is below a score impact threshold and the prediction impact is above a prediction impact threshold, the model evaluation system modifies a model (scorer) (e.g., 212a of FIGS. 3A and 3B) by removing the variable (or combination of variables) and evaluating the modeling system with the modified model, as described herein.

In some embodiments, for each evaluated model of the modeling system, the model evaluation system provides the operator device (e.g., 171) with the corresponding set of variables that impact protected class predictions across all of the data sets, and the score impact ranking and the prediction impact ranking for each variable (or combination of variables), and the model evaluation system receives from the operator device a user-selection of one of the evaluated models.

In some embodiments, the protected class model is a same type of model as the model (or models) used by the evaluated modeling system.

In other embodiments, the model evaluation system removes each variable or combination of variables and evaluates the modeling system with each modified model, as described herein. In some embodiments, a model that provides the most predictive power and the least impact to protected classes is automatically selected. In some embodiments, model evaluations are stored in an 171 operator device so they may be later retrieved and reviewed.

Embodiments herein address a technical problem of evaluating disparate impact in a model of an external modeling system. In a case where the modeling system does not provide direct access of the model (used by the modeling system) to external systems, it is technically difficult to evaluate disparate impact of the model by using an external system. Embodiments herein address this technical problem by providing a model evaluation system that is constructed to evaluate disparate impact of an external modelling system by accessing data sets used by the modeling system, information indicating predictors (e.g., single variable predictors, multivariable predictors) used by the modeling system, scores generated by the modeling system for a population of data sets, and protected class membership information for each data set. In some embodiments, the modeling system accesses the data sets, the information indicating the predictors used by the modeling system, the scores generated by the modeling system for the population of data sets, and the protected class membership information from at least one data store (e.g., 181, 183, 182, 192 of FIG. 1A). In some embodiments, the modeling system includes an API that is constructed to process a predictor request for model predictors received from the model evaluation system, and return the information indicating the predictors used by the modeling system as a response to the request provided by the model evaluation system. In some embodiments, the modeling system includes an API that is constructed to process a score request received from the model evaluation system, and return a score generated by the modeling system for a data set included in the score request as a response to the score request. In some embodiments, a data store includes the population of data sets and associated scores that have been previously generated by the modeling system, and the model evaluation system accesses the scores generated by the modeling system for the population from the data store.

Accordingly, in some embodiments, the model evaluation system can evaluate the modeling system without direct interaction with the modeling system. In some embodiments, the model evaluation system evaluates the modeling system by using an API of the modeling system that processes score requests as described herein. In some embodiments, the model evaluation system evaluates the modeling system by using an API of the modeling system that returns sub-model coefficients of an ensemble model of the modeling system responsive to a request provided by the model evaluation system. In some embodiments, the model evaluation system evaluates the modeling system by using an API of the modeling system that returns statistics about a variable's use in a model. In some embodiments, the model evaluation system evaluates the modeling system by using an API of the modeling system that returns at least one derivative of a model (or sub-model) of the modeling system by using a gradient operator of the modeling system responsive to a request provided by the model evaluation system. In some embodiments, the model evaluation system evaluates the modeling system by using an API of the modeling system that returns a tree structure of a tree model (or sub-model) of the modeling system responsive to a request provided by the model evaluation system. In some embodiments, the model evaluation system evaluates the modeling system by using an API of the modeling system that returns tree nodes contributing a score generated by modeling system responsive to a request provided by the model evaluation system. In some embodiments, the model evaluation system evaluates the modeling system by using an API of the modeling system that returns a percentage of scores to which a tree node of the modeling system contributes, responsive to a request provided by the model evaluation system. In some embodiments, the model evaluation system evaluates the modeling system by using an API of the modeling system that returns model metadata recorded by the modeling system during scoring of at least one data set, responsive to a request provided by the model evaluation system, wherein the recorded model metadata includes information that is not the generated score. In some embodiments the modeling system API provides the model evaluation system a Shapley value associated with each variable for a subset of submodels.

Thus, embodiments herein involve technical solutions to evaluating disparate impact in a model of an external modeling system that involves processes performed by a model evaluation system that is communicatively coupled to the external modeling system via a network. Some embodiments herein involve technical solutions to evaluating disparate impact in a model of an external modeling system that involve processes performed by the model evaluation system and processes performed by the modeling system. Embodiments herein include non-conventional and non-generic arrangements of a modeling system and a model evaluation system. Some embodiments involve synergistic operation of the modeling system and the model evaluation system, including at least one of a specific response by the modeling system to requests provided by the model evaluation system, and modification of a model of the modeling system by the model evaluation system.

Embodiments herein use a protected class model that predicts whether a data set processed by the modeling system is associated with membership in a protected class to evaluate disparate impact. Some technical solutions disclosed herein are based on the discovery that if predictors that are used by a model can be used to build such a protected class model, then it is possible that the model uses impermissible features (e.g., race, gender, etc.) in making decisions. The inventors herein have observed that while it may be possible to evaluate disparate impact without using a protected class model as described herein, use of the protected class model provides advantages over other technical solutions. By using the protected class model, disparate impact evaluation can be performed with less interaction with the modeling system being evaluated, as compared to other technical solutions. For example, embodiments disclosed herein that use the protected class model can be used to evaluate disparate impact in "black box" modeling systems wherein limited access is provided to external systems.

Some embodiments herein begin by building a protected class model that satisfies an accuracy threshold. It can be assumed that it might always be possible to build a protected class model using features also used by the modeling system being evaluated, but a disparate impact problem is less likely when the accuracy of the protected class model is below an accuracy threshold. After building a protected class model that satisfies the accuracy threshold, a protected class model impact ranking value and a modeling system impact ranking value are determined for each predictor of the protected class model. The protected class model impact ranking values can be used to identify predictors that identify membership in a protected class, and therefore should not ordinarily be included in a model used to make business decisions. However, if a potentially impermissible predictor is identified by using the protected class model impact ranking values, the modeling system impact ranking value can be used to determine whether there is a legitimate business purpose for including the predictor in the modeling system (e.g., the predictor is highly predictive of creditworthiness).

2. SYSTEMS

FIG. 1A is a schematic representation of a system 100, according to embodiments. In some embodiments, the system 100 includes a model evaluation system 120 and a modeling system 110 that is to be evaluated by the model evaluation system 120. In some embodiments, the system 100 includes an operator device 171 that is external to the model evaluation system 120. In some embodiments, the system 100 includes a data scientist device 172 that is external to the model evaluation system 120. In some embodiments, the system 100 includes at least one storage device that is external to the model evaluation system 120 (e.g., one of the storage devices 181, 182 and 183 depicted in FIG. 1A). In some embodiments, the system 100 includes a protected class predictor system 192.

In some embodiments, the model evaluation system 120 includes one or more hardware devices. In some embodiments, the model evaluation system 120 is a hardware system that includes one or more server devices. In some embodiments, the model evaluation system 120 is external to each of the devices 171 and 172.

In some embodiments, the modeling system 110 includes one or more hardware devices. In some embodiments, the modeling system 110 is a hardware system that includes one or more server devices. In some embodiments, the modeling system 110 is external to each of the devices 171 and 172.

In some embodiments, the model evaluation system 120 is communicatively coupled to the modeling system 110 via an API (Application Program Interface). In some embodiments, the API is an API of the modeling system 110. In some embodiments, the API is an API of the model evaluation system 120. In some embodiments, the API is a public API that is accessible via the Internet. In some embodiments, the API is a private API. In some embodiments, the API includes one or more of a RESTful API, EDI, CORBA, XMLRPC, and other machine to machine communication methods and programming interfaces. In some embodiments, the API is an HTTP-based API.

In some embodiments, the modeling system 110 is a system operated by a first entity, and the model evaluation system 120 is a system operated by a different, second entity. As an example, a first entity operates the modeling system 110, and the modeling system 110 is communicatively coupled to the model evaluation system 120, which is operated by a second entity, wherein the first entity is a business that uses the modeling system 110 to generate information used to make decisions, and the second entity provides a machine learning model evaluation system 120.

In some embodiments, the model evaluation system 120 is an on-premises system that is co-located with the modeling system 110. In some embodiments, the model evaluation system 120 is an off-premises system that is communicatively coupled to the modeling system 110 via the Internet. In some embodiments, the model evaluation system 120 is an off-premises system that is communicatively coupled to the modeling system 110 via a private network (e.g., a VPN). In some embodiments, the model evaluation system 120 is a multi-tenant model evaluation system. In some embodiments, the model evaluation system 120 is included in a multi-tenant machine learning model evaluation platform.

In some embodiments, the model evaluation system and the modeling system are operated by a same entity, and the modeling system includes at least one model generated by a second entity. In some embodiments, the model evaluation system and the modeling system are included in a machine learning platform system operated by a same entity. In some embodiments, the model evaluation system and the modeling system are included in a multi-tenant machine learning platform system operated by a same entity (e.g., a PaaS provider) and the modeling system includes at least one model generated by a second entity (e.g., an entity associated with a platform account of the platform system). In some embodiments, the second entity provides the at least one model to the multi-tenant machine learning platform system via an API. In some embodiments, the API is similar to the API described above.

In some embodiments, the model evaluation system 120 is communicatively coupled to an operator device 171. In some embodiments, the device 171 is one of a server device, a client computer, and a mobile device. In some embodiments, the device 171 is a hardware device that is external to the model evaluation system 120. In some embodiments, the model evaluation system 120 is communicatively coupled to a data scientist device 172. In some embodiments, the device 172 is one of a server device, a client computer, and a mobile device. In some embodiments, the device 172 is a hardware device that is external to the model evaluation system 120.

Model Evaluation System

Figure 1B:
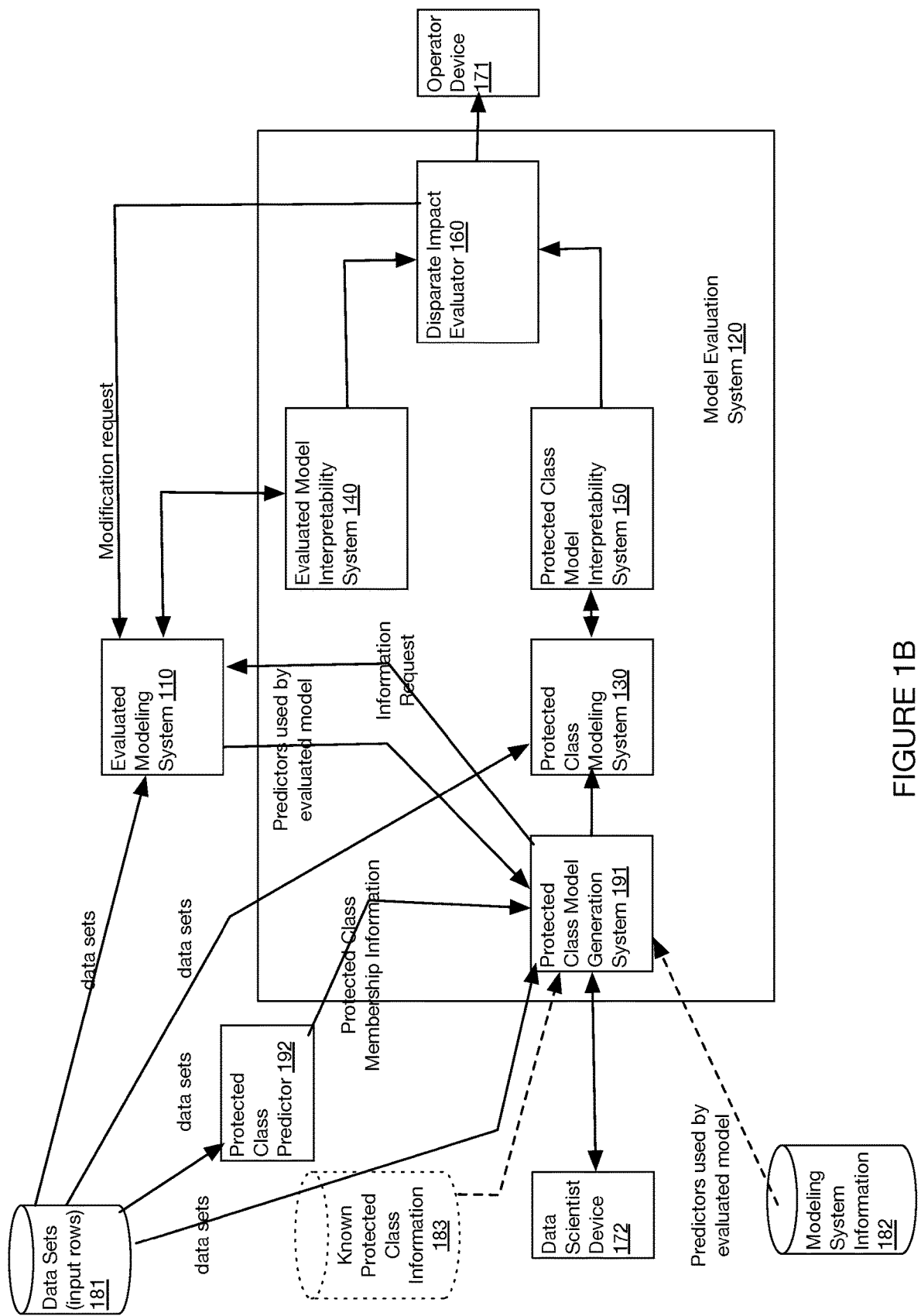

FIG. 1B is a schematic representation of a model evaluation system, according to embodiments. In some embodiments, the model evaluation system 120 includes a protected class model generation system 191. In some embodiments, the model evaluation system 120 includes a protected class modeling system 130. In some embodiments, the protected class modeling system 130 is a same type of modeling system as the evaluated modeling system 110.

In some embodiments, the model evaluation system 120 includes a protected class model interpretability system 150. In some embodiments, the model evaluation system 120 includes an evaluated model interpretability system 140. In some embodiments, the model evaluation system 120 includes a disparate impact evaluator 160.

Figure 2A:
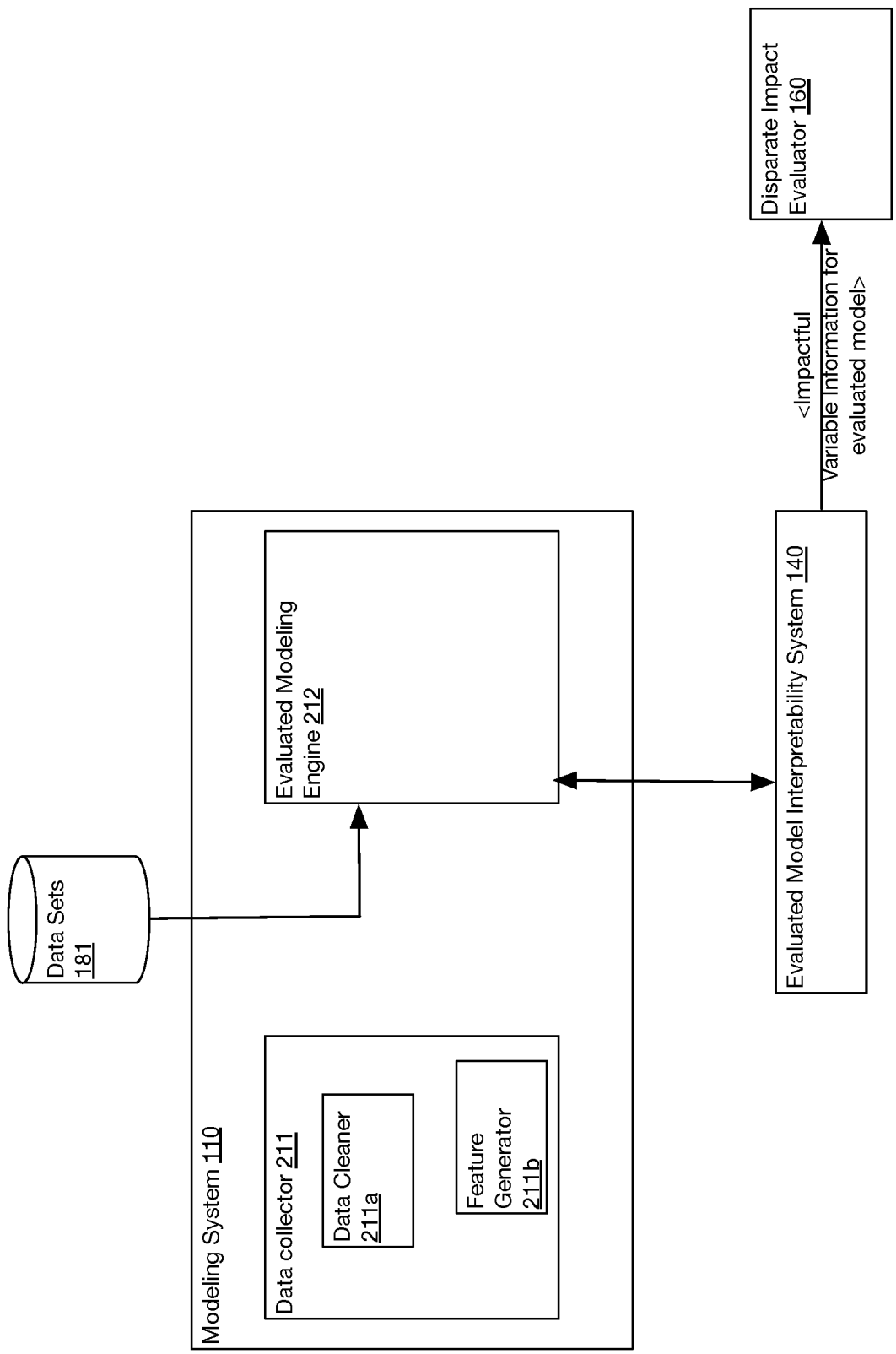
FIGS. 2A and 2B are schematic representations of a modeling system, according to embodiments.
Figure 2B:
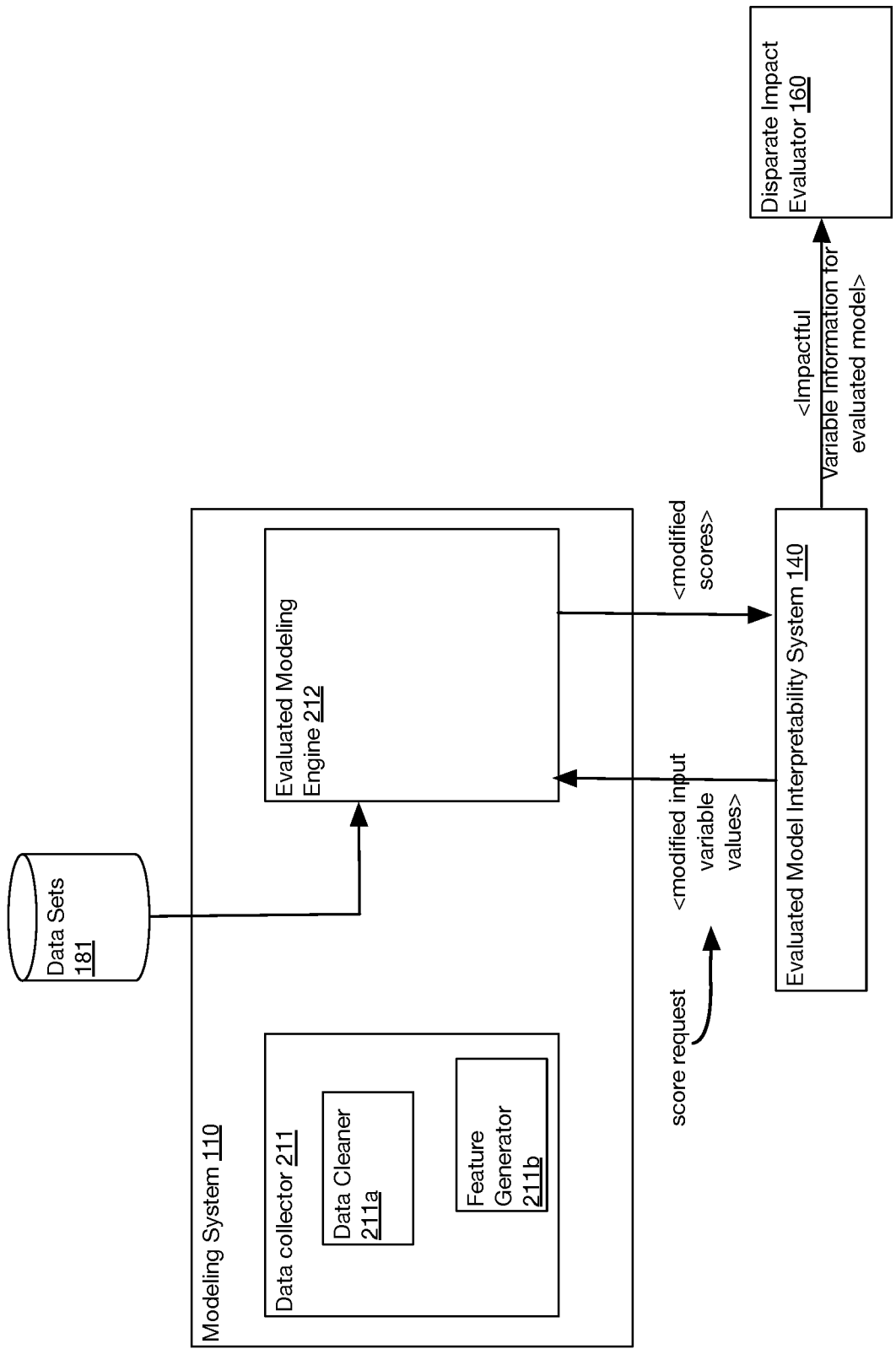
Figure 3A:
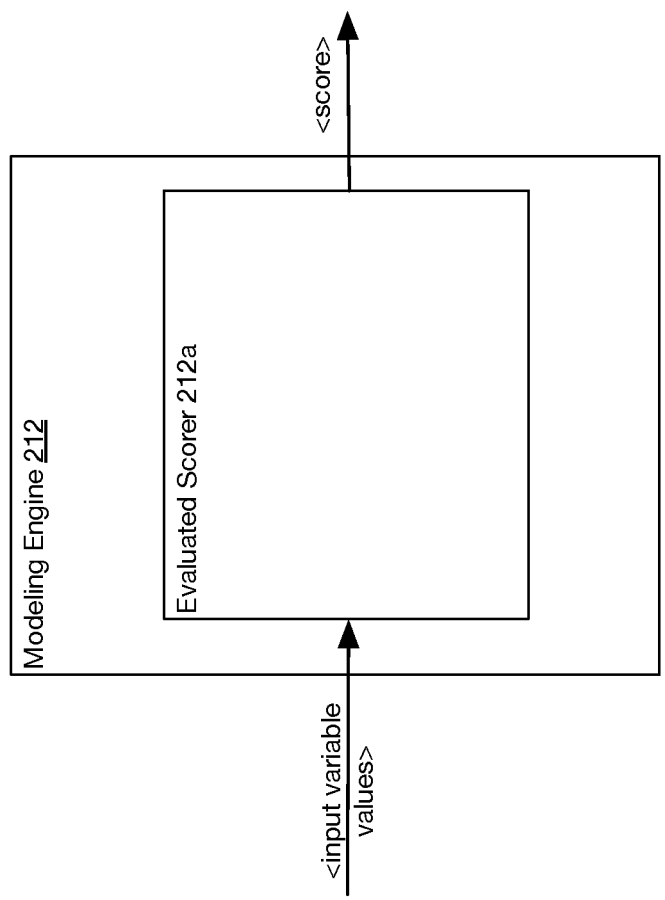
FIGS. 3A and 3B are a schematic representations of a modeling engine, according to embodiments.
Figure 3B:
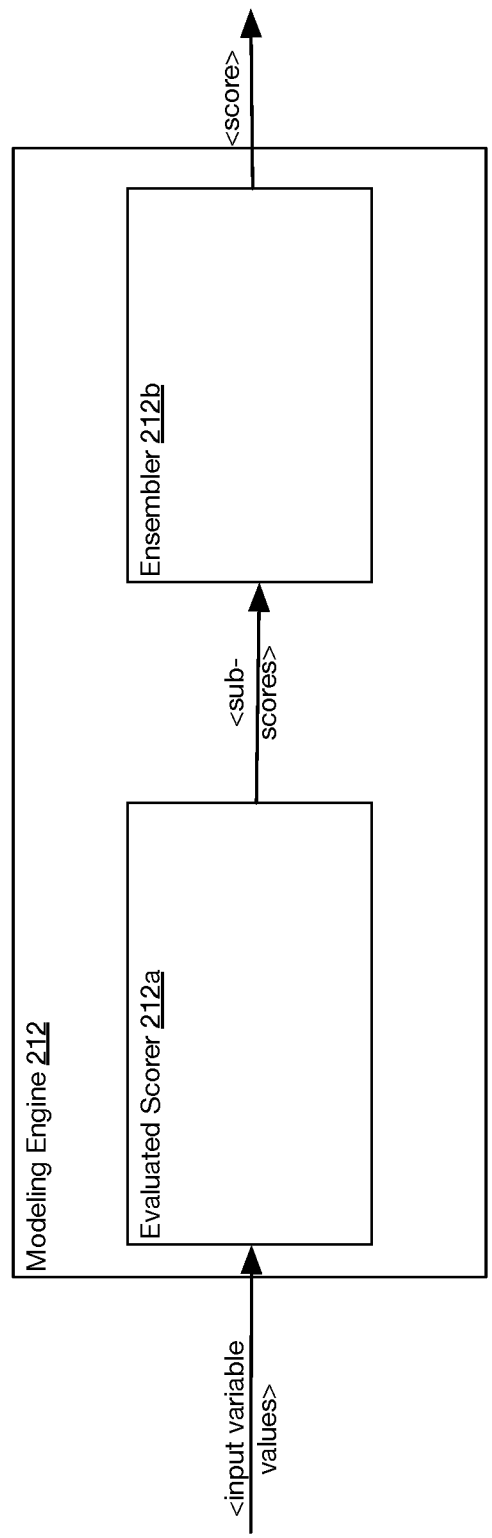

FIGS. 2A and 2B are schematic representations of the modeling system 110, according to embodiments. FIG. 2B depicts an evaluated model interpretability system 140 that is constructed to determine a set of variables that impact modeling system scores of the modeling system 110 by scoring a plurality of sets of input variables (each set having different variable values) using the modeling system 110, receiving a score for each set of input variable values, and comparing the received scores to identify the set of variables that impact modeling system scores of the modelling system 110. FIG. 3A is a schematic representation of a modeling engine of the modeling system 110, according to embodiments. FIG. 3B is a schematic representation of a modeling engine of the modeling system 110, according to embodiments.

Figure 4A:
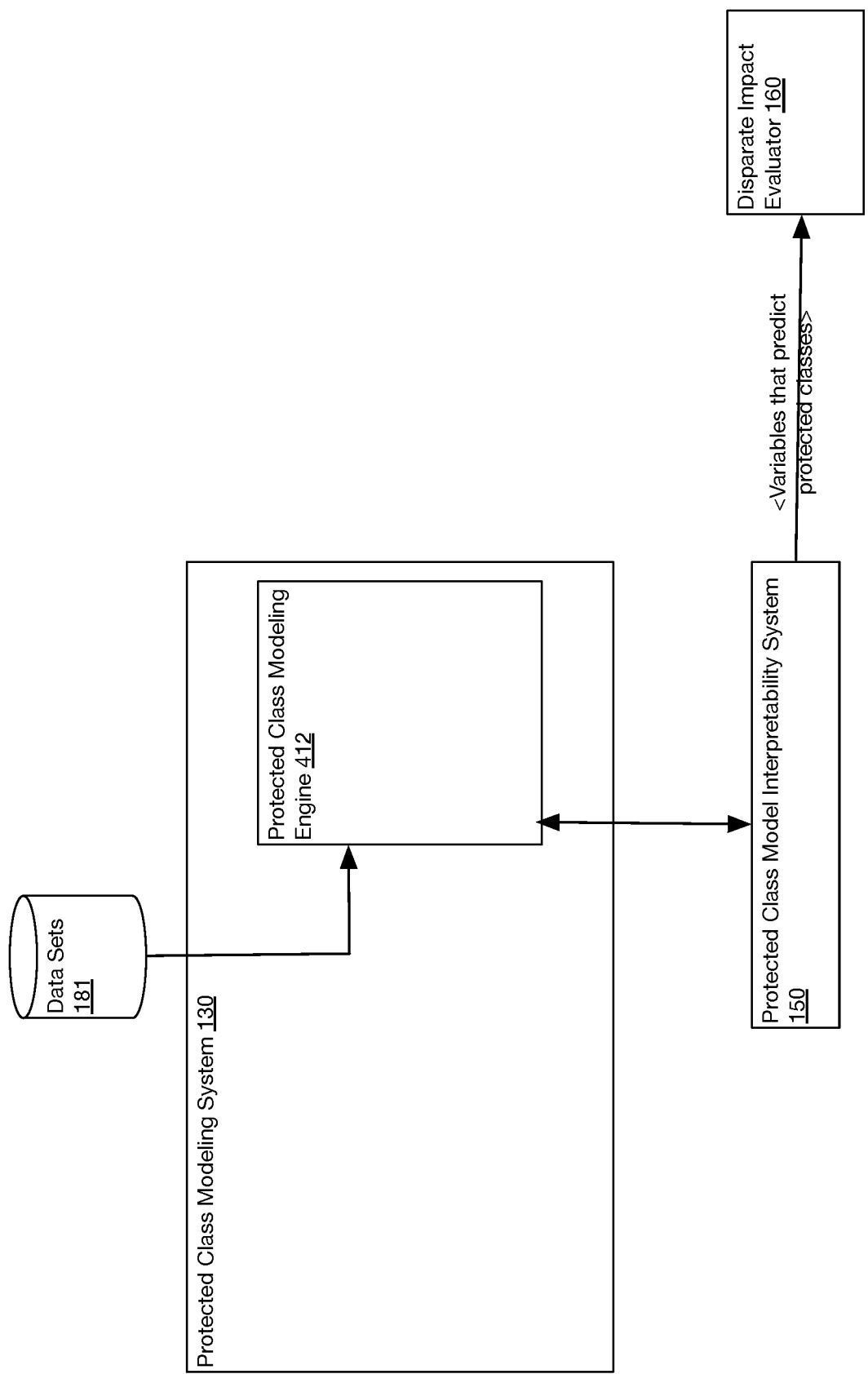
Figure 5A:
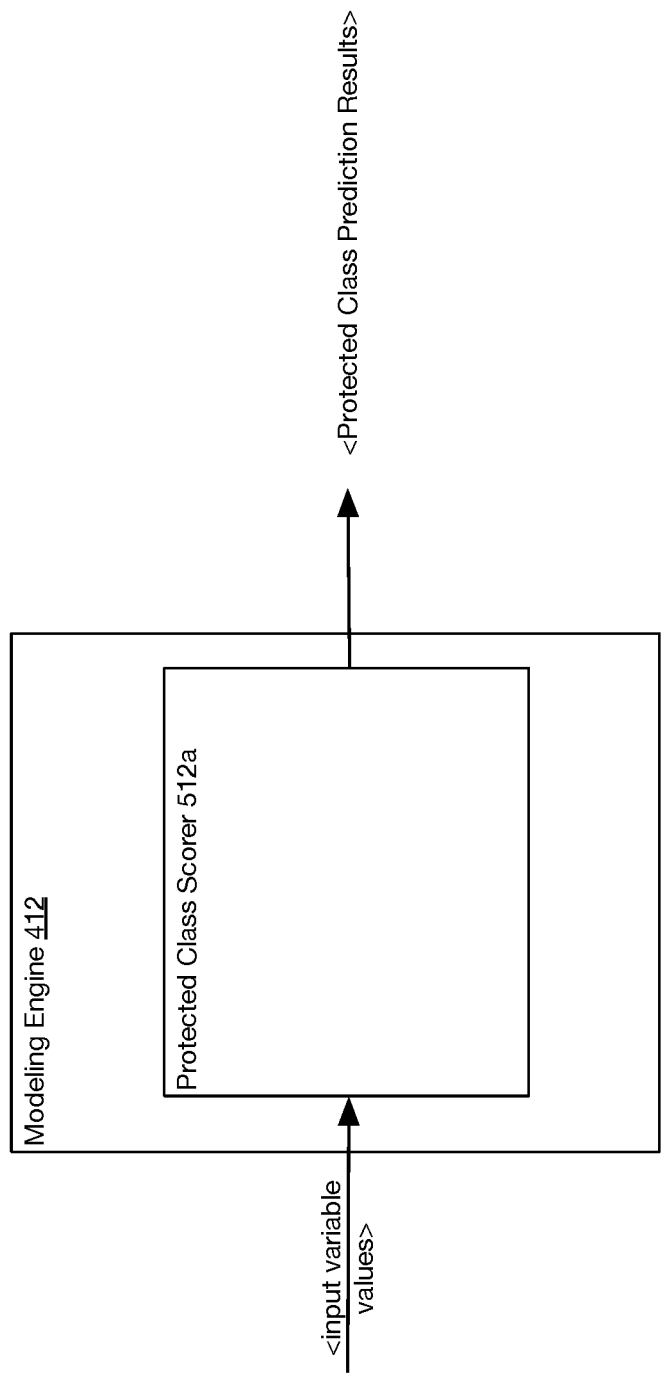
FIGS. 5A and 5B are a schematic representations of a protected class modeling engine, according to embodiments.
Figure 5B:
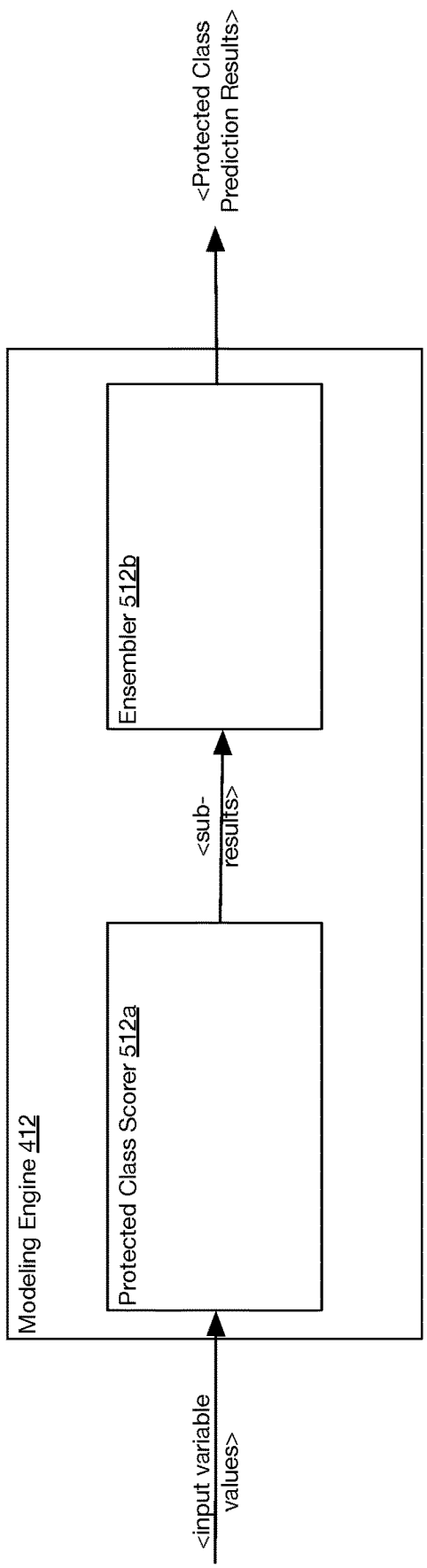

FIGS. 4A and 4B are schematic representations of the protected class modeling system 130, according to embodiments. FIG. 4B depicts a protected class model interpretability system 150 that is constructed to determine a set of variables that impact protected class predictions of the protected class modeling system 130 by scoring a plurality of sets of input variables (each set having different variable values) using the protected class modeling system 130, receiving a protected class prediction for each set of input variable values, and comparing the received predictions to identify the set of variables that impact protected class predictions of the protected class modelling system 130. FIG. 5A is a schematic representation of a modeling engine 412 of the protected class modeling system 130, according to embodiments. FIG. 5B is a schematic representation of a modeling engine 412 of the protected class modeling system 130, according to embodiments.

Protected Class Model Generation System

In some embodiments, the protected class model generation system 191 is constructed to access a plurality of data sets (e.g., from 181).

In some embodiments, the protected class model generation system 191 is constructed to receive information indicating variables used by the evaluated modeling system 110. In some embodiments, the protected class model generation system 191 is constructed to receive information indicating variables used by the evaluated modeling system 110 from the evaluated modeling system 110 via an API. In some embodiments, the API is an API of the modeling system 110. In some embodiments, the API is an API of the model evaluation system 120. In some embodiments, the protected class model generation system 191 is constructed to receive information indicating variables used by the evaluated modeling system 110 from a storage device (e.g., 182).

In some embodiments, the protected class model generation system 191 is constructed to receive information indicating a type of the evaluated modeling system 110. In some embodiments, the protected class model generation system 191 is constructed to receive information indicating a type of the evaluated modeling system 110 from the evaluated modeling system 110 via an API. In some embodiments, the API is an API of the modeling system 110. In some embodiments, the API is an API of the model evaluation system 120. In some embodiments, the protected class model generation system 191 is constructed to receive information indicating a type of the evaluated modeling system 110 from a storage device (e.g., 182).

In some embodiments, the protected class information for a data set indicates whether the person associated with the data set is a member of a protected class being evaluated, and the protected class model generation system 191 is constructed to receive the protected class information from a storage device (e.g., 183).

In some embodiments, the protected class information for a data set indicates a probability of the person associated with the data set being a member of a protected class being evaluated, and the protected class model generation system 191 is constructed to receive the protected class information from a storage device (e.g., 181).

In some embodiments, the protected class information for a data set indicates a probability of the person associated with the data set being a member of a protected class being evaluated, and the protected class model generation system 191 is constructed to receive the protected class information from the protected class predictor 192; the protected class predictor 192 is constructed to determine the probability of the person being a member of the protected class.

In some embodiments, the model evaluation system 120 includes, the protected class predictor 192.

In some embodiments, the protected class model generation system 191 is constructed to provide the plurality of data sets, protected class information for each data set of the plurality of data sets, and the set of variables to a data scientist device (e.g., 172 of FIG. 1A), the protected class model generation system 191 is constructed to receive user-specified modeling instructions for a protected class model from the data scientist device, and the protected class model generation system 191 is constructed to store computer-executable instructions for a protected class model (scorer) (e.g., 512a of FIGS. 5A and 5B) based on the received user-specified modeling instructions. In some embodiments, a data scientist operating the data scientist device perceives the plurality of data sets and the set of variables, determines a protected class model for predicting whether a person of a data set is a member of the protected class being evaluated, and inputs the user-specified modeling instructions at the data scientist device to control the protected class model generation system 191 to store the computer-executable instructions for the protected class model in a format of a protected class modeling engine (e.g., 412 of FIGS. 4A and 4B) of the model evaluation system 120.

Protected Class Predictor

In some embodiments, the protected class predictor 192 is constructed to access the plurality of data sets (e.g., from 181) accessed by the protected class model generation system 191, and determine a protected class prediction for each data set (of the plurality of data sets) by using a set of variables of the data set. In some embodiments, the protected class predictor 192 is constructed to determine a protected class prediction for each data set (of the plurality of data sets) by using a set of variables of the data set that is different from a set of variables used by the modeling system 110. In some embodiments, the protected class predictor 192 is constructed to use a CFPB (Consumer Financial Protection Bureau) BISG (Bayesian Improved Surname Geocoding) process to determine protected class predictions. In some embodiments, the variables included in the plurality of accessed data sets do not include variables that explicitly identify membership in a protected class.

In some embodiments, the variables included in the plurality of accessed data sets do not include variables that explicitly identify race, ethnicity, national origin, religion, sex, sexual orientation, age, and disability status. In some embodiments, the variables included in the plurality of accessed data sets do not include variables that explicitly identify at least one of race, ethnicity, national origin, religion, sex, sexual orientation, age, and disability status.

In some embodiments, the data sets are specified by a user of the data scientist interface 172 or the operator interface 171.

Evaluated Model Interpretability System

In some embodiments, the evaluated model interpretability system 140 is constructed to access a set of input variable values (and corresponding variable identifiers) for a first data set, and a score generated by the modeling system 110 for the set of input variable values. In some embodiments, at least some input variable values and corresponding variable identifiers are received from at least one of the operator device 171, the data scientist device 172, and the storage device 181. In some embodiments, at least some input variable values and corresponding variable identifiers are generated by the evaluated model interpretability system 140.

In some embodiments, the evaluated model interpretability system 140 includes a modeling system interface constructed for communication with the modeling system 110. In some embodiments, the evaluated model interpretability system 140 includes an interface constructed to receive user-selection of variables and combinations of variables, and user selection of transformation information (e.g., from an operator device 171, a data scientist device 172). In some embodiments, the evaluated model interpretability system 140 is constructed to access machine-selected variables and machine-selected combinations of variables and machine-generated transformation information.

In some embodiments, the evaluated model interpretability system 140 includes a user interface constructed to provide data to and receive user-specified input from a device (e.g., an operator device 171, a data scientist device 172). In some embodiments, the user interface of the evaluated model interpretability system 140 is constructed to provide identifiers of variables and combinations of variables and corresponding statistical properties of the variables and combinations of variables, so as to provide information identifying the most important variables and combinations of variables (with respect to scores of modeling system 110) to a user device (e.g., 171, 172). In some embodiments, statistical properties of the variables and combinations of variables include at least one of a computed protected class impact (generated by the protected class model interpretability system 150) and score impact (generated by the evaluated model interpretability system 140). In some embodiments, the variables and combinations of variables (and corresponding statistical properties) provided to a user device (e.g., 171, 172) are selected based on comparing a combination of statistical properties of the variables and combinations of variables. In some embodiments, the combination of statistical properties of variables is the sum of the computed protected class impact (determined by the protected class model interpretability system 150) and score impact (generated by the evaluated model interpretability system 140) of the variables and combinations of variables, with a tunable parameter. In some embodiments, the combination of statistical properties of variables is computed based on one or more of the arithmetic mean, the geometric mean, a difference, a linear combination, a polynomial function, or other computable function, without limitation. In some embodiments the tunable parameter is computed by combining statistical properties of the variables and combinations of variables by arithmetic transformation. In some embodiments, each variable or combination of variables (and corresponding statistical properties) provided to a user device (e.g., 171, 172) is provided along with a partial dependence plot depicting how the score varies based on each variable or combination of variable values.

In some embodiments, the evaluated model interpretability system 140 includes a modified input value generator that is constructed to access an original set of input variable values, generate at least one set of modified input values based on the received user-selection of variables and combinations of variables, and the received user specified transformation information, and provide each generated set of modified input values to the modeling system 110 (via a modeling system interface) for scoring.

In some embodiments, the evaluated model interpretability system 140 includes a modified input value generator that is constructed to access an original set of input variable values, generate at least one set of modified input values based on the machine-selected variables and combinations of variables, and machine-generated transformation information, and provide each generated set of modified input values to the modeling system 110 (via a modeling system interface) for scoring.

Figure 10A:
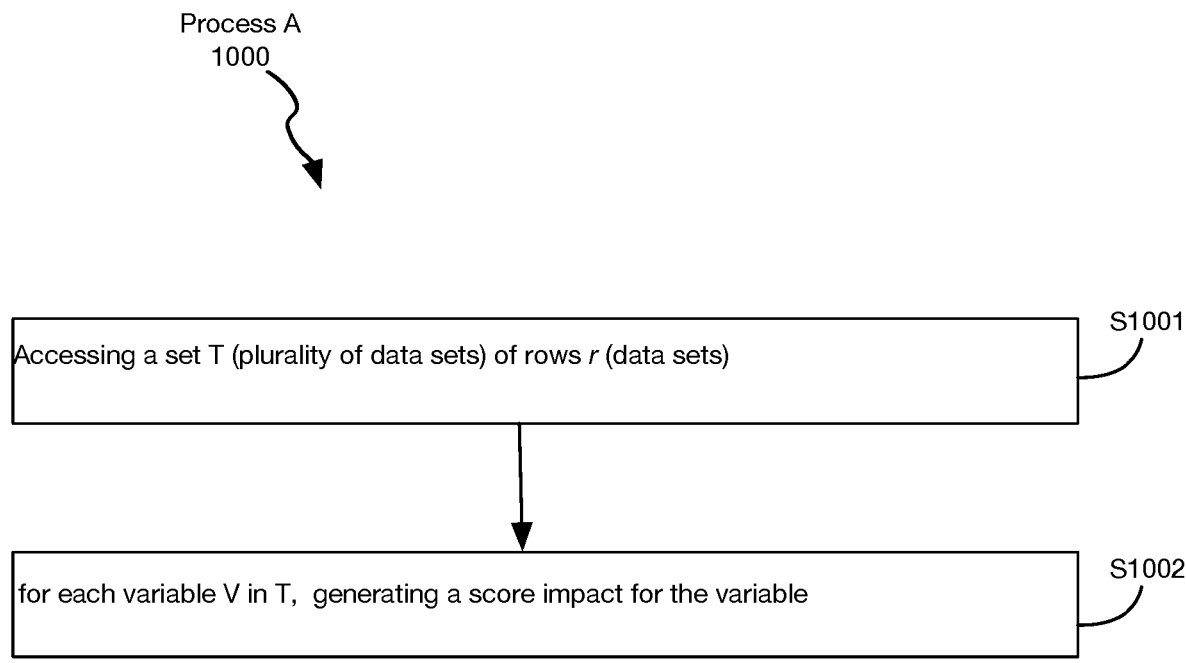
FIGS. 10A-B depict a process for determining impactful variables and their score impact values.
Figure 10B:
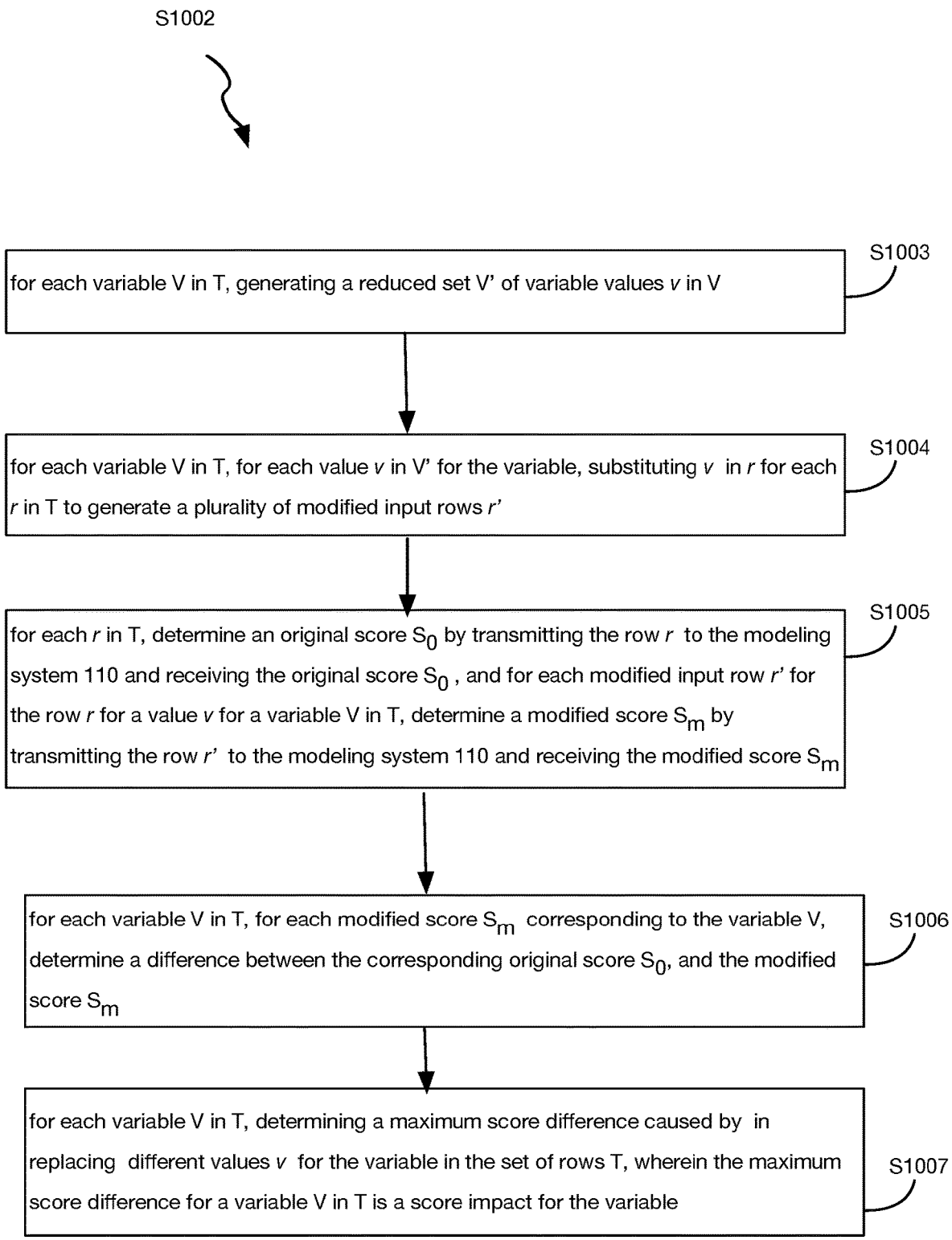

In some embodiments, the evaluated model interpretability system 140 performs steps (Process 1000 of FIG. 10) to determine the impactful variables and their score impact values (e.g. as depicted in FIGS. 9C and 9D) as shown in FIG. 10. In some embodiments, the Process 1000 of FIG. 10 includes: accessing a set T (plurality of data sets) of rows r (data sets) (e.g., training data sets used to train the model to be evaluated, a random sample of previously scored data sets) (process S1001); and for each variable V in T, generating a score impact for the variable (process S1002).

In some embodiments, process S1002 includes: for each variable V in T, generating a reduced set V' of variable values v in V (process S1003); for each variable V in T, for each value v in V' for the variable, substituting v in r for each r in T to generate a plurality of modified input rows r' (process S1004); for each r in T, determine an original score $S_o$ by transmitting the row r to the modeling system 110 and receiving the original score $S_o$, and for each modified input row r' for the row r for a value v for a variable V in T, determine a modified score $S_m$ by transmitting the row r' to the modeling system 110 and receiving the modified score $S_m$; (process S1005); for each variable V in T, for each modified score $S_m$ corresponding to the variable V, determine a difference between the corresponding original score $S_o$, and the modified score $S_m$ (process S1006); for each variable V in T, determining a maximum score difference caused by replacing different values v for the variable in the set of rows T, wherein the maximum score difference for a variable V in T is a score impact for the variable (process S1007). In some embodiments the accessed data sets T include data sets used to train the model to be evaluated, or some other suitable sample of input rows, e.g., a random sample of data previously scored, e.g., credit application data, credit bureau data, combined with the actual outcome or target to be predicted e.g., whether there was a first payment default.

In some embodiments, the process S1002 includes:
(b) for each variable V in T:
  (b1) computing the unique values of V or bins of V using a suitable histogram optimization method (e.g., by using a histogram optimization method described in Shimazaki and Shinomoto. Neural Comput, 2007, 19(6), 1503-1527, the contents of which is incorporated by reference herein), resulting in a reduced set V'
    (b1.1) for each value v in V'
      (b1.1.1) for each row r in T
        (b1.1.1.1) computing the original score $s_o$ by transmitting the row r to the modeling system 110 and receiving the original score
        (b1.1.1.2) substituting v in r to create a modified input row r'
        (b1.1.1.3) computing a modified score $s_m$ by transmitting the row r' to the modeling system 110 and receiving the modified score
        (b1.1.1.4) computing the difference in score $d=|s_o-s_m|$
  (b2) determining the maximum score difference caused by different values of variable V applied to each row in the training set, impact(V)=max(d) for all v in V', r in T, t;

(b3) returning each input variable V and each score impact(V) sorted by impact(V) descending In some embodiments, the average of max score differences is computed to determine the score impact. In other embodiments the difference computed in step b1.1.1.4 above is the difference between the modified score and the maximum score (deviance from max), and the score impact computed in step b2 is the average deviance from max. In other embodiments the score impact computed in step b2 is the maximum deviance from max. Other computations, such as deviance from mean, can be substituted to meet the goals of the business in assessing and determining the score impact of a variable.

In some embodiments, a modified input value generator of the system 140 is constructed to select modified input values for scoring based on measures such as the estimated information gain computed based on at least two scores produced by the modeling system 110, resulting from at least two distinct sets of modified input values. In other embodiments other distance measures may be constructed to define a metric space. In this way, the modified input value generator may be constructed to efficiently explore the input variable space using optimization methods such as simplex, gradient descent, Newton's method, simulated annealing, bayesian optimization, cross-entropy methods, evolution strategies, denoising autoencoders with estimation of distribution algorithms and other methods, without limitation, in order to reduce the number of modified inputs to be considered, without materially reducing accuracy.

In some embodiments, the evaluated model interpretability system 140 performs steps (Process 1100 of FIG. 11) to determine the impactful variables and their score impact values as shown in FIG. 11. In some embodiments, the Process 1100 of FIG. 11 includes: accessing sample of input rows S, and actual outcomes O (process S1101); computing model predictions $P_O$ of the model being evaluated (e.g., a model of modeling system 110 of FIG. 1A) for each row $r_i$ in S (process S1102); computing a model accuracy metric $A_O$ by comparing the model predictions $P_O$ to the actual outcomes O by using an accuracy metric (process S1103); and for each variable v in S, determining an importance of the variable v by comparing the model accuracy metric $A_O$ with a model accuracy metric $A_{\nu}$ generated by shuffling values of v in S (process S1104).

In some embodiments, the sample of input rows S is one of a hold-out set and an evaluation set used to evaluate the model being evaluated when the model was originally produced.

In some embodiments, the process S1102 includes: computing the model predictions $P_o = \langle p_i \rangle$ where $p_i = \text{predict}(r_i)$ for each row $r_i$ in S, where predict( ) is the model's predict function. In some embodiments, the predict function returns a number. In some embodiments, the predict function returns a classification.

In some embodiments, the process S1103 includes: computing a model accuracy metric $A_o$ (S, O, $P_o$) by comparing the model predictions $P_o$ to the actual outcomes O using a suitable accuracy metric. In some embodiments, the model accuracy metric is one of AUC (area under the receiver operating characteristic curve), Gini impurity, classification error, mean squared error, entropy, and log loss.

In some embodiments, the process S1104 includes: for each variable v in S: computing a modified sample of input rows S'(v) by shuffling values of v in S such that S'(v) is identical to S except that an ordering of the values of v are randomized (process S1105); computing new model predictions $P_\nu = \langle p_i \rangle$ where $p_i = \text{predict}(r_i)$ for each row $r_i$ in S'(v), the modified version of S (process S1106); computing a model accuracy metric $A_\nu$ (S, O, $P_\nu$) by comparing the model predictions $P_\nu$ to the actual outcomes O using the same accuracy metric as in process S1103 (process S1107); and comparing $A_\nu$ with $A_o$ to determine the importance of variable v (process S1108). In some embodiments, comparing $A_\nu$ with $A_o$ to determine the importance of variable v includes determining importance (v) as the absolute value of the difference between $A_\nu$ and $A_o$ (e.g., importance(v)=|$A_\nu$−$A_o$|).

In some embodiments, an operator of the operator device 171 selects groupings of variables to be evaluated together by the model evaluation system 120, and provides information identifying the selection of groupings of variables to the model evaluation system 120. In some embodiments, the operator device 171 presents a user interface for receiving the selection of groupings of variables from the operator. For example, the operator may select credit scores from each of several credit bureaus, or credit utilization amounts from each of the credit bureaus, to be evaluated together. The evaluated model interpretability system 140 receives the user-selected grouping of variables. The Process 1100 (FIG. 11) described above is executed, except that instead of shuffling a single variable v, the shuffling occurs on each group of variables, preserving the row-wise relationship of the variable values within the group of variables. More precisely, let $G_i = \langle v_1 \ldots v_n \rangle$ be a grouping of variables in S. For each $G_i$, the evaluated model interpretability system 140 computes S'($G_i$) as follows:

(a) Initializing S'($G_i$) to the empty set
(b) Gathering $G_{ij}$ the values of each variable in $G_i$ occurring in each row $r_j$ in S;
(c) For each row $r_k$ in S,
(b1) choosing a random number $\hat{j}$ between o and length ($G_{ij}$)
(b2) substituting values of $G_{ij}$ in $r_k$ to produce $r'_k$
(b3) appending $r'_k$ to S'($G_i$)
(b4) removing $G_{ij}$ from $G_i$ In this way, the conditional distributions within each group of variables $G_i$ may be preserved when computing S'($G_i$). The Process 1100 (FIG. 11) is then be executed, computing new model predictions, a model accuracy metric, and a difference in metric as described, allowing the evaluated model interpretability system 140 to determine the importance of a group of variables.

In some embodiments, the evaluated model interpretability system 140 includes an impactful variable/value identifier that is constructed to receive the original score for the original input variable values from the modeling system via an interface, receive modified scores for each scored set of modified input variable values from the modeling system, receive each modified set of input variable values from the modified input value generator, and identify one or more impactful variables and/or one or impactful variable values. In some embodiments, the impactful variable/value identifier is constructed to identify the one or more impactful variables and/or the one or impactful variable values by comparing each modified score (for a changed variable or plurality of variables in the corresponding modified set) with the original score, and selecting a changed variable (or plurality of variables) based on impactful variable selection criteria and/or variable value selection criteria. The impactful variable/value identifier is constructed to provide information specifying each identified impactful variable or plurality of variables to the disparate impact evaluator 160. In some embodiments, the impactful variable selection criteria is user-specified criteria. In some embodiments, the impactful variable selection criteria is machine-generated criteria. In some embodiments, the impactful variable value selection criteria is user-specified criteria. In some embodiments, the impactful variable value selection criteria is machine-generated criteria. In other embodiments, the impactful variable value selection criteria is computed based on statistical properties of the variables and the scores.

Protected Class Model Interpretability System

In some embodiments, the protected class model interpretability system 150 is constructed to access the set of input variable values (and corresponding variable identifiers) for the first data set used by the evaluated model interpretability system 140, and a protected class prediction generated by the protected class modeling system 130 for the set of input variable values. In some embodiments, at least some input variable values and corresponding variable identifiers are received from at least one of the operator device 171, the data scientist device 172, and the storage device 181. In some embodiments, at least some input variable values and corresponding variable identifiers are generated by the protected class model interpretability system 150.

In some embodiments, the protected class model interpretability system 150 includes a modeling system interface constructed for communication with the modeling system 130. In some embodiments, the protected class model interpretability system 150 includes an interface constructed to receive user-selection of variables and combinations of variables and user selection of transformation information (e.g., from a an operator device 171, a data scientist device 172). In some embodiments, the operator device 171 or data scientist device 172 displays a partial dependence plot displaying the score and the input variable value on independent axes. The user may select a range of input variable values for transformation and specify a transformation function which may include a computable mapping. In some embodiments, the protected class model interpretability system 150 includes an interface that is constructed to access and display machine-selected variables and machine-selected combinations of variables and machine-generated transformation information for the purpose of reviewing a model and associated information including the machine-selected variables, machine-selected combinations of variables, and machine-generated transformation information.

In some embodiments, the protected class model interpretability system 150 includes a user interface constructed to provide data to and to receive user-specified input from a device (e.g., an operator device 171, a data scientist device 172). In some embodiments, the user interface of the protected class model interpretability system 150 is constructed to provide identifiers of variables and combinations of variables and corresponding statistical properties of the variables and combinations of variables, so as to provide information identifying the most important variables and combinations of variables (with respect to protected class predictions) to a user device (e.g., 171, 172). In some embodiments, statistical properties of the variables and combinations of variables include at least one of a computed protected class impact (generated by the protected class model interpretability system 150) and score impact (generated by the evaluated model interpretability system 140). In some embodiments, the variables and combinations of variables (and corresponding statistical properties) provided to a user device (e.g., 171, 172) are selected based on comparing a combination of statistical properties of the variables and combinations of variables. In some embodiments, the combination of statistical properties of variables is the sum of the computed protected class impact (determined by the protected class model interpretability system 150) and score impact (generated by the evaluated model interpretability system 140) of the variables and combinations of variables, with a tunable parameter. In some embodiments, the combination of statistical properties of variables is computed based on one or more of the arithmetic mean, the geometric mean, a difference, a linear combination, a polynomial function, or other computable function, without limitation. In some embodiments the tunable parameter is computed by combining statistical properties of the variables and combinations of variables by arithmetic transformation. In some embodiments, each variable or combination of variables (and corresponding statistical properties) provided to a user device (e.g., 171, 172) is provided along with a partial dependence plot depicting how the protected class prediction varies based on each variable or combination of variable values.

In some embodiments, the protected class model interpretability system 150 includes a modified input value generator that is constructed to access an original set of input variable values, generate at least one set of modified input values based on the received user-selection of variables and combinations of variables, and the received user specified transformation information, and provide each generated set of modified input values to the modeling system 130 (via a modeling system interface) for generating a protected class prediction.

In some embodiments, the protected class model interpretability system 150 includes a modified input value generator that is constructed to access an original set of input variable values, generate at least one set of modified input values based on the machine-selected variables and combinations of variables, and the machine-generated transformation information, and provide each generated set of modified input values to the modeling system 130 (via a modeling system interface) for generating a protected class prediction.

Figure 12A:
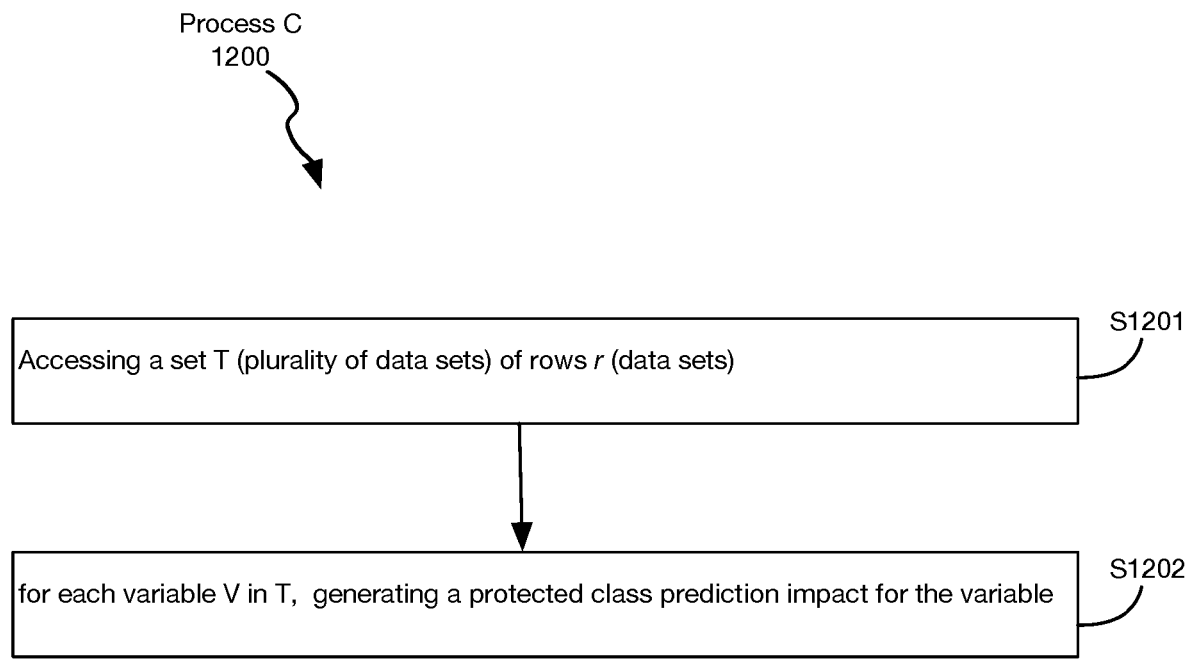
FIGS. 12A-B depict a process for determining impactful variables and their protected class prediction impact values.
Figure 12B:
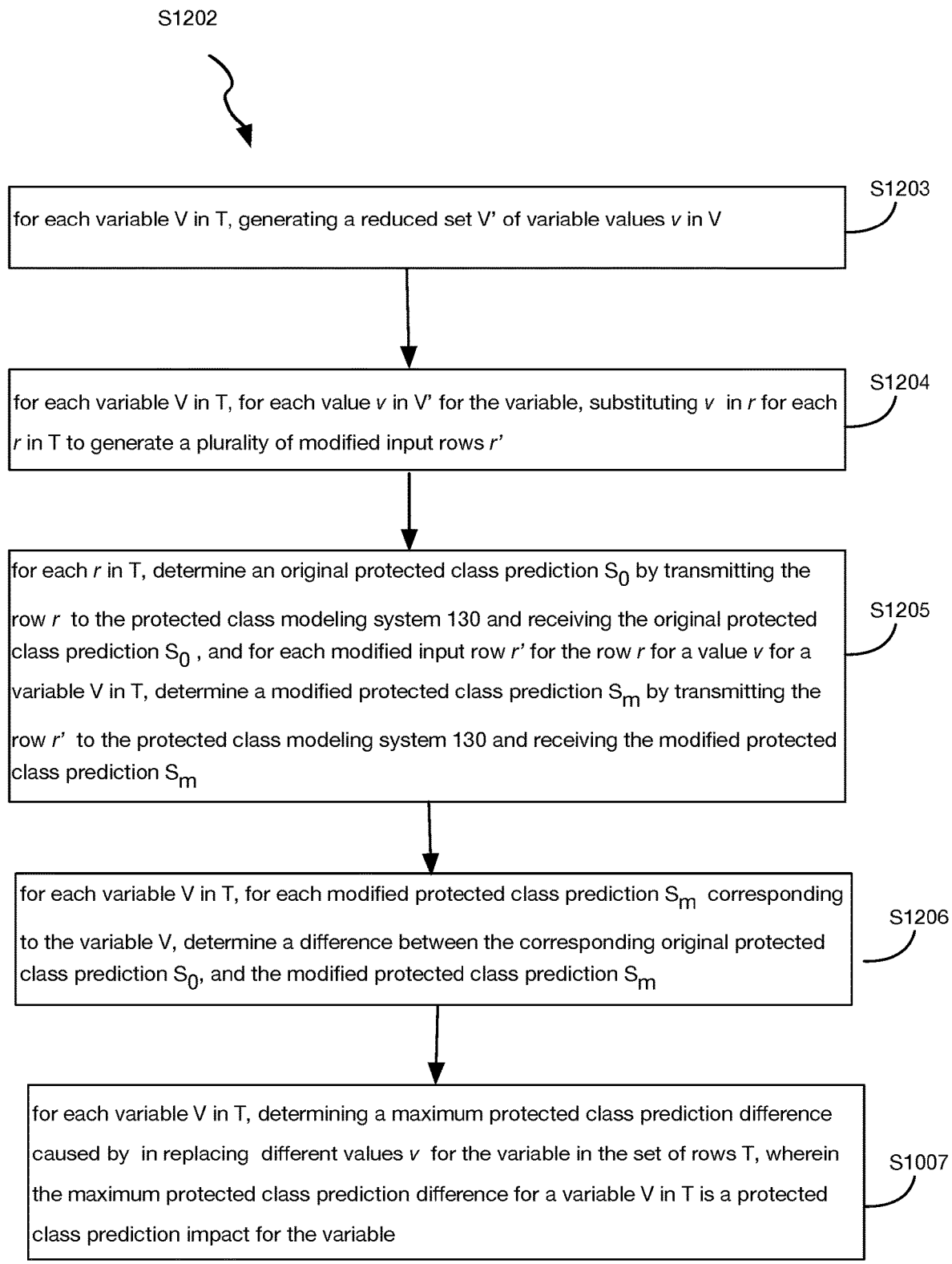

In some embodiments, the protected class model interpretability system 150 performs steps (Process 1200 of FIG. 12A) to determine the impactful variables and their score impact values as shown in FIG. 12A. In some embodiments, the Process 1200 of FIG. 12 includes: accessing a set T (plurality of data sets) of rows r (data sets) (e.g., training data sets used to train the protected class model, a random sample of previously scored data sets) (process S1201); and for each variable V in T, generating a protected class prediction impact for the variable (process S1202).

In some embodiments, process S1202 includes: for each variable V in T, generating a reduced set V' of variable values v in V (process S1203); for each variable V in T, for each value v in V' for the variable, substituting v in r for each r in T to generate a plurality of modified input rows r' (process S1204); for each r in T, determine an original protected class prediction $S_o$ by transmitting the row r to the protected class modeling system 130 and receiving the original protected class prediction $S_o$, and for each modified input row r' for the row r for a value v for a variable V in T, determine a modified protected class prediction $S_m$ by transmitting the row r' to the protected class modeling system 130 and receiving the modified protected class prediction $S_m$; (process S1205); for each variable V in T, for each modified protected class prediction $S_m$ corresponding to the variable V, determine a difference between the corresponding original protected class prediction $S_o$, and the modified protected class prediction $S_m$ (process S1206); for each variable V in T, determining a maximum protected class prediction difference caused by replacing different values v for the variable in the set of rows T, wherein the maximum protected class prediction difference for a variable V in T is a protected class prediction impact for the variable (process S1207). In some embodiments the accessed data sets T include data sets used to train the protected lass model, or some other suitable sample of input rows, e.g., a random sample of data for which a protected class prediction was previously generated, combined with the associated actual protected class.

In some embodiments, the process S1202 includes:
(b) for each variable V in T:
   (b1) computing the unique values of V or bins of V using a suitable histogram optimization method (e.g., by using a histogram optimization method described in Shimazaki and Shinomoto. Neural Comput, 2007, 19(6), 1503-1527, the contents of which is incorporated by reference herein), resulting in a reduced set V'
   (b1.1) for each value v in V'
      (b1.1.1) for each row r in T
         (b1.1.1.1) computing the original protected class prediction $s_o$ by transmitting the row r to the protected class modeling system 130 and receiving the original protected class prediction
         (b1.1.1.2) substituting v in r to create a modified input row r'
         (b1.1.1.3) computing a modified protected class prediction $s_m$ by transmitting the row r' to the protected class modeling system 130 and receiving the modified protected class prediction
         (b1.1.1.4) computing the difference in protected class prediction $d=|s_o-s_m|$
   (b2) determining the maximum protected class prediction difference caused by different values of variable V applied to each row in the training set, impact(V)=max(d) for all v in V', r in T, t;
   (b3) returning each input variable V and each protected class prediction impact(V) sorted by impact(V) descending In some embodiments, the average of max protected class prediction differences is computed to determine the protected class prediction impact. In other embodiments the difference computed in step b1.1.1.4 above is the difference between the modified protected class prediction and the maximum protected class prediction (deviance from max), and the protected class prediction impact computed in step b2 is the average deviance from max. In other embodiments the protected class prediction impact computed in step b2 is the maximum deviance from max. Other computations, such as deviance from mean, can be substituted to meet the goals of the business in assessing and determining the score impact of a variable.

In some embodiments, a modified input value generator of the system 150 is constructed to select modified input values for protected class predictions based on measures such as the estimated information gain computed based on at least two predictions produced by the modeling system 130, resulting from at least two distinct sets of modified input values. In other embodiments other distance measures may be constructed to define a metric space. In this way, the modified input value generator may be constructed to efficiently explore the input variable space using optimization methods such as simplex, gradient descent, Newton's method, simulated annealing, bayesian optimization, cross-entropy methods, evolution strategies, denoising autoencoders with estimation of distribution algorithms and other methods, without limitation, in order to reduce the number of modified inputs to be considered, without materially reducing accuracy.

In some embodiments, the protected class model interpretability system 150 performs steps (Process 1300 of FIG. 13) to determine the impactful variables and their protected class prediction impact values as shown in FIG. 13. In some embodiments, the Process 1300 of FIG. 13 includes: accessing sample of input rows S, and actual outcomes O (process S1301); computing protected class model predictions $P_O$ of the protected class model (of the modeling system 130) for each row $r_i$ in S (process S1302); computing a model accuracy metric $A_O$ by comparing the model predictions $P_O$ to the actual outcomes O by using an accuracy metric (process S1303); and for each variable v in S, determining an importance of the variable v by comparing the model accuracy metric $A_O$ with a model accuracy metric $A_V$ generated by shuffling values of v in S (process S1304).

In some embodiments, the sample of input rows S is one of a hold-out set and an evaluation set used to evaluate the protected class model when the model was originally produced.

In some embodiments, the process S1302 includes: computing the model predictions $P_o=<p_i>$ where $p_i=predict(r_i)$ for each row $r_i$ in S, where predict( ) is the model's predict function. In some embodiments, the predict function returns a number. In some embodiments, the predict function returns a classification.

In some embodiments, the process S1303 includes: computing a model accuracy metric $A_o$ (S, O, $P_o$) by comparing the model predictions $P_o$ to the actual outcomes O using a suitable accuracy metric. In some embodiments, the model accuracy metric is one of AUC (area under the receiver operating characteristic curve), Gini impurity, classification error, entropy, and log loss.

In some embodiments, the process S1304 includes: for each variable v in S: computing a modified sample of input rows S'(v) by shuffling values of v in S such that S'(v) is identical to S except that an ordering of the values of v are randomized (process S1305); computing new model predictions $P_v=<p_i>$ where $p_i=predict(r_i)$ for each row $r_i$ in S'(v), the modified version of S (process S1306); computing a model accuracy metric $A_v$ (S, O, $P_v$) by comparing the model predictions $P_v$ to the actual outcomes O using the same accuracy metric as in process S1303 (process S1307); and comparing $A_v$ with $A_o$ to determine the importance of variable v (process S1308). In some embodiments, comparing $A_v$ with $A_o$ to determine the importance of variable v includes determining importance (v) as the absolute value of the difference between $A_v$ and $A_o$ (e.g., importance(v)=$|A_v-A_o|$).

In some embodiments, an operator of the operator device 171 selects groupings of variables to be evaluated together by the model evaluation system 120, and provides information identifying the selection of groupings of variables to the model evaluation system 120. In some embodiments, the operator device 171 presents a user interface for receiving the selection of groupings of variables from the operator. The protected class model interpretability system 150 receives the user-selected grouping of variables. The Process 1300 (FIG. 13) described above is executed, except that instead of shuffling a single variable v, the shuffling occurs on each group of variables, preserving the row-wise relationship of the variable values within the group of variables. More precisely, let $G_i=<v_1 \ldots v_n>$ be a grouping of variables in S. For each $G_i$, the protected class model interpretability system 150 computes S'($G_i$) as follow:
(a) Initializing S'($G_i$) to the empty set
(b) Gathering $G_{ij}$ the values of each variable in $G_i$ occurring in each row $r_j$ in S;

(c) For each row $r_k$ in S,
  (b1) choosing a random number $\hat{j}$ between o and length ($G_{ij}$)
  (b2) substituting values of $G_{ij}$ in $r_k$ to produce $r'_k$
  (b3) appending $r'_k$ to $S'(G_i)$
  (b4) removing $G_{ij}$ from $G_i$ In this way, the conditional distributions within each group of variables $G_i$ may be preserved when computing $S'(G_i)$. The Process 1300 (FIG. 13) may then be executed, computing new model protected class predictions, a model accuracy metric, and a difference in metric as described, allowing the system 150 to determine the importance of a group of variables.

In some embodiments, the protected class model interpretability system 150 includes an impactful variable/value identifier that is constructed to receive the original prediction for the original input variable values from the modeling system 130 via an interface, receive modified protected class predictions for each set of modified input variable values (for which an original prediction was generated) from the modeling system 130, receive each modified set of input variable values from the modified input value generator, and identify one or more impactful variables and/or one or impactful variable values. In some embodiments, the impactful variable/value identifier is constructed to identify the one or more impactful variables and/or the one or impactful variable values by comparing each modified prediction (for a changed variable or plurality of variables in the corresponding modified set) with the original prediction, and selecting a changed variable (or plurality of variables) based on impactful variable selection criteria and/or variable value selection criteria. The impactful variable/value identifier is constructed to provide information specifying each identified impactful variable to the disparate impact evaluator 160. In some embodiments, the impactful variable selection criteria is user-specified criteria. In some embodiments, the impactful variable selection criteria is machine-generated criteria. In some embodiments, the impactful variable value selection criteria is user-specified criteria. In some embodiments, the impactful variable value selection criteria is machine-generated criteria.

Disparate Impact Evaluator

In some embodiments, the set of variables that impact protected class predictions across all of the data sets includes both identifiers of individual variables that impact protected class predictions in isolation and identifiers of combinations of variables that impact protected class predictions in combination. In some embodiments, the set of variables that impact protected class predictions across all of the data sets includes identifiers of individual variables that impact protected class predictions in isolation. In some embodiments, the set of variables that impact protected class predictions across all of the data sets includes identifiers of combinations of variables that impact protected class predictions in combination.

In some embodiments, the set of variables evaluated for disparate impact includes variables selected based on input to a user device 171 172. In other embodiments, the set of variables evaluated are selected automatically by the Model Evaluation System 120, based on statistical properties of the variables.

In some embodiments, the set of variables that impact modeling system scores across all of the data sets includes both identifiers of individual variables that impact modeling system scores in isolation and identifiers of combinations of variables that impact modeling system scores. In some embodiments, the set of variables that impact modeling system scores across all of the data sets includes identifiers of individual variables that impact modeling system scores in isolation. In some embodiments, the set of variables that impact modeling system scores across all of the data sets includes identifiers of combinations of variables that impact modeling system scores in combination.

In some embodiments, the disparate impact evaluator 160 selects input variables and combinations of input variables for evaluation based on comparing the contribution of each variable or combination of variables in a first model with the contribution of each variable or combination of variables in a second model.

For illustration, the first model may be a model currently used by a financial institution for making credit decisions; the second model may be a new model in consideration for potential use by a financial institution for making credit decisions. The disparate impact evaluator 160 may perform a model differencing to determine which variable contributions changed the most between the first and the second model and select those variables that changed the most, for evaluation.

In some embodiments, the disparate impact evaluator 160 receives variable identifiers and importance of each variable used in a first model from the evaluated model interpretability system 140; it further receives variable identifiers and importance of each variable used in a second model, from the evaluated model interpretability system 140; the disparate impact evaluator 160 compares the variable identifiers and importance of each variable used in the first and second model and further selects the input variables to evaluate for disparate impact based on the comparing step. In this way, the disparate impact evaluator 160 may reduce the computation required to perform the disparate impact evaluation. It may readily be appreciated by a practitioner with ordinary skill in the art that other optimization methods may be used to reduce the computation required to produce disparate impact analysis.

In some embodiments, for each identifier in the set of variables that impact protected class predictions across all of the data sets, the disparate impact evaluator 160 determines whether the identifier is also included in the set of variables that impact modeling system scores across all of the data sets. In some embodiments, the disparate impact evaluator 160 ranks the variables (individual variables, variable combinations) that impact modeling system scores across all of the data sets according to score impact, and in a case where an identifier in the set of variables that impact protected class predictions across all of the data sets is also included in the set of variables that impact modeling system scores across all of the data sets, the identifier is stored in association with the score impact ranking. In some embodiments, the disparate impact evaluator 160 ranks the variables (individual variables, variable combinations) that impact protected class predictions across all of the data sets according to protected class prediction impact, and stores an identifier of the variable (individual variable, variable combination) in association with the protected class prediction impact ranking.

In some embodiments, the disparate impact evaluator 160 provides the set of variables (individual variables, variable combinations) (e.g., the set of variables of FIG. 9B) that impact protected class predictions across all of the data sets to an operator device (e.g., 171 of FIG. 1A). In some embodiments, the disparate impact evaluator 160 provides the set of variables that impact protected class predictions across all of the data sets to an operator device (e.g., 171 of FIG. 1A), along with the score impact ranking for each variable (or combination of variables). In some embodiments, the disparate impact evaluator 160 provides the set of variables that impact protected class predictions across all of the data sets to an operator device (e.g., 171 of FIG. 1A), along with the score impact ranking and the prediction impact ranking for each variable (individual variables, variable combinations) (e.g., as shown in FIG. 9E).

In some embodiments, for each variable (individual variables, variable combinations) of the set of variables that impact protected class predictions across all of the data sets, in a case where the score impact ranking of a variable (individual variables, variable combinations) is below a score impact threshold, the disparate impact evaluator 160 modifies a model (scorer) (e.g., 212a of FIGS. 3A and 3B) of the modeling system by removing the variable (individual variables, variable combinations) and evaluating the modeling system with the modified model as described herein.

In some embodiments, for each variable (individual variables, variable combinations) of the set of variables that impact protected class predictions across all of the data sets, in a case where the prediction impact ranking of a variable (individual variables, variable combinations) is above a prediction impact threshold, the disparate impact evaluator 160 modifies a model (scorer) (e.g., 212a of FIGS. 3A and 3B) of the modeling system by removing the variable (individual variables, variable combinations) and evaluating the modeling system with the modified model as described herein.

In some embodiments, for each variable (individual variables, variable combinations) of the set of variables that impact protected class predictions across all of the data sets, in a case where the score impact ranking of a variable (individual variables, variable combinations) is below a score impact threshold and the prediction impact is above a prediction impact threshold, the disparate impact evaluator 160 modifies a model (scorer) (e.g., 212a of FIGS. 3A and 3B) by removing the variable (individual variables, variable combinations) and evaluating the modeling system with the modified model as described herein.

In other embodiments, for each variable (individual variables, variable combinations) of the set of variables that impact protected class predictions across all of the data sets, the score impact and prediction impact are combined to produce an overall impact, for example, by computing a linear combination. In a case where the overall impact of a variable (individual variables, variable combinations) is above an overall impact threshold, the disparate impact evaluator 160 modifies a model (scorer) (e.g., 212a of FIGS. 3A and 3B) by removing the variable (individual variables, variable combinations) and evaluating the modeling system with the modified model as described herein.

In some embodiments, the score impact threshold, the prediction impact threshold, or the overall impact threshold (collectively, the thresholds), may be computed automatically by the disparate impact evaluator 160, based on statistical properties of the score impacts, prediction impacts, or overall impacts (collectively, the scores).

In some embodiments, the disparate impact evaluator 160 computes the thresholds automatically by detecting a precipitous drop in the scores based on executing the following steps:

(a) first, sorting the scores, descending;
(b) next, computing the slope of the score values on all subsequences of sorted scores, e.g., by summing the scores and dividing by the length of the subsequence;
(d) next, comparing the slopes computed in step (b) with each other by computing the pairwise difference of each slope corresponding to sequences of the same length;
(e) computing the maximum difference in slopes and the index within the sequence of sorted scores where the maximum difference in slope computed in step (d) occurs;
(f) returning the score value corresponding index computed in step (e).

In some embodiments, the disparate impact evaluator 160 computes the thresholds automatically by detecting a precipitous drop in the scores based on the following steps:

(a) first, sorting the score impacts, prediction impact scores, or a combination of score impact and prediction impact scores, ascending;
(b) second, fitting the sorted list of scores to a logistic curve, e.g., by searching the parameter space resulting in the minimum mean squared error, thus determining a logistic function $$f(x) = \frac{L}{1 + e^{-k(x-x_0)}}$$

that minimizes the mean squared error;
(c) returning $x_0$

In other embodiments, scores and combinations of scores are modeled using other methods, such as by fitting a polynomial, computing the first derivative and then computing the local extrema to determine a threshold. In other embodiments scores and combinations of scores are modeled using tree-based methods such as CART, random forest, gradient boosted trees, etc., and a threshold is computed based on nodes selected from the resulting tree models.

In some embodiments, for each evaluated model of the modeling system, the disparate impact evaluator 160 provides the operator device (e.g., 171) with the corresponding set of variables that impact protected class predictions across all of the data sets, and the score impact ranking and the prediction impact ranking for each variable (individual variables, variable combinations), and the disparate impact evaluator 160 receives from the operator device a user-selection of one of the evaluated models.

Modeling System 110

FIGS. 2A and 2B are schematic representations of a modeling system, according to embodiments. FIG. 3A is a schematic representation of a single scorer modeling engine, according to embodiments. FIG. 3B is a schematic representation of an ensembled modeling engine with multiple scoring modules, according to embodiments.

In some embodiments, the modeling system 110 is a modeling system that uses one of the following types of algorithms: population sampling, unsupervised methods such as principal components analysis, factor analysis, k-means and other clustering analysis, t-sne, latent and quadratic dirichlet allocation, outlier and anomaly detection, and supervised classification and regression methods such as decision trees, random forest, gradient boosted trees, neural networks, multilayer or "deep" networks, regularized regression, support vector machines, bayesian classifiers, k-nearest neighbors, Follow the regularized leader, greedy step averaging (GSA), time-decaying adaptive prediction (TDAP), factorization machines, gaussian processes, and online learning.

In some embodiments, the modeling system 110 is a neural-network modeling system.

In some embodiments, the modeling system 110 is an XGBoost modeling system.

In some embodiments, the modeling system 110 is a follow the regularized leader (FTRL) modeling system.

In some embodiments, the modeling system 110 is a regression model such as logistic regression, linear regression, and ridge regression.

In some embodiments, the modeling system 110 is a tree model such as classification and regression trees (CART), gradient boosted trees, random forests.

In some embodiments, the modeling system 110 is a factorization machine, such as a field-aware factorization machine.

In some embodiments, the modeling system 110 is a support vector machine

In some embodiments, the modeling system 110 uses follow the regularized leader (FTRL).

In some embodiments, the modeling system 110 uses greedy step averaging (GSA), time-decaying adaptive prediction (TDAP).

In some embodiments, the modeling system 110 is a neural network, such as a multilayer perceptron, recurrent net, or deep network.

In some embodiments, the modeling system 110 is Random Forest modeling system.

In some embodiments, the modeling system 110 is a Boosted linear modeling system.

In some embodiments, the modeling system 110 is a Ensemble modeling system which is built upon one or more of submodels of any type.

In some embodiments, the modeling system 110 runs on a separate device from the model evaluation system 120 and variables and scores are transmitted between the modeling system 110 and model evaluation system 120 via a computer network. In other embodiments the modeling system 110 is a library or method called by the model evaluation system 120 running on the same computer. In either case, the modeling methods used by the modeling system 110 need not be known to the operators of the model evaluation system 120. In some embodiments, the modeling system 110 is a legacy modeling system, a third-party modeling system, an existing modeling system, a "black box" modeling system, or any modeling system that can be accessed by the model evaluation system 120. In some embodiments the data scientist device 172 is constructed to provide the model evaluation system 120 details required to access a modeling system 110 for evaluation.

In some embodiments, the modeling system 110 is constructed to receive values of discrete variables. In some embodiments, the modeling system 110 is constructed to receive values of continuous variables. In some embodiments, the modeling system 110 automatically refits its models by using recent data based on a user-selectable schedule. In other embodiments the modeling system 110, automatically refits its models by using recent data based on a schedule determined by a statistical method. In some embodiments this model refitting triggers an automated execution of the model evaluation system 120 and the results of which are transmitted to an operator device 171 in the form of reports used to evaluate the model refit.

In some embodiments, the modeling system 110 is constructed to receive integer variable values. In some embodiments, the modeling system 110 is constructed to receive floating point variable values. In some embodiments, the modeling system 110 is constructed to receive character variable values. In some embodiments, the modeling system 110 is constructed to receive string variable values. In some embodiments, the modeling system 110 is constructed to receive vectors. In some embodiments, the modeling system 110 is constructed to receive matrices. In some embodiments, the modeling system 110 is constructed to receive images. In some embodiments, the modeling system 110 is constructed to receive sounds. In some embodiments, the modeling system 110 is constructed to receive web browsing histories. In some embodiments, the modeling system 110 is constructed to receive search histories. In some embodiments, the modeling system 110 is constructed to receive financial data, including, without limitation: credit bureau data, including, credit score, credit utilization history, default history, delinquency history, law enforcement history; transaction histories, including purchase histories, payment histories; and other data sources that may be acquired through a credit reporting agency or any third party. In some embodiments, the modeling system 110 is constructed to receive data collected by a data collection module which may collect data via methods such as a beacon or pixel, a directed web crawl, search, or lookup in a database. In some embodiments, the modeling system 110 is constructed to receive social media data, including, without limitation: a facebook profile, a twitter history, linkedin profile, a news feed, a publication history, and other social media sources.

In some embodiments, the modeling system 110 includes a modeling engine (e.g, 212 of FIG. 2A). In some embodiments, the modeling system 110 includes a data collector (e.g, 211 of FIG. 2A). In some embodiments, the data collector 211 includes a data cleaner 211a. In some embodiments, the data collector 211 includes a feature generator 211b. In some embodiments, the data collector 211 includes a scraper. In some embodiments, the data collector 211 includes a crawler and a search engine. In some embodiments, the data collector 211 includes a query generator and a query execution engine for collecting data from external sources such as databases and search engines. In some embodiments, the data collector 211 includes user provisioning and credential management. In some embodiments, the data collector 211 executes predetermined plans for gathering information that include variable substitution, recursion, and branching. In some embodiments, the feature generator 211b performs feature transformations including, without limitation: substitution, imputation, anomaly/outlier detection, maximum entropy, colinearity clustering, normalization, convolution, projection, dimensionality reduction, scaling, mapping, production rules such as those that can be expressed in Backus-Naur form, algebraic transformations, statistical transformations, and transformations based on the transmission of the input data to an external system via a computer network and the reception of the transformed data in a predetermined format.

Data Collector 111

In some embodiments, the data collector is constructed to receive user-provided information (e.g., loan application information) from one of a user device and an application server and access data from one or more data sources by using the user-provided information. In some embodiments, a data source includes a credit bureau system. In some embodiments, a data source includes web browsing or ecommerce data gathered by a data aggregator or collected by a publisher or ecommerce site. In some embodiments, a data source includes transactions data including purchases and payments provided by a financial services company such as a bank or credit card issuer.

In some embodiments, the data collector is constructed to generate a set of input variable values based on the data accessed from the one or more data sources. In some embodiments, the set of input variable values is a set of key-value pairs that includes a variable identifier as a key and a variable value as the key. In some embodiments, the input variables are encoded based in a delimited format.

In some embodiments, a data cleaner (e.g., 211a) is constructed to process raw data to generate processed data. In some embodiments, the data collector is constructed to generate the set of input variable values based on the processed data.

In some embodiments, a feature generator (e.g., 211b) is constructed to generate the input variables and corresponding values from the processed data provided by the data cleaner (e.g., 211a).

Modeling Engine 212

In some embodiments, the evaluated modeling engine 212 includes a scorer 212a (FIG. 3A). In some embodiments, the modeling engine 212 includes an ensembler 212b (FIG. 3B). In other embodiments the evaluated modeling engine 212 is constructed by a third party software provider.

In some embodiments, the modeling engine 212 is a modeling engine that is constructed to use a machine learning modeling algorithm such as: population sampling, unsupervised methods such as principal components analysis, factor analysis, k-means and other clustering analysis, t-sne, latent and quadratic dirichlet allocation, outlier and anomaly detection, and supervised classification and regression methods such as decision trees, random forest, gradient boosted trees, neural networks, regularized regression, support vector machines, bayesian classifiers, k-nearest neighbors, Follow the regularized leader, greedy step averaging (GSA), time-decaying adaptive prediction (TDAP), factorization machines, gaussian processes, ensembling methods, and online learning.

In some embodiments, the modeling engine 212 is constructed to receive values of discrete variables. In some embodiments, the modeling engine 212 is constructed to receive values of continuous variables. In some embodiments, the modeling engine 212 is constructed to receive integer variable values. In some embodiments, the modeling engine 212 is constructed to receive floating point variable values. In some embodiments, the modeling engine 212 is constructed to receive character variable values. In some embodiments, the modeling engine 212 is constructed to receive string variable values. In some embodiments, the modeling engine 212 is constructed to receive a vector. In some embodiments, the modeling engine 212 is constructed to receive a matrix or vector of matrices. In some embodiments the modeling engine 212 is constructed to receive an image. In some embodiments the modeling engine 212 is constructed to receive a sound.

In some embodiments, the scorer 212a includes a plurality of scoring modules. In some embodiments, the plurality of scoring module include one or more of tree models, regression models, linear models, neural network models, and factorization machines. In some embodiments, the plurality of scoring module include two or more of tree models, regression models, linear models, neural network models, and factorization machines.

In some embodiments, the scorer 212a includes a single scoring modules that is constructed to generate a score for a set of input variable values (FIG. 3A). In some embodiments, the scorer 212a includes a plurality of scoring modules that are each constructed to generate a sub-score for at least a subset of input variable values, and each sub-score is provided to an ensembler (e.g., 212b) that generates an ensembled score. In some embodiments the ensembler is built via stacking or blending or both, and other combinations of ensembling methods, without limitation, where model weights are determined based on the execution of a machine learning model, or are based on tunable parameters which may be set by the operator, determined based on computed mapping, or determined by automated processes such as grid-search, Bayesian optimization, randomized grid search. In some embodiments, the model weights are determined based on execution a machine learning model that uses at least one of the following types of algorithms: population sampling, unsupervised methods such as principal components analysis, factor analysis, k-means and other clustering analysis, t-sne, latent and quadratic dirichlet allocation, outlier and anomaly detection, and supervised classification and regression methods such as decision trees, random forest, gradient boosted trees, neural networks, regularized regression, support vector machines, bayesian classifiers, k-nearest neighbors, Follow the regularized leader, greedy step averaging (GSA), time-decaying adaptive prediction (TDAP), factorization machines, gaussian processes and online learning algorithms.

In other embodiments, the modeling engine is executed via a data processing system comprised of multiple data processing nodes connected by a computer network, configured for parallel ensemble execution, wherein each computing node executes a subset of the sub-scores, so as to reduce the time required to compute an ensembled score. In other embodiments, the modeling engine is constructed of multiple ensembles of models (scorers), a selector determines which model (scorer) to use based on the input variables according to predetermined rules, and returns the score from the selected ensemble and its submodels. In other embodiments the modeling engine is executed via map-reduce. In some embodiments, the modeling engine is deployed via distributed networks so as to provide increased capacity and fault-tolerance.

In some embodiments, the scorer 212a includes a pre-processing module for each scoring module. In some embodiments, each pre-processing module is constructed to process the input variable values into a format suitable for use by the corresponding scoring module. In some embodiments, each pre-processing module is constructed to determine whether to execute the corresponding sub-model based on the input variable values.

In some embodiments, the scorer 212 determines a score using at least one of the following algorithms: a population sampling, unsupervised methods such as principal components analysis, factor analysis, k-means and other clustering analysis, t-sne, latent and quadratic dirichlet allocation, outlier and anomaly detection, supervised classification and regression methods such as decision trees, random forest, gradient boosted trees, neural networks, regularized regression, support vector machines, bayesian classifiers, k-nearest neighbors, Follow the regularized leader, greedy step averaging (GSA), time-decaying adaptive prediction (TDAP), factorization machines, gaussian processes and online learning algorithms.

Protected Class Modeling System

In some embodiments, the protected class modeling system 130 is similar to the modeling system 110. In some embodiments, the protected class modeling system 130 is a same type of modeling system as the modeling system 110.

In some embodiment, the protected class scorer (model) 512*a* uses the same variables as the evaluated scorer 212*a*.

2. METHODS

Figure 7A:
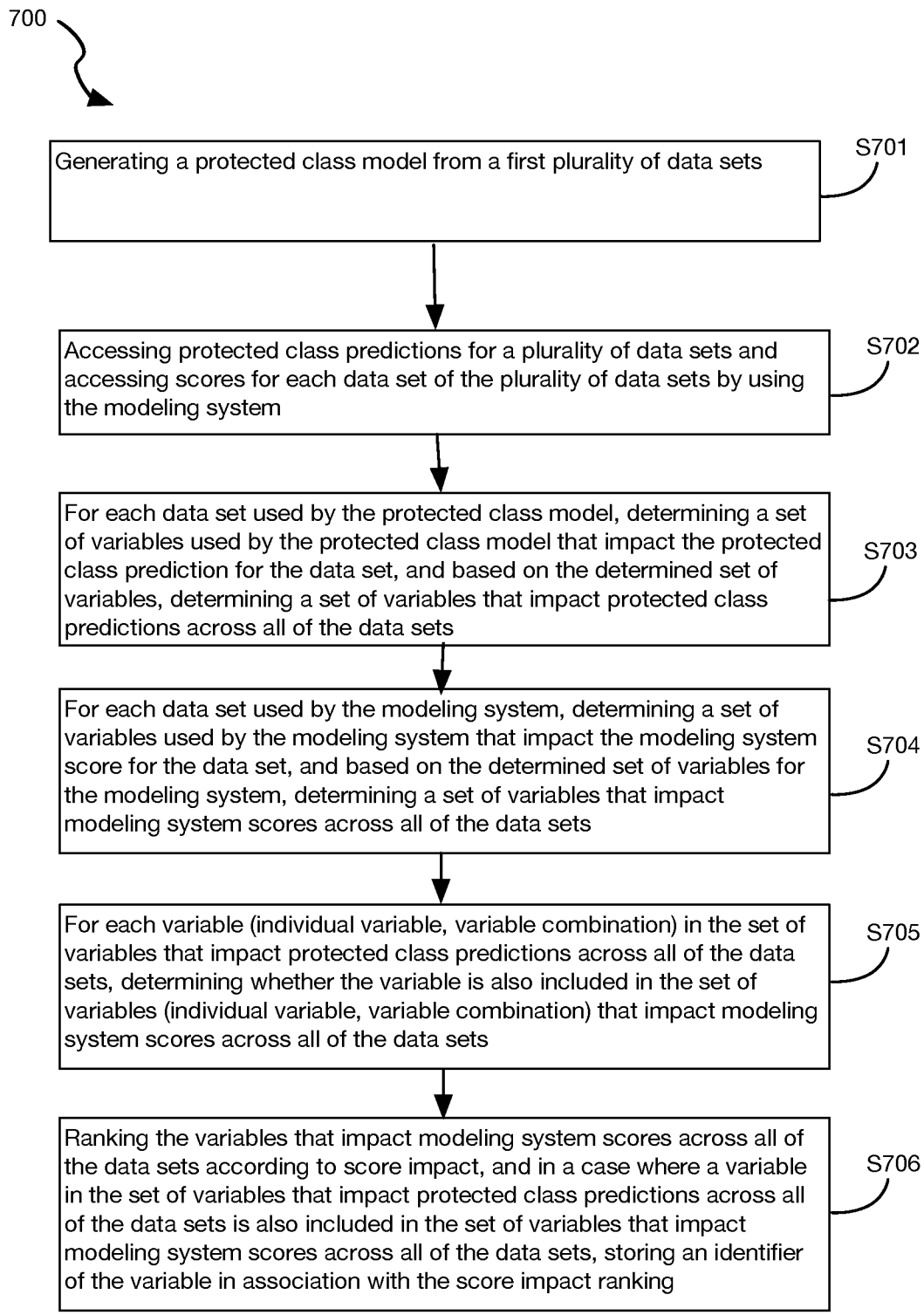
FIGS. 7A-C are representations of a method, according to embodiments.
Figure 7B:
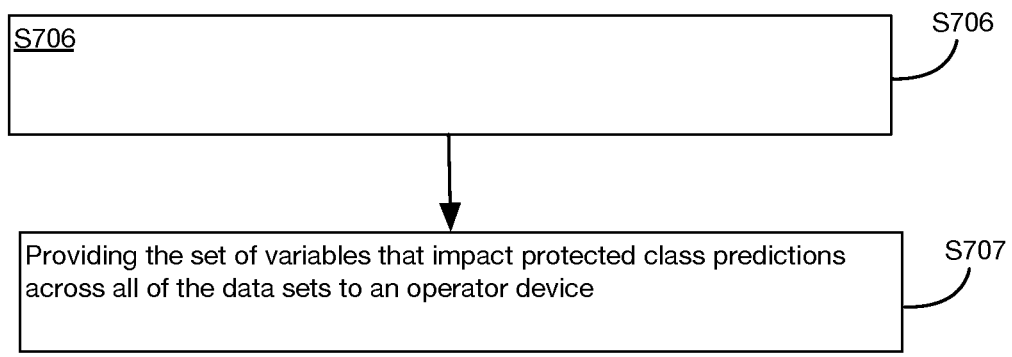
Figure 7C:
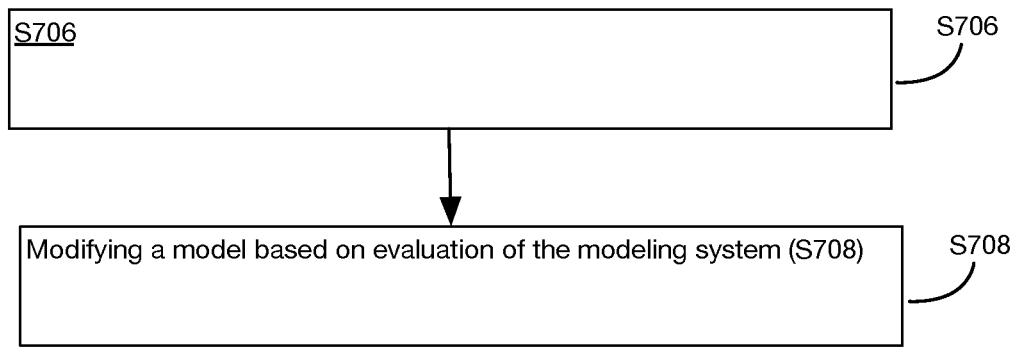

FIGS. 7A-C are representations of a methods, according to embodiments. In some embodiments, the method 700 of FIGS. 7A-C are performed by the model evaluation system 120 of FIG. 1A.

In some embodiments, the method 700 includes: generating a protected class model (e.g., a model used by the modeling system 130) from a first plurality of data sets (e.g., of 181), wherein the protected class model uses a set of variables used by a modeling system that is to be evaluated (e.g., 110), and wherein the protected class model is constructed generate a protected class prediction that indicates whether a person associated with a data set is a member of a protected class being evaluated (process S701); accessing protected class predictions for a plurality of data sets (either the plurality of data sets used to generate the protected class model or a new plurality of data sets), and accessing scores for each data set of the plurality of data sets by using the modeling system (e.g., 110 of FIG. 1A), wherein a protected class prediction for a data set indicates whether a person associated with the data set is a member of a protected class being evaluated (process S702); for each data set used by the protected class model, determining a set of variables used by the protected class model that impact the protected class prediction for the data set, and based on the determined set of variables, determining a set of variables that impact protected class predictions across all of the data sets (process S703); for each data set used by the modeling system (e.g., 110), determining a set of variables used by the modeling system (the modeling system and the protected class model use the same set of variables) that impact the modeling system score for the data set, and based on the determined set of variables for the modeling system, determining a set of variables that impact modeling system scores across all of the data sets (process S704); for each variable (individual variable, variable combination) in the set of variables that impact protected class predictions across all of the data sets, determining whether the variable is also included in the set of variables (individual variable, variable combination) that impact modeling system scores across all of the data sets (process S705); and ranking the variables (individual variable, variable combination) that impact modeling system scores across all of the data sets according to score impact, and in a case where a variable (individual variable, variable combination) in the set of variables that impact protected class predictions across all of the data sets is also included in the set of variables (individual variable, variable combination) that impact modeling system scores across all of the data sets, storing an identifier of the variable (individual variable, variable combination) in association with the score impact ranking (process S706).

In some embodiments, a protected class model generation system (e.g., 191) of the model evaluation system performs the process S701.

In some embodiments, a protected class model interpretability system (e.g., 150) of the model evaluation system accesses the protected class predictions for the plurality of data sets (either the plurality of data sets used to generate the protected class model or a new plurality of data sets) (process S702). In some embodiments, an evaluated model interpretability system (e.g., 140) of the model evaluation system accesses the scores for each data set of the plurality of data sets by using the modeling system (process S702).

In some embodiments, a protected class model interpretability system (e.g., 150) of the model evaluation system performs the process S703.

In some embodiments, an evaluated model interpretability system (e.g., 140) of the model evaluation system performs the process S704.

In some embodiments, a disparate impact evaluator (e.g., 160) of the model evaluation system performs the process S705. In some embodiments, a disparate impact evaluator (e.g., 160) of the model evaluation system performs the process S706.

Providing Results to Operator

In some embodiments, the method 700 (FIG. 7B) further includes: providing the set of variables that impact protected class predictions across all of the data sets (e.g., the information depicted in FIG. 9B, 9E) to an operator device (e.g., 171 of FIG. 1A) (process S707). In some embodiments, the model evaluation system provides the set of variables that impact protected class predictions across all of the data sets to an operator device (e.g., 171 of FIG. 1A), along with the score impact ranking for each variable (or combination of variables). In some embodiments, the model evaluation system provides the set of variables that impact protected class predictions across all of the data sets to an operator device (e.g., 171 of FIG. 1A), along with the score impact ranking and the prediction impact ranking for each variable (or combination of variables) (e.g., FIG. 9E).

In some embodiments, a disparate impact evaluator (e.g., 160) of the model evaluation system performs the process S707.

Modifying Model

In some embodiments, the method 700 (FIG. 7C) further includes: modifying a model based on evaluation of the modeling system (e.g., 110) (process S708). In some embodiments, the process S708 includes: for each variable (or combination of variables) of the set of variables that impact protected class predictions across all of the data sets, in a case where the score impact ranking of a variable (or combination of variables) is below a score impact threshold, modifying a model (scorer) (e.g., 212*a* of FIGS. 3A and 3B) of the modeling system by removing the variable (or combination of variables) and evaluating the modeling system with the modified model as described herein.

In some embodiments the modification of a model (scorer) of the modeling system in process S708 occurs by applying transformation rules which, in some embodiments, replace an input variable with a value determined by the model evaluation system 120. In this way, the result of modifying the model may be achieved without actually modifying the model. This is useful, for instance, when the model is a legacy model that cannot be easily modified.

In some embodiments, the process S708 includes: for each variable (or combination of variables) of the set of variables that impact protected class predictions across all of the data sets, in a case where the prediction impact ranking of a variable (or combination of variables) is above a prediction impact threshold, modifying a model (scorer) (e.g., 212*a* of FIGS. 3A and 3B) of the modeling system by removing the variable (or combination of variables) and evaluating the modeling system with the modified model as described herein.

In some embodiments, the process S708 includes: for each variable (or combination of variables) of the set of variables that impact protected class predictions across all of the data sets, in a case where the score impact ranking of a variable (or combination of variables) is below a score impact threshold and the prediction impact is above a prediction impact threshold, modifying a model (scorer) (e.g., 212a of FIGS. 3A and 3B) by removing the variable (or combination of variables) and evaluating the modeling system with the modified model as described herein.

In some embodiments, the process S708 includes: for each evaluated model of the modeling system, providing the operator device (e.g., 171) with the corresponding set of variables that impact protected class predictions across all of the data sets, and the score impact ranking and the prediction impact ranking for each variable (or combination of variables), and receiving from the operator device a user-selection of one of the evaluated models.

In some embodiments, a disparate impact evaluator (e.g., 160) of the model evaluation system performs the process S708.

Figure 8:
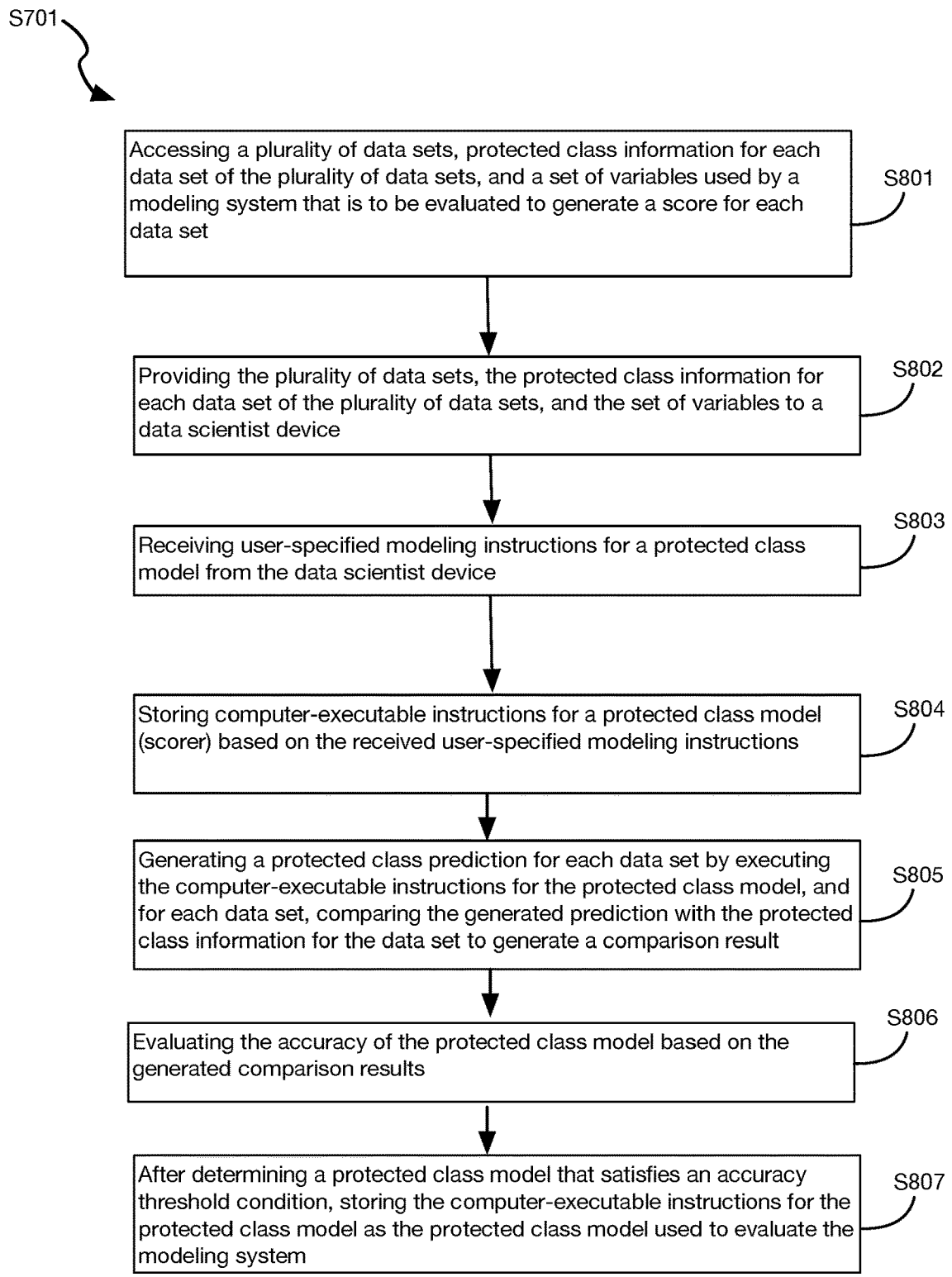
FIG. 8 is a representation of a method, according to embodiments.

Generating a Protected Class Model (FIG. 8)

In some embodiments, generating a protected class model (process S701) includes: accessing a plurality of data sets (e.g., from 181), protected class information for each data set of the plurality of data sets (e.g., from 181, 192, 183), and a set of variables used by a modeling system that is to be evaluated (e.g., from 110, 182) to generate a score for each data set (process S801); providing the plurality of data sets, the protected class information for each data set of the plurality of data sets, and the set of variables to a data scientist device (e.g., 172 of FIG. 1A) (process S802); receiving user-specified modeling instructions for a protected class model from the data scientist device (process S803); storing computer-executable instructions for a protected class model (scorer) (e.g., 512a of FIGS. 5A and 5B) based on the received user-specified modeling instructions (process S804); generating a protected class prediction for each data set by executing the computer-executable instructions for the protected class model, and for each data set, comparing the generated prediction with the protected class information for the data set to generate a comparison result (process S805); evaluating the accuracy of the protected class model based on the generated comparison results (process S806); after determining a protected class model that satisfies an accuracy threshold condition, storing the computer-executable instructions for the protected class model as the protected class model used to evaluate the modeling system (process S807).

In some embodiments, accessing protected class information for each data set of the plurality of data sets includes using the protected class predictor 192 to access the plurality of data sets (e.g., from 181), and determine a protected class prediction for each data set (of the plurality of data sets) by using a set of variables of the data set. In some embodiments, the protected class predictor 192 determines a protected class prediction for each data set (of the plurality of data sets) by using a set of variables of the data set that is different from a set of variables used by the modeling system 110. In some embodiments, the protected class predictor 192 uses a CFPB (Consumer Financial Protection Bureau) BISG (Bayesian Improved Surname Geocoding) process to determine protected class predictions. In some embodiments, the variables included in the plurality of accessed data sets do not include variables that explicitly identify membership in a protected class.

In some embodiments, the variables included in the plurality of accessed data sets do not include variables that explicitly identify race, ethnicity, national origin, religion, sex, sexual orientation, age, and disability status. In some embodiments, the variables included in the plurality of accessed data sets do not include variables that explicitly identify at least one of race, ethnicity, national origin, religion, sex, sexual orientation, age, and disability status.

Determining a Set of Variables that Impact the Protected Class Prediction

In some embodiments, the process S703 is similar to at least one of the processes described herein with respect to the protected class model interpretability system 150. In some embodiments, the process S703 includes the Process C (FIG. 12) described herein with respect to the protected class model interpretability system 150. In some embodiments, the process S703 includes the Process D (FIG. 13) described herein with respect to the protected class model interpretability system 150.

In some embodiments, the process S703 includes: for each data set used by the modeling system (e.g., 110), determining a set of variables used by the protected class model that impact the protected class prediction (e.g., FIG. 9A) for the data set by: for a first set of input variable values of the data set, generating one or more sets of modified input variable values for the modeling system (e.g., 110); determining a protected class prediction for each generated set of modified input variable values by using the protected class modeling system (e.g., 130); for each set of modified input variable values, determining whether the set satisfies a selection condition based on a comparison between an original protected class prediction of the first set of input variables and a protected class prediction for the set of modified input variable values, and responsive to determination that the set satisfies the selection condition, selecting input variable identifiers of modified variables in the set, the selected input variable identifiers identifying variables that impact the protected class prediction for the data set.

In some embodiments, the process S703 includes: based on the identified variables that impact the protected class prediction for each data set, determining a set of variables that impact protected class predictions across all of the data sets (e.g., FIG. 9B). In some embodiments, determining a set of variables that impact protected class predictions across all of the data sets includes: for each variable, determining a number of data sets for which the variable impacts the protected class prediction; ranking the variables based on the number of data sets for which the variable impacts the protected class prediction, and selecting a variable as a variable that impacts protected class predictions across all of the data sets based on the ranking.

Determining a Set of Variables that Impact the Modeling System Score

In some embodiments, the process S704 is similar to at least one of the processes described herein with respect to the evaluated model interpretability system 1400. In some embodiments, the process S704 includes the Process A (FIG. 10) described herein with respect to the evaluated model interpretability system 140. In some embodiments, the process S704 includes the Process B (FIG. 11) described herein with respect to the evaluated model interpretability system 140.

In some embodiments, the process S704 includes: for each data set used by the modeling system (e.g., 110), determining a set of variables used by the modeling system that impact the modeling system score for the data set (e.g., FIG. 9C) by: for a first set of input variable values of the data set, generating one or more sets of modified input variable values for the modeling system (e.g., 110); scoring each generated set of modified input variable values by using the modeling system; for each set of modified input variable values, determining whether the set satisfies a selection condition based on a comparison between an original score of the first set of input variables and a score for the set of modified input variable values, and responsive to determination that the set satisfies the selection condition, selecting input variable identifiers of modified variables in the set, the selected input variable identifiers identifying variables that impact the modeling system score for the data set.

In some embodiments, the process S704 includes: based on the identified variables that impact the modeling system score for each data set, determining a set of variables that impact modeling system score across all of the data sets (e.g., FIG. 9C). In some embodiments, determining a set of variables that impact modeling system scores across all of the data sets includes: for each variable, determining a number of data sets for which the variable impacts the modeling system score; ranking the variables based on the number of data sets for which the variable impacts the modeling system score, and selecting a variable as a variable that impacts modeling system scores across all of the data sets based on the ranking.

Data Sets and Evaluated Modeling System

In some embodiments, each data set of the plurality of data sets includes information for a person; for each person, the modelling system is constructed to generate a score based on the data set for the person and the set of variables, and the score is a score used by an entity to make a decision that affects the person. In some embodiments, the entity is one of a government entity, a business, an employer and a landlord. In some embodiments, the modeling system is a credit underwriting modelling system. In other embodiments, the modeling system is an insurance underwriting modeling system.

Protected Class Modeling

In some embodiments, the protected class information for a data set indicates whether the person associated with the data set is a member of a protected class being evaluated. In some embodiments, the protected class information for a data set indicates a probability of the person associated with the data set being a member of a protected class being evaluated. In some embodiments, the protected class being evaluated includes one of a class of race, ethnicity, national origin, religion, sex, sexual orientation, age, and disability status.

In some embodiments, a protected class model generation system (e.g., 191) of the model evaluation system provides the plurality of data sets, the protected class information for each data set of the plurality of data sets, and the set of variables to a data scientist device (e.g., 172 of FIG. 1A), the protected class model generation system receives user-specified modeling instructions for a protected class model from the data scientist device, and the protected class model generation system stores computer-executable instructions for a protected class model (scorer) (e.g., 512a of FIGS. 5A and 5B) based on the received user-specified modeling instructions. In some embodiments, a data scientist operating the data scientist device perceives the plurality of data sets and the set of variables, determines a protected class model for predicting whether a person of a data set is a member of the protected class being evaluated, and inputs the user-specified modeling instructions at the data scientist device to control the protected class model generation system to store the computer-executable instructions for the protected class model in a format of a protected class modeling engine (e.g., 412 of FIGS. 4A and 4B) of the model evaluation system.

In some embodiments, a protected class modeling system (e.g., 130) generates a protected class prediction for each data set by executing the computer-executable instructions for the protected class model, and for each data set, the protected class model generation system compares the generated prediction with the protected class information for the data set to generate a comparison result. The protected class model generation system then evaluates the accuracy of the protected class model based on the generated comparison results. In some embodiments, the protected class model generation system provides the data scientist device with information indicating accuracy of the protected class model, and the data scientist device responds with information indicating whether to continue using the predicted class model or with user-specified modeling instructions for a new protected class model. In some embodiments, the protected class model generation system automatically determines to use the protected class model if the determined accuracy satisfies a threshold condition.

Communication with the Evaluated Modeling System

In some embodiments, the model evaluation system (e.g., 120) accesses scores for each data set of the plurality of data sets by providing the plurality of data sets (the same plurality of data sets used by the protected class model) to the modeling system (e.g., 110) via an API of the modeling system, and receiving a score for each data set from the modeling system via the API. In some embodiments, an evaluated model interpretability system (e.g., 140) of the model evaluation system (e.g., 120) accesses scores for each data set of the plurality of data sets by providing the plurality of data sets (the same plurality of data sets used by the protected class model) to the modeling system (e.g., 110) via an API of the modeling system, and receiving a score for each data set from the modeling system via the API. In some embodiments, the model evaluation system 120 access scores for each data set of the plurality of data sets by providing the plurality of data sets to the modeling system 110 via methods such as by use of middleware, network traffic simulation, or code injection. The modeling system 110 may be any modeling system, without limitation, including legacy modeling systems, third party modeling systems, and existing modeling systems.

In some embodiments, the protected class model is a same type of model as the model (or models) used by the evaluated modeling system. In some embodiments, the protected class model 512a (FIGS. 5A-5B) is a same type of model as the model 212A (FIGS. 3A-3B) used by the evaluated modeling system.

Method 1400

FIG. 14 is a representation of a method, according to embodiments

In some embodiments, the method 1400 is performed by the model evaluation system 120 of FIG. 1A. In some embodiments, the method 1400 is performed by a model evaluation system that is similar to the model evaluation system 120 of FIG. 1A. In some embodiments, the method 1400 is performed by a model evaluation system that includes an evaluated model interpretability system that is different from the system 140 of FIG. 1B. In some embodiments, the method 1400 is performed by a model evaluation system that includes a protected class model interpretability system that is different from the system 150 of FIG. 1B.

In some embodiments, the method 1400 includes: building a protected class model that satisfies an accuracy threshold by using: data sets for use by a modeling system being evaluated (e.g., 110 of FIG. 1A), and protected class membership information for each data set (process S1410). A target for the protected class model is a protected class membership variable (of the protected class information) indicating membership in a protected class. Each predictor of the protected class model is a predictor of an evaluated model used by the modeling system. A target of the evaluated model is different from the target of the protected class model. Each predictor is a set of one or more variables of the data sets. In some embodiments, the method 1400 includes: for each predictor of the protected class model, determining a protected class model impact ranking value and a modeling system impact ranking value (process S1420).

In some embodiments, the protected class model generation system 191 performs the process S1410. In some embodiments, a protected class model generation system similar to the protected class model generation system 191 performs the process S1410.

In some embodiments, the disparate impact evaluator 160 performs the process S1420. In some embodiments, a disparate impact evaluator similar to the disparate impact evaluator 160 performs the process S1420.

In some embodiments, the evaluated model interpretability system 140 determines the modeling system impact ranking value for each predictor of the protected class model. In some embodiments, an evaluated model interpretability system similar to the evaluated model interpretability system 140 determines the modeling system impact ranking value for each predictor of the protected class model. In some embodiments, the evaluated model interpretability system determines the modeling system impact ranking value for each predictor of the protected class model by using differentiable model decompositions, as described herein. In some embodiments, the evaluated model interpretability system determines the modeling system impact ranking value for each predictor of the protected class model by using tree model decompositions, as described herein.

In some embodiments, the protected class model interpretability system 150 determines the protected class model impact ranking value or each predictor of the protected class model. In some embodiments, a protected class model interpretability system similar to the protected class model interpretability system 150 determines the protected class model impact ranking value or each predictor of the protected class model. In some embodiments, a protected class model interpretability system determines the protected class model impact ranking value or each predictor of the protected class model by using differentiable model decompositions, as described herein. In some embodiments, a protected class model interpretability system determines the protected class model impact ranking value or each predictor of the protected class model by using tree model decompositions, as described herein.

In some embodiments, the protected class model is a model of the protected class modeling system 130 of FIG. 1A.

Protected Class Membership Variable and Protected Class Membership Information

In some embodiments, the protected class membership variable is a variable of the protected class membership information, and protected class membership information for a data set is associated with a protected class membership variable for the data set. In some embodiments, protected class membership information for a data set is key-value pair that includes the protected class membership variable identifier and the protected class membership value. In some embodiments, the protected class membership value for a data set indicates membership in a specific protected class. In some embodiments, the protected class membership value for a data set indicates membership in any one of a plurality of protected classes.

Building a Protected Class Model

Accessing Data Sets

In some embodiments, building the protected class model (process S1410) includes: the model evaluation system accessing the data sets for use by the modeling system (e.g., 110 of FIG. 1A). In some embodiments, the model evaluation system (e.g., 120) accesses the data sets from a storage device (e.g., 181 of FIG. 1A). In some embodiments, the model evaluation system (e.g., 120) accesses the data sets from a storage device, and the storage device is one of a networked storage device, a storage device of a cloud storage system, a portable storage device, and an on-premises storage system. In some embodiments, the model evaluation system (e.g., 120) accesses the data sets from a storage device, used by the modeling system 110 during operation of the modeling system. In some embodiments, the model evaluation system (e.g., 120) accesses the data sets from the modeling system via an API of the modeling system. In some embodiments, the accessed data sets are data sets having a format used by the modelling system 110.

Accessing Protected Class Membership Information

In some embodiments, building the protected class model (process S1410) includes: the model evaluation system accessing the protected class membership information. In some embodiments, building the protected class model (process S1410) includes: the model evaluation system accessing the protected class membership information from a storage device (e.g., 183 of FIG. 1A). In some embodiments, building the protected class model (process S1410) includes: the model evaluation system accessing the protected class membership information from a protected class predictor (e.g., 192 of FIG. 1A) as described herein. In some embodiments, building the protected class model (process S1410) includes: the model evaluation system generating the protected class membership information from the data sets. In some embodiments, building the protected class model (process S1410) includes: the model evaluation system generating the protected class membership information from the data sets by performing a BISG process, as described herein.

Accessing Information Identifying Each Predictor of an Evaluated Model

In some embodiments, building the protected class model (process S1410) includes: the model evaluation system accessing information identifying each predictor of an evaluated model used by the modeling system (e.g., 110 of FIG. 1A). In some embodiments, the model evaluation system accesses the information identifying each predictor of the evaluated model used by the modeling system from the modeling system via an API of the modeling system. In some embodiments, the model evaluation system accesses the information identifying each predictor of the evaluated model used by the modeling system by sending the modeling system a predictor request via the API, and receiving the information identifying each predictor from the modeling system 110 as a response to the predictor request. In some embodiments, the model evaluation system accesses the information identifying each predictor of the evaluated model used by the modeling system from a storage device (e.g., 182 of FIG. 1A). In some embodiments, the model evaluation system accesses the information identifying each predictor of the evaluated model used by the modeling system from a data scientist device (e.g., 172 of FIG. 1A). In some embodiments, the model evaluation system accesses the information identifying each predictor of the evaluated model used by the modeling system via at least one of a network interface device, a storage device, and a user-input device of the model evaluation system (e.g., 120).

Computer Executable Instructions

In some embodiments, building the protected class model (process S1410) includes: the model evaluation system receiving computer-executable instructions that when executed by the model evaluation system, control the model evaluation system to build the protected class model. In some embodiments, the model evaluation system receives the computer-executable instructions from at least one of a network device of the model evaluation system, an external storage device, a data scientist device (e.g., 172), and a user input device of the model evaluation system.

In some embodiments, building the protected class model (process S1410) includes: the model evaluation system providing a data scientist device with data sets accessed by the model evaluation system, protected class membership information accessed by the model evaluation system, and evaluated model predictor information, accessed by the model evaluation system. In some embodiments, the data scientist device generates the computer-executable instructions (that when executed by the model evaluation system, control the model evaluation system to build the protected class model) based on the received data sets, protected class membership information, and evaluated model predictor information provided to the data scientist device by the model evaluation system.

In some embodiments, building the protected class model (process S1410) includes: the model evaluation system automatically building the protected class model. In some embodiments, building the protected class model (process S1410) includes: the model evaluation system automatically building the protected class model by generating computer-executable instructions that when executed by the model evaluation system, control the model evaluation system to build the protected class model.

In some embodiments, the computer-executable instructions for building the protected class model include at least one instruction that defines a model type of the protected class model.

In some embodiments, the computer-executable instructions for building the protected class model include at least one instruction that specifies the protected class membership information as a prediction target for the protected class model.

In some embodiments, the computer-executable instructions for building the protected class model include at least one instruction that specifies a variable corresponding to data of the protected class membership information as a prediction target for the protected class model.

In some embodiments, the computer-executable instructions for building the protected class model include at least one instruction that specifies at least one predictor of the evaluated model from the predictors identified in the information identifying each predictor of the evaluated model used by the modeling system.

In some embodiments, the computer-executable instructions for building the protected class model include at least one instruction that controls the model evaluation system to fit the protected class model using a training portion of the data of the accessed data sets that corresponds to each specified predictor (of the evaluated modeling system) and data of the accessed protected class membership information (being used as the prediction target) that corresponds to the training portion.

In some embodiments, the computer-executable instructions for building the protected class model include at least one instruction that controls the model evaluation system to: generate a prediction for each data set of a validation portion of the data of the accessed data sets; for each validation portion data set, control the model evaluation system to compare a generated prediction for the validation portion of the data set with data of the accessed protected class membership information that corresponds with the validation portion data set; determine a model accuracy value based on results of the comparisons; and determine whether the model accuracy value satisfies the accuracy threshold.

In some embodiments, the model evaluation system receives user-selection of each predictor to be used by the protected class model, and generates the at least one instruction that specifies at least one predictor of the evaluated model from based on the received user-selection.

In some embodiments, the model evaluation system receives user-selection of a model type and generates the at least one instruction that defines a model type of the protected class model based on the received user-selection.

In some embodiments, the model evaluation system automatically selects each predictor to be used by the protected class model, and generates the at least one instruction that specifies at least one predictor of the evaluated model from based on the automatic selection.

In some embodiments, the model evaluation system automatically selects a model type and generates the at least one instruction that defines a model type of the protected class model based on the automatic selection.

In some embodiments, responsive to the model evaluation system determining that the model accuracy value satisfies the accuracy threshold, the model evaluation system stores the model for use in determining the protected class model impact ranking.

In some embodiments, responsive to the model evaluation system determining that the model accuracy value satisfies the accuracy threshold, the model evaluation system stores the model for use in determining the protected class model impact ranking responsive to user-confirmation received by the model evaluation system. In some embodiments, the model evaluation system receives the user confirmation from a user input device. In some embodiments, the model evaluation system receives the user confirmation from the data scientist device 172.

In some embodiments, responsive to the model evaluation system determining that the model accuracy value does not satisfy the accuracy threshold, the model evaluation system sends a request to the data scientist device for updated model instructions; responsive to receiving updated model instructions from the data scientist device, the model evaluation system evaluates accuracy of a new model built by using the updated model instructions.

In some embodiments, responsive to the model evaluation system determining that the model accuracy value does not satisfy the accuracy threshold, the model evaluation system evaluates a new model built by using updated model instructions.

In some embodiments, an updated model instructions include an instruction specifying a new model type. In some embodiments, an updated model instructions include an instruction specifying new predictors for the protected class model.

Determining a Protected Class Model Impact Ranking Value

Figure 15:
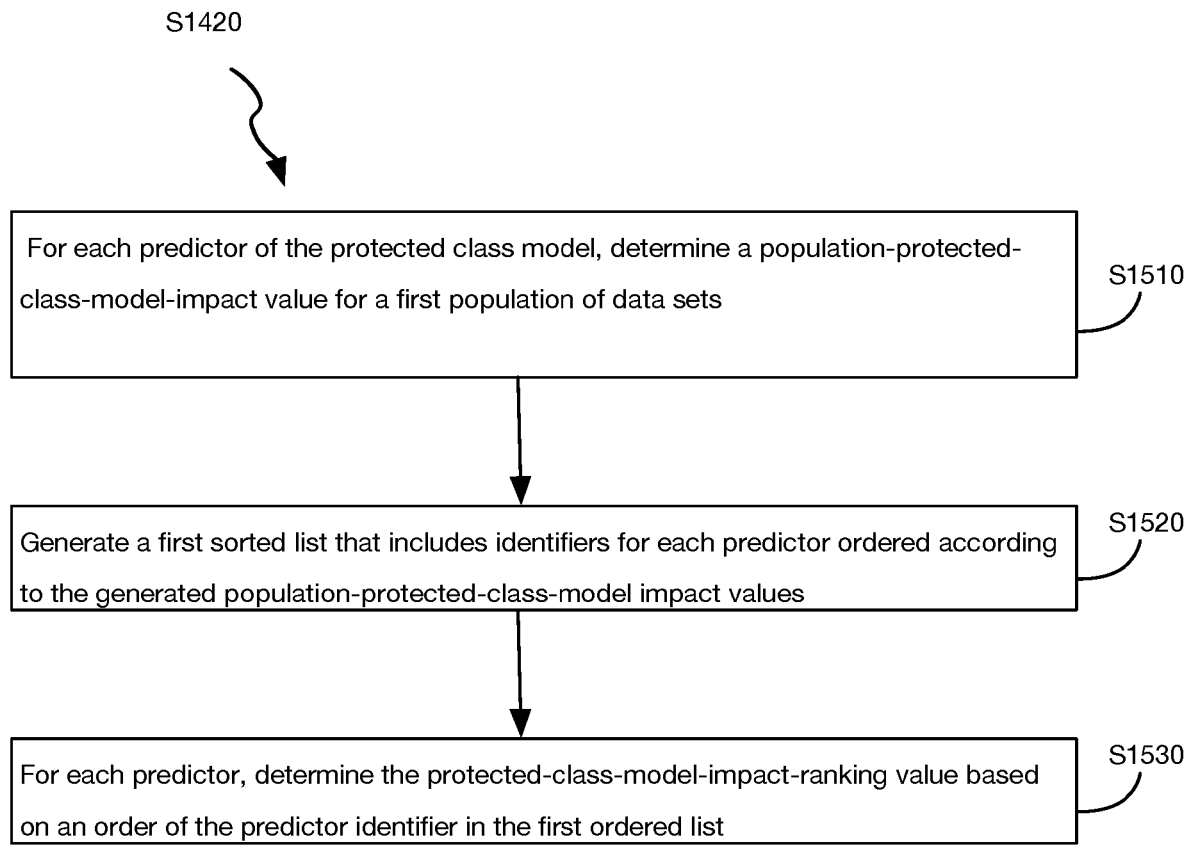

In some embodiments, determining a protected class model impact ranking value (process S1420) includes: for each predictor of the protected class model, determining a population-protected-class-model-impact value for a first population of data sets (process S1510 of FIG. 15); generating a first sorted list that includes identifiers for each predictor ordered according to the generated population-protected-class-model impact values (process S1520 of FIG. 15); and for each predictor, determining the protected-class-model-impact-ranking value based on an order of the predictor identifier in the first ordered list (process S1530 of FIG. 15).

Figure 16:
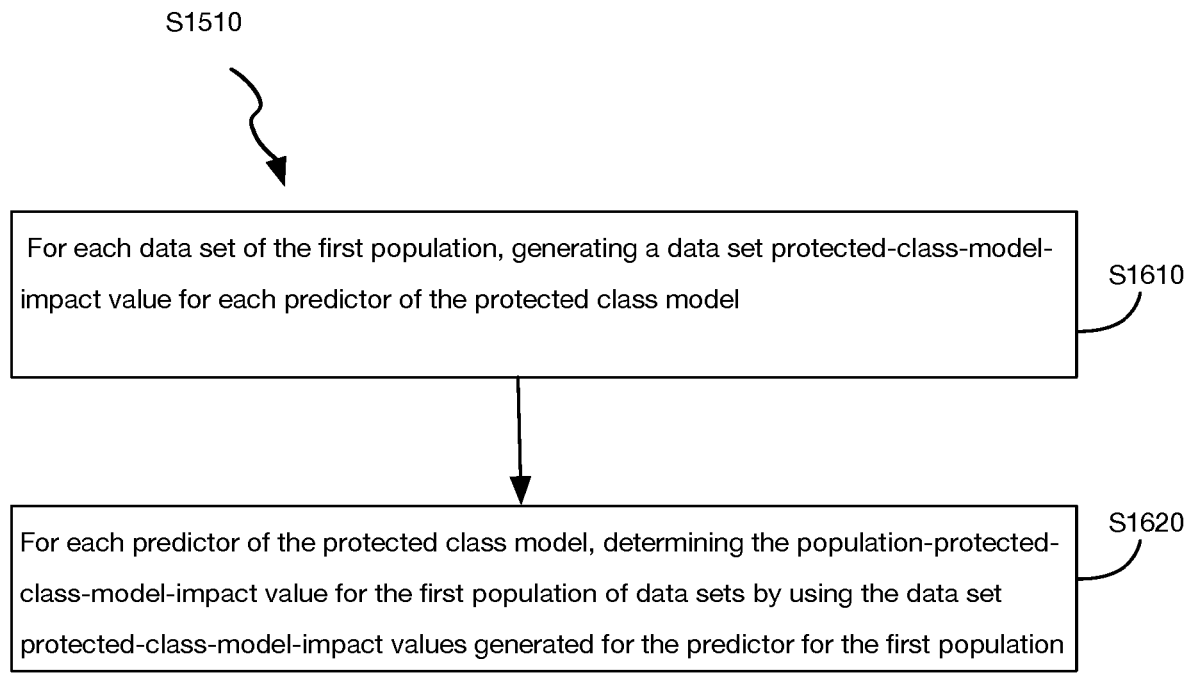

In some embodiments, determining a population-protected-class-model-impact value for a first population of data sets (process S1510 of FIG. 15) includes: for each data set of the first population, generating a data set protected-class-model-impact value for each predictor of the protected class model (process S1610 of FIG. 16); and for each predictor of the protected class model, determining the population-protected-class-model-impact value for the first population of data sets by using the data set protected-class-model-impact values generated for the predictor for the first population (process S1620 of FIG. 16), wherein each data set protected-class-model-impact value indicates relative influence of the corresponding predictor on a prediction generated by the protected class model for the corresponding data set. In some embodiments, determining the population-protected-class-model-impact value for the first population of data sets by using the data set protected-class-model-impact values generated for the predictor for the first population includes: selecting the largest data set protected-class-model-impact value as the population-protected-class-model-impact value. In some embodiments, determining the population-protected-class-model-impact value for the first population of data sets by using the data set protected-class-model-impact values generated for the predictor for the first population includes: selecting an average data set protected-class-model-impact value as the population-protected-class-model-impact value.

Modified Input Values

In some embodiments, generating a data set protected-class-model-impact value for a predictor of the protected class model includes: generating at least one modified data set by modifying a data of the data set that corresponds to the predictor, using the protected class model to generate a prediction for each modified data set, and comparing a prediction of the data set to at least one prediction for the modified data sets, and generating the data set protected-class-model-impact value based on a result of the comparison. In some embodiments, generating a data set protected-class-model-impact value for a predictor of the protected class model includes: generating a data set protected-class-model-impact value for a predictor of the protected class model by using the protected class model interpretability system 150, as described herein. In some embodiments, generating a data set protected-class-model-impact value for a predictor of the protected class model includes: generating a data set protected-class-model-impact value for a predictor of the protected class model by using the protected class model interpretability system 150, as described herein with respect to FIGS. 12A-B.

Figure 13A:
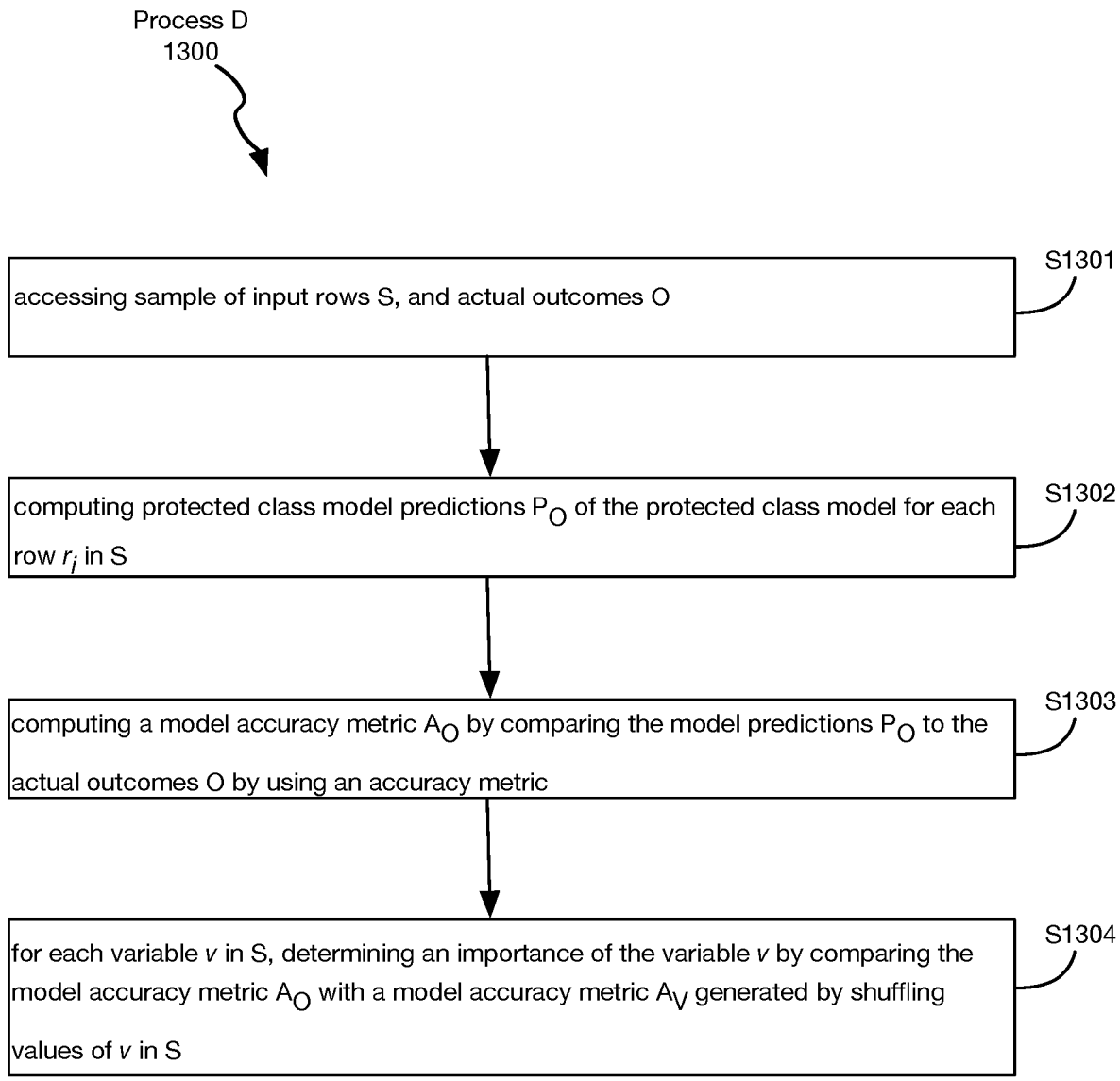
FIGS. 13A-B depict a process for determining impactful variables and their protected class prediction impact values.
Figure 13B:
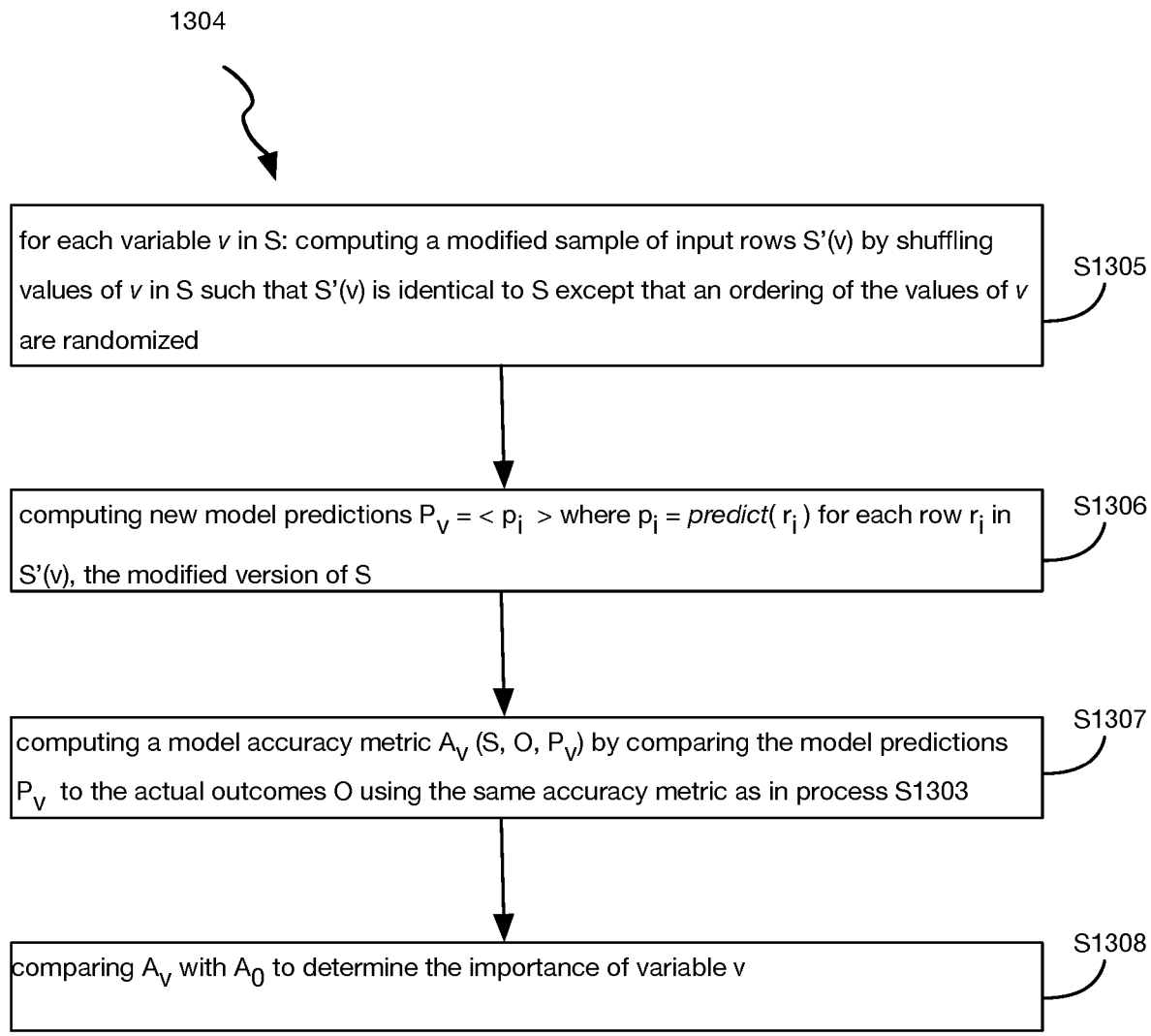
Figure 14A:
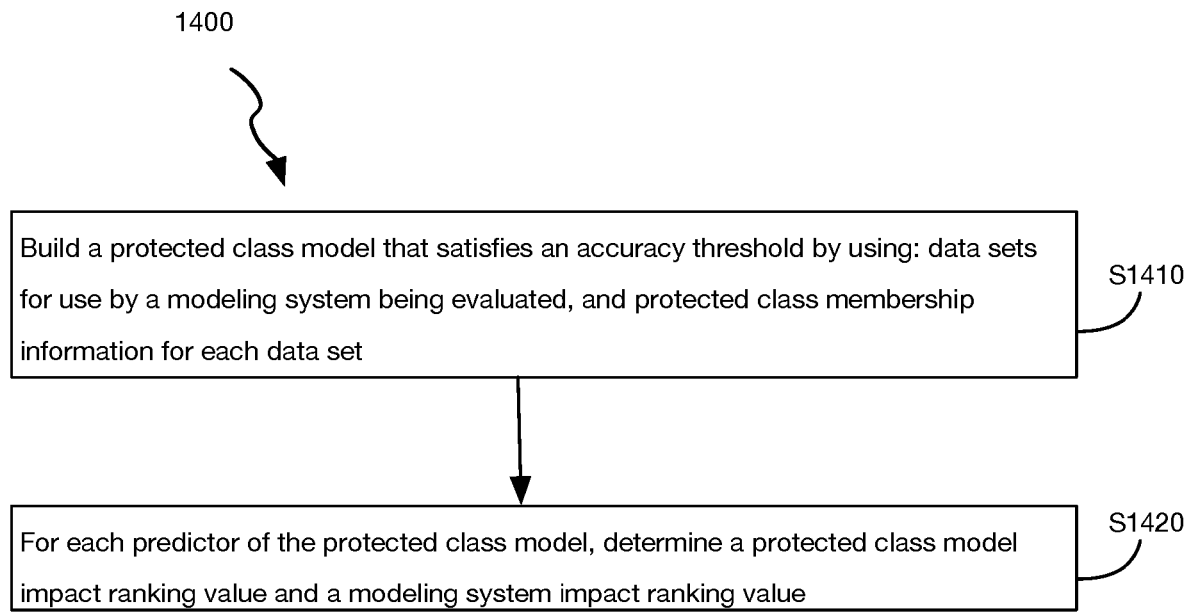
FIGS. 14A-E, and FIGS. 15-18 are representations of methods, according to embodiments.
Figure 14B:
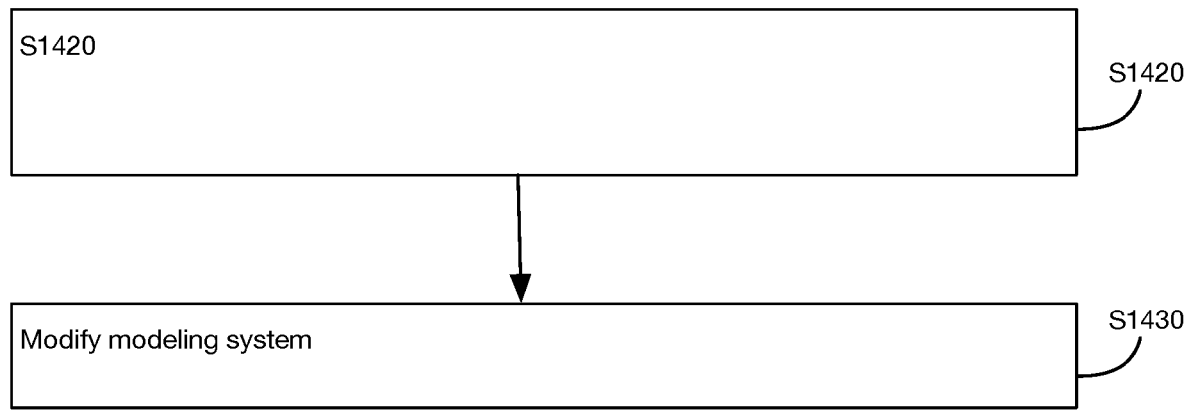
Figure 14C:
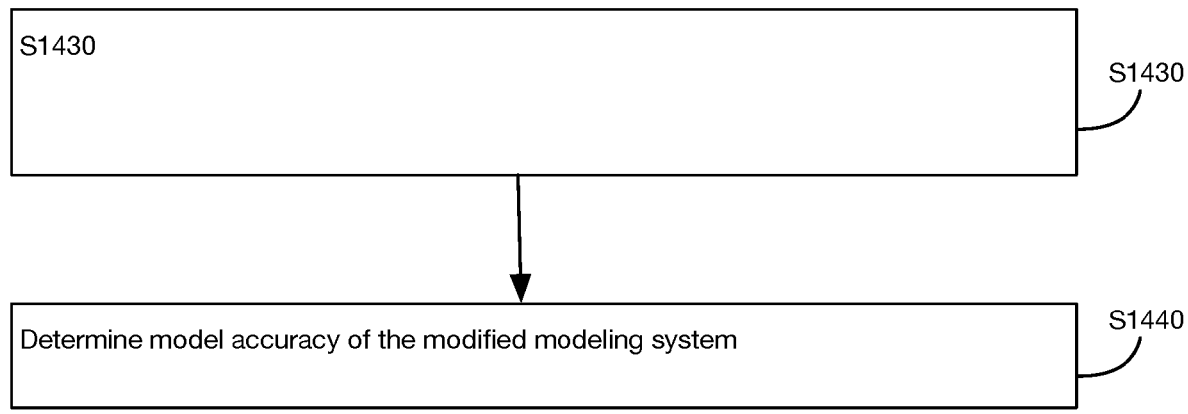
Figure 14D:
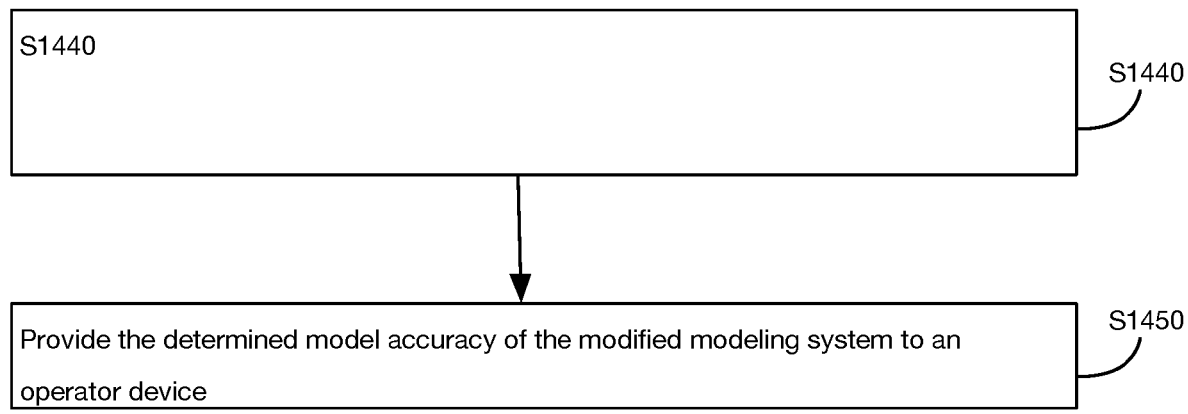
Figure 14E:
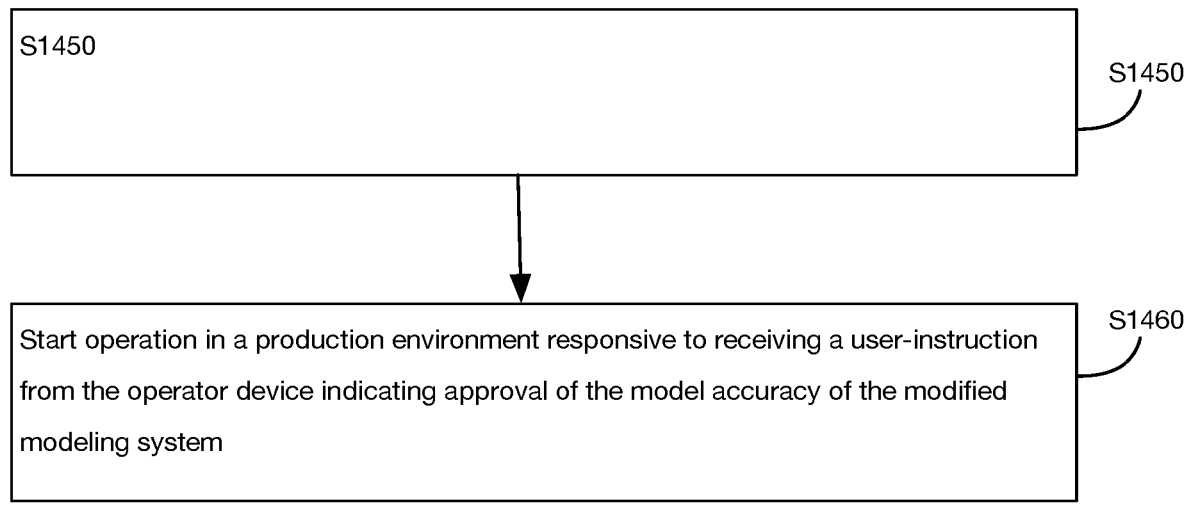

In some embodiments, generating a population-protected-class-model-impact value for a predictor of the protected class model includes: using the protected class model interpretability system 150, as described herein with respect to FIGS. 13A-B.

Differentiable Model Decompositions

In some embodiments, generating a data set protected-class-model-impact value for a predictor of the protected class model includes: determining a decomposition of at least one protected class model prediction by using a gradient operator of the protected class model. In some embodiments, generating a data set protected-class-model-impact value for a predictor of the protected class model includes: determining a decomposition of at least one protected class model prediction by using a decomposition process described in U.S. Provisional Application Ser. No. 62/641,176, filed on 9 Mar. 2018. In some embodiments, generating a data set protected-class-model-impact value for a predictor of the protected class model includes: determining a decomposition of at least one protected class model prediction by performing an integrated gradients process described herein. In some embodiments, generating a data set protected-class-model-impact value for a predictor of the protected class model includes: determining a decomposition of at least one protected class model prediction by performing an integrated gradients process described in U.S. Provisional Application Ser. No. 62/641,176, filed on 9 Mar. 2018. In some embodiments, generating a data set protected-class-model-impact value for a predictor of the protected class model includes: determining a decomposition of at least one protected class model prediction by performing a differentiable model decomposition process described in U.S. Provisional Application Ser. No. 62/641,176, filed on 9 Mar. 2018.

Tree Model Decompositions

In some embodiments, generating a data set protected-class-model-impact value for a predictor of the protected class model includes: determining a decomposition of at least one protected class model prediction by using information of a tree model of the protected class model. In some embodiments, generating a data set protected-class-model-impact value for a predictor of the protected class model includes: determining a decomposition of at least one protected class model prediction by performing a tree model decomposition process described in U.S. Provisional Application Ser. No. 62/641,176, filed on 9 Mar. 2018. In some embodiments, generating a data set protected-class-model-impact value for a predictor of the protected class model includes: determining a decomposition of at least one protected class model prediction by performing a tree model decomposition process described in U.S. Provisional Application Ser. No. 62/682,714, filed on 8 Jun. 2018. In some embodiments, generating a data set protected-class-model-impact value for a predictor of the protected class model includes: determining a decomposition of at least one protected class model prediction by generating Shapley values, as described in U.S. Provisional Application Ser. No. 62/682,714, filed on 8 Jun. 2018.

Determining a Modelling System Impact Ranking Value

Figure 17:
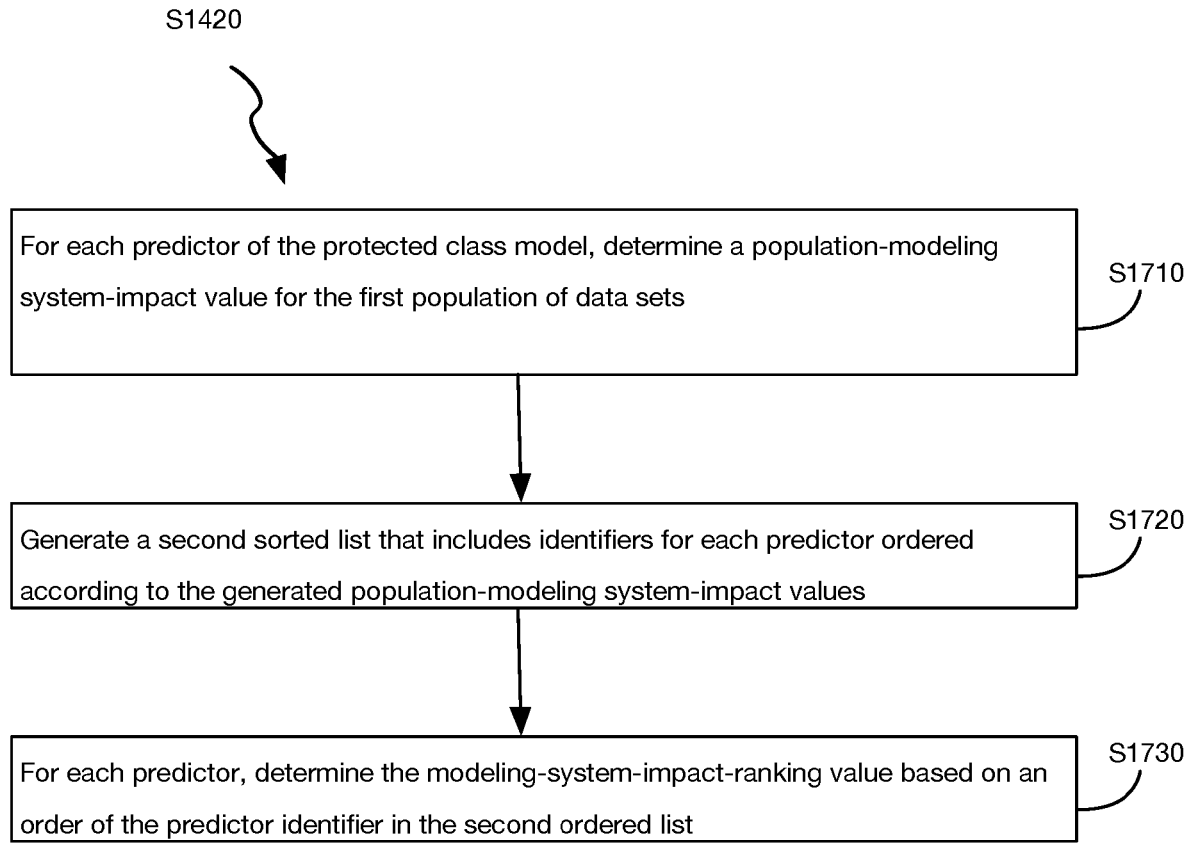

In some embodiments, determining a modeling system impact ranking value (process S1420) includes: for each predictor of the protected class model, determining a population-modeling system-impact value for the first population (e.g., the population of process S1510) of data sets (process S1710 of FIG. 17); generating a second sorted list that includes identifiers for each predictor ordered according to the generated population-modeling system-impact values (process S1720 of FIG. 17); and for each predictor, determining the modeling-system-impact-ranking value based on an order of the predictor identifier in the second ordered list (process S1730 of FIG. 17).

Figure 18:
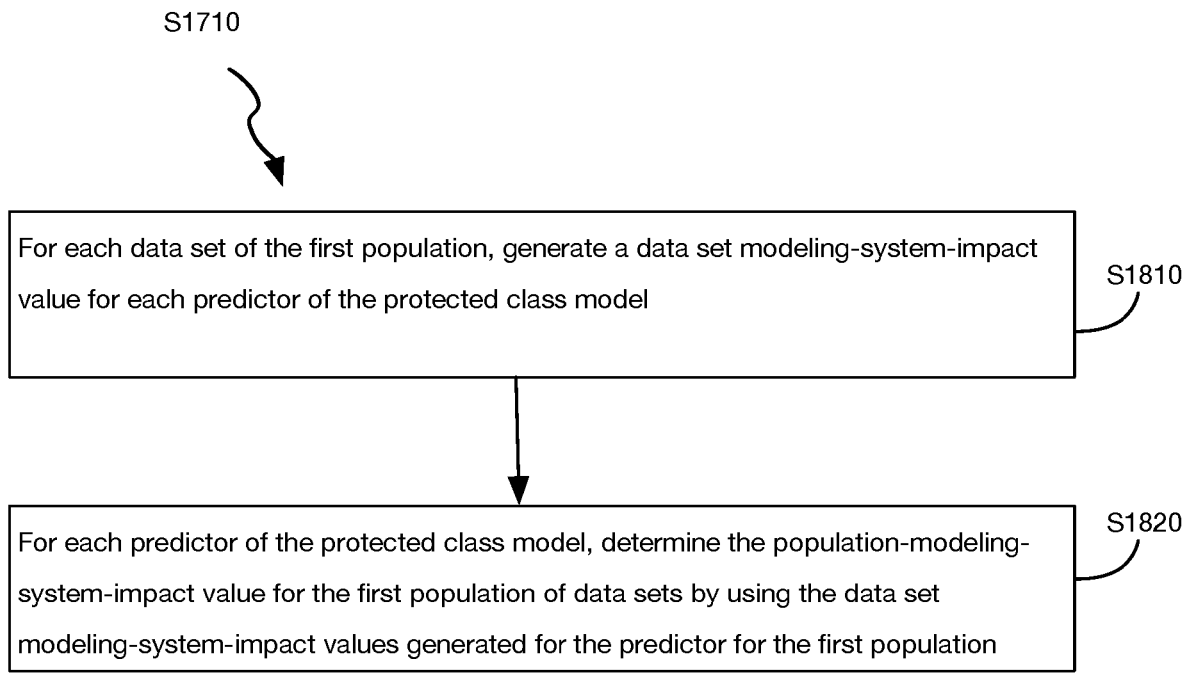

In some embodiments, determining a population-modeling-system-impact value for the first population of data sets (process S1710 of FIG. 17) includes: for each data set of the first population, generating a data set modeling-system-impact value for each predictor of the protected class model (process S1810 of FIG. 18); and for each predictor of the protected class model, determining the population-modeling-system-impact value for the first population of data sets by using the data set modeling-system-impact values generated for the predictor for the first population (process S1820 of FIG. 18), wherein each data set modeling-system-impact value indicates relative influence of the corresponding predictor on a score generated by the modeling system for the corresponding data set.

In some embodiments, determining the population-modeling-system-impact value for the first population of data sets by using the data set modeling-system-impact values generated for the predictor for the first population includes: selecting the largest population-modeling-system-impact value. In some embodiments, determining the population-modeling-system-impact value for the first population of data sets by using the data set modeling-system-impact values generated for the predictor for the first population includes: selecting an average data set modeling-system-impact value as the population-modeling-system-impact value.

Modified Input Values

In some embodiments, generating a data set modeling-system-impact value for a predictor of the protected class model includes: generating at least one modified data set by modifying a data of the data set that corresponds to the predictor, controlling the modeling system to generate a score for each modified data set by using an API of the modeling system 110, and comparing a score of the data set to at least one score for the modified data sets, and generating the data set modeling system-impact value based on a result of the comparison. In some embodiments, generating a data set modeling-system-impact value for a predictor of the protected class model includes: generating a data set modeling-system-impact value for a predictor of the protected class model by using the evaluated model interpretability system 140, as described herein. In some embodiments, generating a data set modeling-system-impact value for a predictor of the protected class model includes: generating a data set modeling-system-impact value for a predictor of the protected class model by using the evaluated model interpretability system 140, as described herein with respect to FIGS. 10A-B.

Figure 11A:
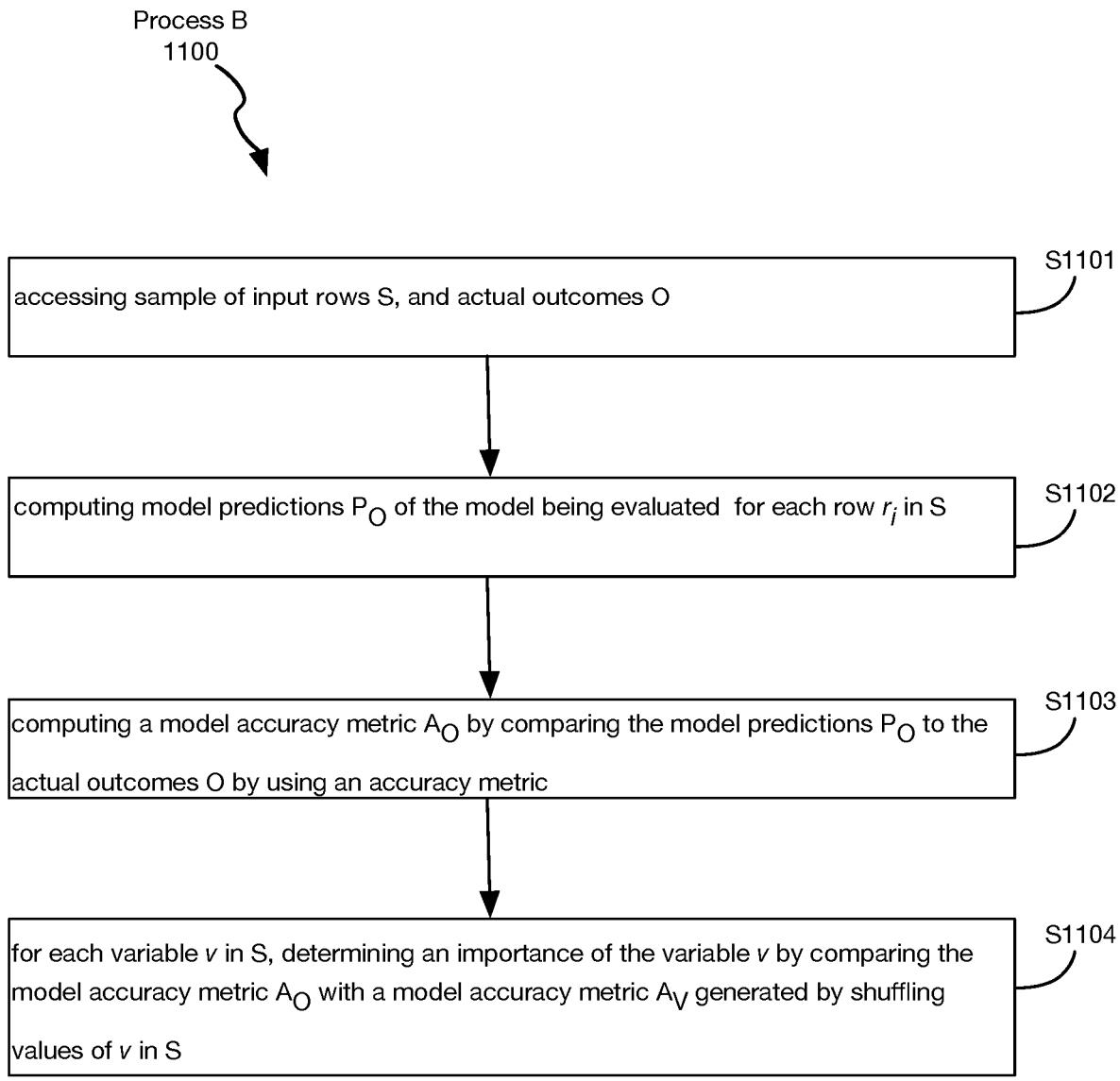
FIGS. 11A-B depict a process for determining impactful variables and their score impact values.
Figure 11B:
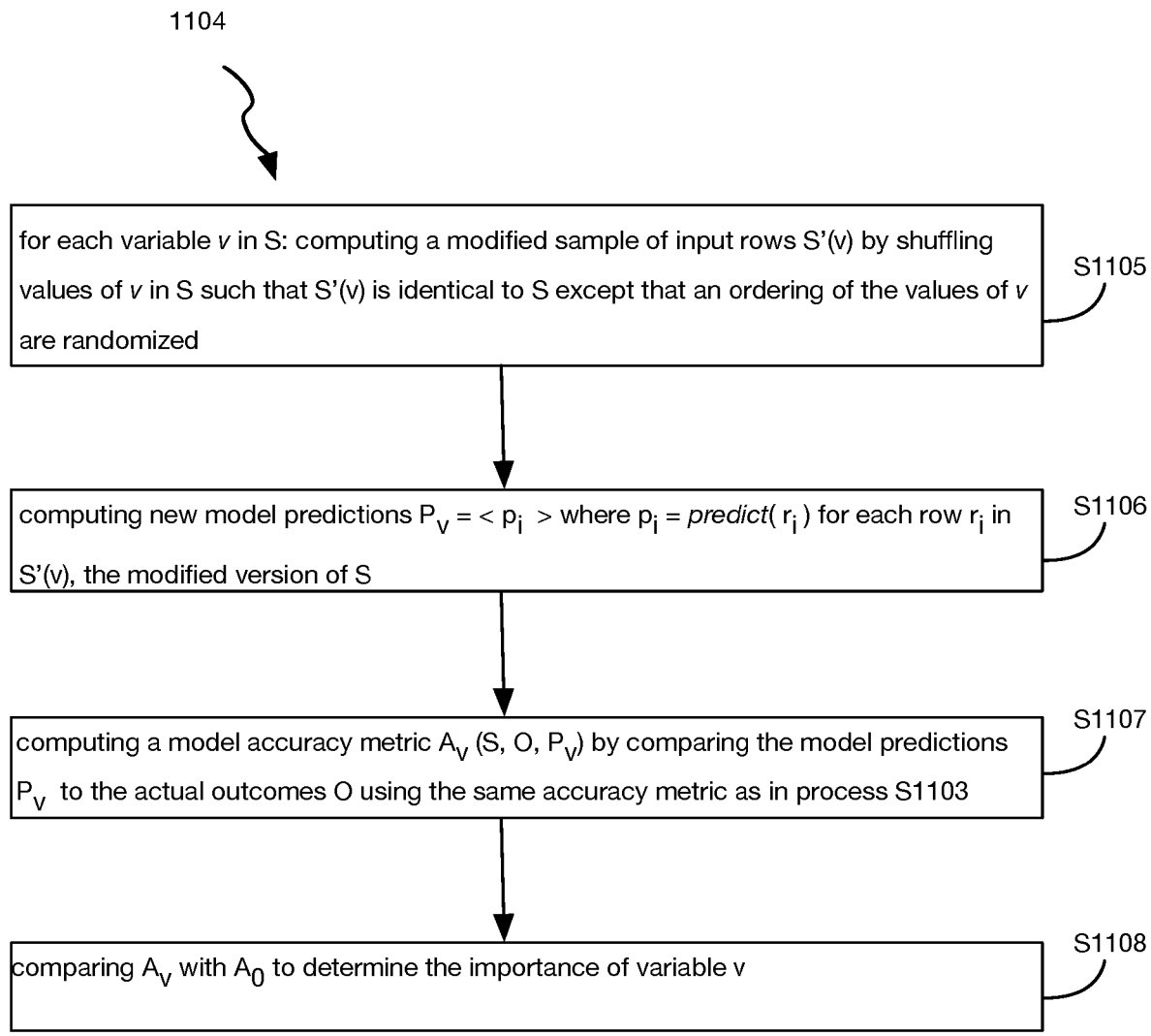

In some embodiments, generating a population-modeling-system-impact value for a predictor of the protected class model includes: using the evaluated model interpretability system 1400, as described herein with respect to FIGS. 11A-B Differentiable Model Decompositions In some embodiments, generating a data set modeling-system-impact value for a predictor of the protected class model includes: the model evaluation system 120 determining a decomposition of at least one modeling system 110 score by using a gradient operator of the modeling system 110 via an API of the modeling system. In some embodiments, generating a data set modeling-system-impact value for a predictor of the protected class model includes: the model evaluation system 120 determining a decomposition of at least one modeling system 110 score by using a decomposition process described in U.S. Provisional Application Ser. No. 62/641,176, filed on 9 Mar. 2018. In some embodiments, generating a data set modeling-system-impact value for a predictor of the protected class model includes: the model evaluation system 120 determining a decomposition of at least one modeling system 110 score by performing an integrated gradients process described in U.S. Provisional Application Ser. No. 62/641,176, filed on 9 Mar. 2018. In some embodiments, generating a data set modeling-system-impact value for a predictor of the protected class model includes: the model evaluation system 120 determining a decomposition of at least one modeling system 110 score by performing a differentiable model decomposition process described in U.S. Provisional Application Ser. No. 62/641,176, filed on 9 Mar. 2018.

In some embodiments, generating a data set modeling-system-impact value for a predictor of the protected class model includes: the model evaluation system 120 determining a decomposition of at least one modeling system 110 score by performing an integrated gradients process, as described herein.

Tree Model Decompositions

In some embodiments, generating a data set modeling-system-impact value for a predictor of the protected class model includes: the model evaluation system 120 determining a decomposition of at least one modeling system 110 score by using information of a tree model of the protected class model accessed from the modeling system 110 via an API of the modeling system. In some embodiments, generating a data set modeling-system-impact value for a predictor of the protected class model includes: the model evaluation system 120 determining a decomposition of at least one modeling system 110 score by performing a tree model decomposition process described in U.S. Provisional Application Ser. No. 62/641,176, filed on 9 Mar. 2018. In some embodiments, generating a data set modeling-system-impact value for a predictor of the protected class model comprises: the model evaluation system 120 determining a decomposition of at least one modeling system 110 score by performing a tree model decomposition process described in 62/682,714, filed on 8 Jun. 2018. In some embodiments, generating a data set modeling-system-impact value for a predictor of the protected class model comprises: the model evaluation system 120 determining a decomposition of at least one modeling system 110 score by generating Shapley values, as described in 62/682,714, filed on 8 Jun. 2018.

Modifying the Modeling System

In some embodiments, the method 1400 includes: the model evaluation system (e.g., 120) selecting at least one predictor of the protected class model based on at least one of the determined protected class model impact ranking value and the modeling system impact ranking value, and the model evaluation system modifying the modeling system (e.g., 110) to reduce impact by each selected predictor on scores generated by the modeling system (process S1430).

In some embodiments, the model evaluation system modifying the modeling system comprises: the model evaluation system modifying data of each selected predictor that is stored for use by the modeling system 110 to generate scores, by accessing a device (e.g., 181) storing data sets used by the modeling system.

In some embodiments, the model evaluation system modifying the modeling system comprises: the model evaluation system providing a model modification request to the modeling system (e.g., 110) via an API (Application Program Interface) of the modeling system to remove variables of each selected predictor from a model used by the modeling system to generate scores.

In some embodiments, the method 1400 includes: responsive to modifying the modeling system (e.g., 110), the model evaluation system (e.g., 120) determining model accuracy of the modified modeling system by using an API of the modeling system (process S1440).

In some embodiments, the method 1400 includes: the model evaluation system providing the determined model accuracy of the modified modeling system to an operator device (e.g., 171) (process S1450).

In some embodiments, the method 1400 includes: the model evaluation system providing the determined model accuracy of the modified modeling system to an operator device (e.g., 171) (process S1450); and the model evaluation system controlling the modeling system to start operation in a production environment responsive to receiving a user-instruction from the operator device indicating approval of the model accuracy of the modified modeling system (process S1460).

Integrated Gradients Process

In some embodiments, the model evaluation system 120 includes machine-executable instructions that when executed control the model evaluation system to determine a decomposition by performing an integrated gradients process, as described herein. In some embodiments, determining a decomposition by performing an integrated gradients process includes: generating a reference input data set representative of a reference population; and determining the decomposition for a score (e.g., a protected class model prediction generated by the protected class model of system 130, a score generated by the modeling system 110) for a corresponding data set (x) by generating the decomposition relative to the reference input data set. In some embodiments, generating the decomposition of the data set (x) relative to the reference input data set includes, for each feature i of the data set (x): selecting at least one value along the straight line path from the value $x_i$ of feature i of the data set (x) to the value $x'_i$ of the feature i of the reference input data set; determining a derivative of the corresponding model (e.g., protected class model or sub-model of system 130, model or sub-model of the modeling system 110) for each selected value of the feature i along the straight line path; determining a sum of the derivatives; and determining a product of the determined sum and a difference between the value $x_i$ of feature i of the data set (x) and the value $x'_i$ of the feature i of the reference input data set, wherein the decomposition is a linear combination of the determined products for each feature i of the evaluation input data set. In some embodiments, a plurality of values along the straight line path are selected at an interval m, and the value of each determined product is divided by m.

In some embodiments, the model evaluation system 120 determines each derivative of the model (e.g., protected class model of system 130, model of the modeling system 110) for each selected value of each feature i. In some embodiments, the model evaluation system 120 uses the modeling system 110 to determine each derivative of the model (e.g., model of the modeling system 110) for each selected value of each feature i. In some embodiments, the model evaluation system 120 uses the modeling system 110 to determine each derivative of the model for each selected value of each feature i via an API of the modeling system 110. In some embodiments, the API is a REST API. In some embodiments, the API is an API that is accessible via a public network. In some embodiments, the API is an API that is accessible via an HTTP protocol. In some embodiments, the API is an API that is accessible via a remote procedure call.

In some embodiments, the model evaluation system 120 determines each derivative of the corresponding model for each selected value of each feature i by using a gradient operator to determine the derivatives for each selected value. In some embodiments, the model evaluation system 120 uses the modeling system 110 to determine each derivative of the corresponding model for each selected value of each feature i by using a gradient operator of the modeling system 110.

In some embodiments, generating the decomposition of the data set (x) relative to the reference input data set includes, for each feature i of the evaluation input data set: determine a set of values v between the value $x_i$ of feature i of the data set (x) and the value $x'_i$ of the feature i of the reference input data set (e.g., $v=(x_i+(k/m)(x_i-x'_i))$, for $1<=k<=m,$); determining a derivative of the corresponding model for each determined value v $$\left( e.g., \frac{\partial F(v)}{\partial x_i} = \frac{\partial F\left(x' + \frac{k}{m} \times (x-x')\right)}{\partial x_i} \text{ for } 1<=k<=m \right),$$

for sub-model F); determining a sum of the derivatives $$\left( \sum_{k=1}^{m} \frac{\partial F\left(x' + \frac{k}{m} \times (x-x')\right)}{\partial x_i} \right);$$

determining a product of the determined sum and a difference between the value $x_i$ of feature i of the data set (x) and the value $x'_i$ of the feature i of the reference input data set $$\left( e.g., (x_i - x'_i) \times \sum_{k=1}^{m} \frac{\partial F\left(x' + \frac{k}{m} \times (x-x')\right)}{\partial x_i} \right);$$

and determining a decomposition value $d_i$ for the feature i by dividing the determined product for feature i by m $$\left( e.g., (x_i - x'_i) \times \sum_{k=1}^{m} \frac{\partial F\left(x' + \frac{k}{m} \times (x-x')\right)}{\partial x_i} \times \frac{1}{m} \right),$$

wherein the decomposition is a linear combination of the determined decomposition values $d_i$ for each feature i of the data set (x) (e.g, decomposition=$d_1+d_i+\ldots+d_n$).

In some embodiments, generating the reference input data set includes: for each numerical feature represented by data sets of a reference population, determining an average value for the feature from among the feature values of the data sets of the reference population; for each categorical feature represented by the data sets of the reference population, determining a mode value for the feature from among the feature values of the data sets of the reference population; wherein the reference input data set includes the average feature values as the features values for the numerical features and the mode feature values as the features values for the categorical features.

In some embodiments, determining a decomposition for a model score for the data set (x) includes: for each input data set of the reference population, generating a decomposition of the data set (x) relative to the data sets of the reference population; for each feature represented by the decompositions relative to the data sets of the reference population, determine a feature average among the feature values of the decompositions relative to the data sets of the reference population to generate a decomposition of the data set (x) relative to the reference population. In some embodiments, the decomposition of the data set (x) relative to the reference population is a linear combination of the feature averages.

In some embodiments, determining a decomposition for a model score for the data set (x) includes: for each data set of a subset of the reference population, generating a decomposition of the data set (x) relative to the data sets of the subset of the reference population; for each feature represented by the decompositions relative to the data sets of the subset of the reference population, determine a feature average among the feature values of the decompositions relative to the data sets of the subset of the reference population to generate a decomposition of the data set (x) relative to the subset of the reference population. In some embodiments, the decomposition of the data set (x) relative to the subset of the reference population is a linear combination of the feature averages. In some embodiments, the subset of the reference population includes data sets of the reference population that are most similar to the data set (x). In some embodiments, the subset of the reference population includes input data sets of the reference population that are most different from the data set (x).

Tree Model Decomposition Process

In some embodiments, the model evaluation system 120 includes machine-executable instructions that when executed control the model evaluation system to determine a decomposition by performing an tree model decomposition process, as described herein. In some embodiments, determining a decomposition by performing a tree model decomposition process includes: determining the decomposition for a score (e.g., a protected class model prediction generated by the protected class model of system 130, a score generated by the modeling system 110) for a corresponding data set (x) by accessing a tree structure of the model (or sub-model). In some embodiments, the model evaluation system 120 accesses the tree structure from a storage device (e.g., 182 of FIGS. 1A-B). In some embodiments, the model evaluation system 120 accesses the tree structure from the modeling system 110, which is communicatively coupled to the model evaluation system 120 via a computer network. In some embodiments, the tree model is a forest, in other embodiments the tree model is a random forest, in other embodiments, the tree model is a gradient boosted tree.

In some embodiments, the model evaluation system 120 includes machine-executable instructions that when executed determine a decomposition for a tree model by determining a feature attribution value ($\phi_i$) (Shapley value) for features of the tree model by performing a process that implements the following equation:

$$\phi_i = \sum_{S \subseteq N \setminus \{i\}} \frac{|S|!(M - |S| - 1)!}{M!} [f_x(S \cup \{i\}) - f_x(S)], \quad \text{Equation (1)}$$

wherein  Equation (2)
$$f_x(S) = f(h_x(z')) = E[f(x) | x_S],$$

wherein M is the number of input features, N is the set of input features, S is the set features constructed from superset N. The function $f(h_x(z'))$ defines a manner to remove features so that an expected value of f(x) can be computed which is conditioned on the subset of a feature space $x_S$. The missingness is defined by z', each $z_i'$ variable represents a feature being observed ($z_i'=1$) or unknown ($z_i'=0$).

In some embodiments, the model evaluation system 120 includes machine-executable instructions that when executed estimate $E[f(x)|x_S]$ by performing process steps that implement the following procedure (Procedure 1):

```
procedure EXPVALUE(x, S, tree = {v, a, b, t, r, d})
    procedure G(j, w)
        if v_j ≠ internal then
            return w · v_j
        else
            if d_j ∈ S then
                return G(a_j, w) if x_{d_j} ≤ t_j else G(b_j, w)
            else
                return G(a_j, wr_{a_j}/r_j) + G(b_j, wr_{b_j}/r_j)
            end if
        end if
    end procedure
    return G(1, 1)
end procedure
,
``` wherein v is a vector of node value, which takes the value internal for internal nodes; the vectors a and b represent the left and right node indexes for each internal node; the vector t contains thresholds for each internal node, and d is a vector of indexes of the features used for splitting in internal nodes; the vector r represents the cover of each node (e.g., how many data samples fall in that sub-tree); the weight w measures what proportion of the training samples matching the conditioning set S fall into each leaf.

In some embodiments, the model evaluation system 120 includes machine-executable instructions that when executed estimate $E[f(x)|x_S]$ by performing process steps that implement the following procedure (Procedure 2):

```
procedure TS(x, tree = {v, a, b, t, r, d})
    φ = array of len(x) zeros
    procedure RECURSE(j, m, p_z, p_o, p_i)
        m = EXTEND(m, p_z, p_o, p_i)
        if v_j ≠ internal then
            for i ← 2 to len(m) do
                w = sum(UNWIND(m, i),w)
                φ_{m_i} = φ_{m_i} + w(m_i.0 − m_i.z)v_j
            end for
        else
            h, c = x_{d_j} ≤ t_j ? (a_j, b_j) : (b_j, a_j)
            i_z = i_o = 1
            k = FINDFIRST(m.d, d_j)
            if k ≠ nothing then
                i_z, i_o = (m_k.z, m_k.o)
                m = UNWIND(m, k)
            end if
            RECURSE(h, m, i_z.r_h/r_j, i_o, d_j)
            RECURSE(c, m, i_z.r_c/r_j, 0, d_j)
        end if
    end procedure
    procedure EXTEND(m, p_z, p_o, p_i)
        l = len(m) + 1
        m = copy(m)
        m_{l+1}.(d, z, o, w) = (p_i, p_z, p_o, l = 0 ? 1 : 0)
        for i ← l − 1 to 1 do
            m_{i+1}.w = m_{i+1}.w + p_o m_i.w(i/l)
            m_i.w = p_z m_i.w[(l − i)/l]
        end for
        return m
    end procedure
    procedure UNWIND(m, i)
        l = len(m)
        n = m_l.w
        m = copy(m_{1...l−1})
        for j ← l − 1 to 1 do
            if m_i.o ≠ 0 then
                t = m_j.w
                m_j.w = n · l/(j · m_i.o)
                n = t − m_j.w · m_i.z((l − j)/l)
```

```
        else
            m_j.w = (m_j.w · l)/(m_j.z(l - j))
        end if
    end for
    for j ← i to l - 1 do
        m_j.(d,z,o) = m_{j+1}.(d,z,o)
    end for
    return m
end procedure
RECURSE(1, [ ], 1, 1, 0)
return φ
end procedure
,
``` wherein v is a vector of node value, which takes the value internal for internal nodes; the vectors a and b represent the left and right node indexes for each internal node; the vector t contains thresholds for each internal node, and d is a vector of indexes of the features used for splitting in internal nodes; the vector r represents the cover of each node (e.g., how many data samples fall in that sub-tree); weight w measures what proportion of the training samples matching the conditioning set S fall into each leaf; m is the path of unique features that have been split on so far; and z is the fraction of "zero" paths (where this feature is not in the set S) that flows through the branch; o is the fraction of "one" paths (where the feature is in the set S) that flow through the branch; and m.d represents a vector of all the feature indexes.

In some embodiments, the evaluated modeling system (e.g., 110) records values for {v, a, b, t, r, d} during scoring of an input data set, and the model evaluation system 120 is constructed to access the recorded values for {v, a, b, t, r, d} from the evaluated modeling system 110 via an API of the modeling system 110. In some embodiments, the evaluated modeling system (e.g., 110) records values for w during scoring of an input data set, and the model evaluation system 120 is constructed to access the recorded values for w from the evaluated modeling system via an API of the modeling system 110. In some embodiments, the model evaluation system 120 is constructed to access a tree structure of a tree model from a storage device. In some embodiments, the model evaluation system 120 is constructed to access a tree structure of a tree model from the evaluated modeling system 110 via an API of the modeling system 110.

In some embodiments, the model evaluation system 120 determines a decomposition for a tree model by using an allocation defined by Shapley values, a technique from collaborative game theory. In some embodiments, the model evaluation system 120 includes machine-executable instructions that when executed perform process steps that implement the decomposition technique presented in "Consistent Individualized Feature Attribution for Tree Ensembles" by Lundberg et. al. By virtue of the foregoing, a computationally tractable solution for computing Shapley values on hardware systems can be provided.

Ensemble Model Decomposition

In some embodiments, the model evaluation system 120 includes machine-executable instructions that when executed control the model evaluation system to determine a decomposition for an ensemble model by performing an integrated gradients process for differentiable sub-models, as described herein, performing a tree model decomposition process for tree sub-model, as described herein, and combining the sub-model decompositions by using the corresponding sub-model coefficients of the ensemble model. In some embodiments, model evaluation system 120 uses the API of the modeling system to access sub-model coefficients of an ensemble model of the modeling system 100 responsive to a request provided by the model evaluation system 120.

Methods

In some embodiments, an evaluation method includes: an evaluation system (e.g., 120 of FIG. 1A) that is communicatively coupled to a decisioning system (e.g., 110 of FIG. 1A) via a network interface device: providing an information request to the decisioning system via the network interface device; receiving decisioning system information identifying predictors used by the decisioning system from the decisioning system as a response to the information request; accessing input rows (data sets) for use by the decisioning system and protected class membership information for each input row via the network interface device; building a protected class module (model) that satisfies an accuracy threshold by using the received decisioning system information, the accessed input rows, and the accessed protected class membership information, the protected class module being constructed to predict membership in a protected class by using at least one predictor identified by the decisioning system information, wherein each predictor is a set of one or more variables of the accessed input rows; for each predictor to used predict membership in a protected class, determining a protected class ranking value (impact raking value) and a decisioning system ranking value (impact ranking value) by providing at least one score request to the decisioning system to generate a score for at least one input row and receiving a score from the decisioning system as a response to each score request, and in response to determining a protected class ranking value and a decisioning system ranking value, providing a modification request to the decisioning system to modify operation of the decisioning system based on at least one of the determined ranking values.

In some embodiments, the protected class module is a protected class model.

In some embodiments, the evaluation method includes: for each predictor of the protected class module, the evaluation system providing information identifying each variable of the predictor, the determined protected class ranking value, and the determined decisioning system ranking value to an operator device via a network, wherein responsive to a determination that the evaluation system cannot build a protected class module that satisfies the accuracy threshold, the evaluation system providing the operator device with information indicating that the decisioning system satisfies disparate impact requirements.

In some embodiments, the evaluation method includes: the evaluation system selecting at least one predictor of the protected class module based on at least one of the determined protected class ranking value and the decisioning system ranking value, and wherein the modification request is a request to modify the decisioning system to reduce impact by each selected predictor on scores generated by the decisioning system.

In some embodiments, the modification request is a request to remove variables of each selected predictor from a model used by the decisioning system to generate scores.

In some embodiments, the modification request is a human-readable report recommending modifications to be made to the model to reduce disparate impact. In some embodiments, the modification request includes a human-readable report recommending modifications to be made to the model to reduce disparate impact.

In some embodiments, the protected class membership information is generated for the input rows by using a second set of predictors of the input rows.

In some embodiments, the evaluation system selecting at least one predictor of the protected class module includes: selecting each predictor having a decisioning system ranking value that is below a score ranking threshold value.

In some embodiments, the evaluation system selecting at least one predictor of the protected class module includes: selecting each predictor having a decisioning system ranking value that is below a score ranking threshold value, and a protected class ranking value that is above a protected class ranking threshold.

In some embodiments, the evaluation system selecting at least one predictor of the protected class module includes: selecting each predictor having a protected class ranking value that is above a protected class ranking threshold.

In some embodiments, determining a protected class ranking value includes: for each predictor of the protected module, determining a population protected class module impact value for a first population of input rows; generating a first sorted list that includes identifiers for each predictor ordered according to the generated population protected class module impact values; and for each predictor, determining the protected class ranking value based on an order of the predictor identifier in the first ordered list.

In some embodiments, determining a decisioning system ranking value includes: for each predictor of the protected class module, determining a population decisioning system impact value for the first population of input rows; generating a second sorted list that includes identifiers for each predictor ordered according to the generated population decisioning system impact values; and for each predictor, determining the decisioning system ranking value based on an order of the predictor identifier in the second ordered list.

In some embodiments, determining a population decisioning system impact value for each predictor of the protected class module for the first population of input rows includes: for each input row of the first population, generating an input-row-decisioning-system-impact value for each predictor of the protected class module; and for each predictor of the protected class module, determining the population decisioning system impact value for the first population of input rows by using the input-row-decisioning-system-impact values generated for the predictor for the first population, wherein each input-row-decisioning-system-impact value indicates relative influence of the corresponding predictor on a score generated by the decisioning system for the corresponding input row.

In some embodiments, generating an input-row-decisioning-system-impact value for a predictor of the protected class module includes: generating at least one modified input row by modifying data of the input row that corresponds to the predictor, controlling the decisioning system to generate a score for each modified input row by using an API of the decisioning system, and comparing a score of the input row to at least one score for the modified input rows, and generating the input-row-decisioning-system-impact value based on a result of the comparison.

In some embodiments, generating an input row modeling system impact value for a predictor of the protected class module includes: determining at least one decisioning system score decomposition by using gradient values provided by the decisioning system via an API of the decisioning system.

In some embodiments, generating an input row decisioning system impact value for a predictor of the protected class module includes: determining at least one decisioning system score decomposition by accessing information about nodes in a tree model of the decisioning system via an API of the decisioning system.

In some embodiments, generating an input row decisioning system impact value for a predictor of the protected class module includes: determining at least one decisioning system score decomposition by generating Shapley values by accessing information from the decisioning system via an API of the decisioning system.

In some embodiments, the evaluation method is a method for reducing disparate impact in the decisioning system by using the evaluation system, which is external to the decisioning system.

In some embodiments, the evaluation system accesses the input rows from the decisioning system via an API of the decisioning system.

In some embodiments, the evaluation system generates the protected class membership information from the input rows by using a BISG process.

3. SYSTEM ARCHITECTURE

Figure 6:
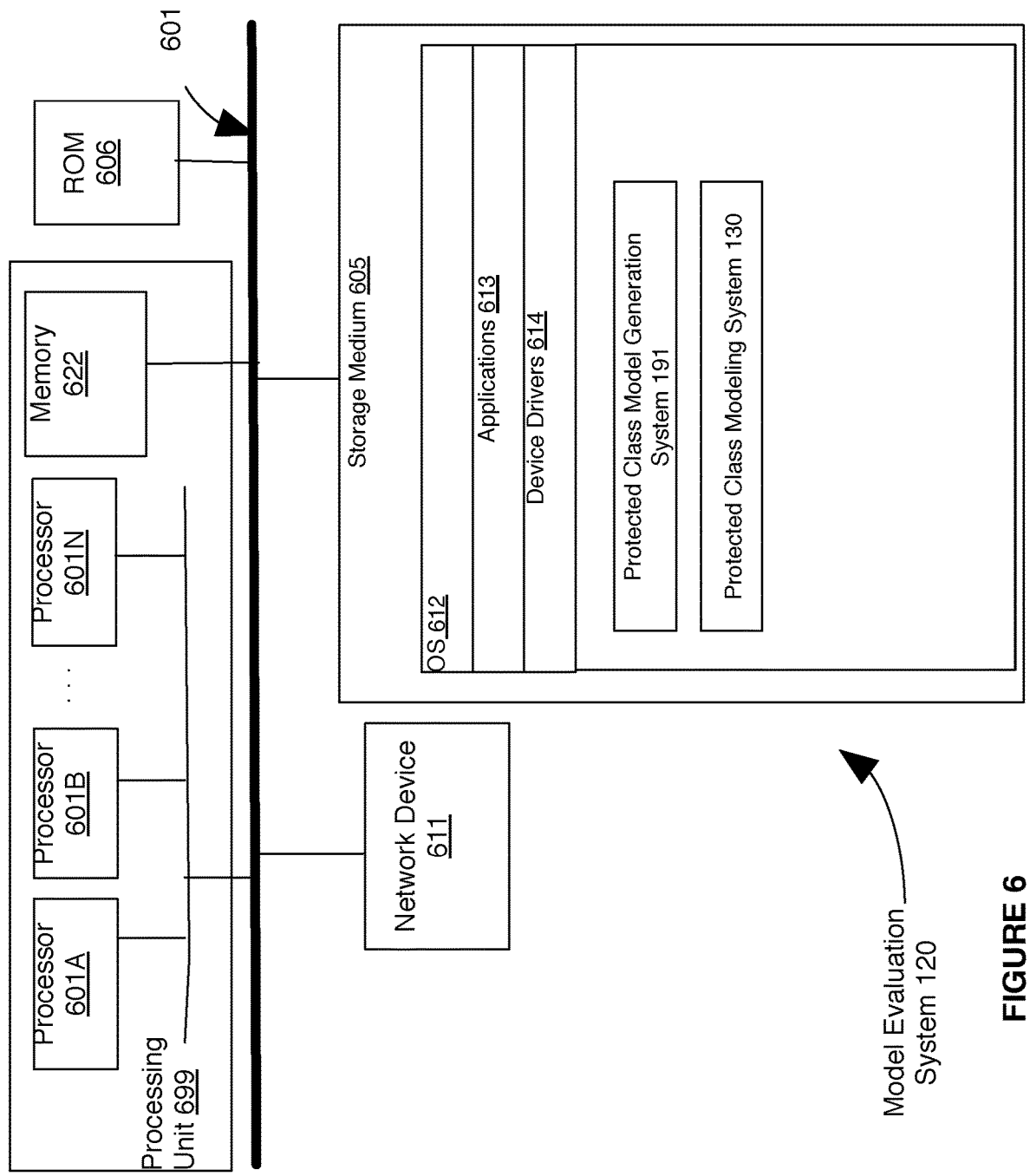
FIG. 6 is a diagram depicting system architecture of a model evaluation system, according to embodiments.

FIG. 6 is a diagram depicting system architecture of an explanation system, according to embodiments.

In some embodiments, the system of FIG. 6 is implemented as a single hardware server device. In some embodiments, the system of FIG. 6 is implemented as a plurality of hardware devices.

In some embodiments, the bus 601 interfaces with the processors 601A-N, the main memory 622 (e.g., a random access memory (RAM)), a read only memory (ROM) 606, a processor-readable storage medium 605, and a network device 611. In some embodiments, bus 601 interfaces with at least one of a display device and a user input device.

In some embodiments, the processors include one or more of an ARM processor, an X86 processor, a GPU (Graphics Processing Unit), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel Xeon processor. In other embodiments, the processing unit includes a Graphical Processing Unit such as NVIDIA Tesla.

The network adapter device 611 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs.

The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 605 includes machine-executable instructions (and related data) for an operating system 612, software programs 613, device drivers 614, the protected class model generation system 191, the protected class modeling system 130, and machine-executable instructions for one or more of the processes of FIGS. 7A, 7B, 8, 10A-B, 11A-C, 12A-B, 13A-C, and 14-18.

4. MACHINES

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

5. CONCLUSION

As a person skilled in the art will recognize from the previous detailed description and from the figures and claims, modifications and changes can be made to the embodiments disclosed herein without departing from the scope defined in the claims.

What is claimed is:

1. A method of machine learning model dimensionality reduction evaluation, the method comprising:
  receiving, by a model evaluation system, decisioning system information from a decisioning system communicably coupled to the model evaluation system via one or more communication networks and configured to apply a machine learning financial credit model, wherein the decisioning system information identifies predictors used by the machine learning financial credit model;
  accessing, by the model evaluation system, input rows used by the machine learning financial credit model, including attributes, and protected class membership information corresponding to each of the input rows;
  repeatedly testing and evaluating, by the model evaluation system, protected class machine learning models trained using the decisioning system information, the input rows, and the protected class membership information to automatically determine a set of the predictors that result in a protected class machine learning model that satisfies an accuracy threshold, wherein the protected class machine learning models are trained to predict membership in a protected class by using at least one of the predictors, each of the predictors is a set of one or more variables of the input rows, and the protected class includes at least one of a person's race, color, religion, national origin, sex, age, or disability status;
  for each predictor of a plurality of subsets of the predictors, determining, by the model evaluation system, a protected class ranking value and a decisioning system ranking value, wherein the decisioning system ranking value is determined by providing one or more score requests to the decisioning system to cause the decisioning system to generate and return a decisioning output for at least one of the input rows by executing the machine learning financial credit model;
  automatically identifying, by the model evaluation system, one or more of the subsets of predictors having decisioning system ranking values below a score impact threshold and protected class ranking values above a prediction impact threshold;
  providing, by the model evaluation system, a modification request via the one or more computer networks to the decisioning system to cause the decisioning system to modify the machine learning financial credit model to remove the one or more of the subsets of predictors to thereby reduce a disproportionately adverse impact on protected class members of the one of the predictors on one or more subsequent decisioning outputs generated by one or more subsequent executions of the modified machine learning financial credit model; and
  instructing, by the model evaluation system, the decisioning system to start operation in a production environment, wherein the modified machine learning financial credit model comprises a credit underwriting model for facilitating credit decisions and the operation of the decisioning system generates decisioning outputs responsive to evaluation requests and indicative of credit worthiness of persons associated with the evaluation requests.

2. The method of claim 1, further comprising:
  determining, by the model evaluation system, that another protected class machine learning model that satisfies the accuracy threshold cannot be built; and
  providing, by the model evaluation system, the operator device with information indicating that the machine learning financial credit model satisfies credit decision fairness requirements.

3. The method of claim 1, wherein the protected class membership information is generated for the input rows by using another set of the predictors of the input rows.

4. The method of claim 1, further comprising:
  for each of the predictors of the protected class machine learning model, determining, by the model evaluation system, a population protected class model impact value for a first population of the input rows;

generating, by the model evaluation system, a first sorted list that includes identifiers for each of the predictors ordered according to the population protected class model impact values; and for each of the predictors, determining, by the model evaluation system, the protected class ranking value based on an order of the predictor identifier in the first sorted list.

5. The method of claim 4, further comprising:

for each of the predictors, determining, by the model evaluation system, a population decisioning system impact value for the first population of the input rows;

generating, by the model evaluation system, a second sorted list that includes identifiers for each of the predictors ordered according to the population decisioning system impact values; and for each of the predictors, determining, by the model evaluation system, the decisioning system ranking value based on an order of the predictor identifier in the second sorted list.

6. The method of claim 4, further comprising:

for each of the input rows of the first population, generating, by the model evaluation system, an input-row-decisioning-system-impact value for each of the predictors; and for each of the predictors, determining, by the model evaluation system, the population decisioning system impact value for the first population of the input rows by using the input-row-decisioning-system-impact values, wherein each input-row-decisioning-system-impact value indicates relative influence of a corresponding one of the predictors on another score decisioning output generated by the decisioning system for a corresponding one of the input rows.

7. The method of claim 5, further comprising generating, by the model evaluation system, at least one modified input row by modifying data of one of the input rows, controlling the decisioning system to generate another decisioning output for the at least one modified input row by using an application programming interface (API) of the decisioning system, and comparing another decisioning output for the one of the input rows to the other decisioning output for the at least one modified input row, and generating the input-row-decisioning-system-impact value based on a result of the comparison.

8. The method of claim 5, further comprising determining, by the model evaluation system, at least one decisioning system decisioning output decomposition by using gradient values provided by the decisioning system via an application programming interface (API) of the decisioning system.

9. The method of claim 5, further comprising determining, by the model evaluation system, at least one decisioning system decisioning output decomposition by accessing information about tree nodes in the machine learning financial credit model via an application programming interface (API) of the decisioning system.

10. The method of claim 5, further comprising determining, by the model evaluation system, at least one decisioning system decisioning output decomposition by generating Shapley values by accessing information from the decisioning system via an application programming interface (API) of the decisioning system.

11. The method of claim 1, further comprising accessing, by the model evaluation system, the input rows from the decisioning system via an application programming interface (API) provided by the decisioning system.

12. The method of claim 1, further comprising generating, by the model evaluation system, the protected class membership information from the input rows by using a define Bayesian improved surname geocoding (BISG) process.

13. The method of claim 1, wherein the modification request comprises an indication of one or more variables corresponding to each of the set of the predictors and the modification request causes the decisioning system to automatically modify the machine learning financial credit model to remove the one or more of the variables from the machine learning model to thereby reduce a likelihood the machine learning financial credit model has a discriminatory output.

14. The method of claim 1, further comprising generating and outputting, by the model evaluation system, at least one visualization comprising a graphical representation of a relative influence of each of the predictors based on one or more of the protected class ranking value and the decisioning system ranking value for each of the predictors, wherein the at least one visualization comprises a heat map, self-organizing map (SOM), self-organizing feature map, kahonen map, tree, histogram, or chart.

15. A model evaluation system, comprising memory comprising instructions stored thereon and one or more processors coupled to the memory and configured to execute the stored instructions to:

receive decisioning system information from a decisioning system communicably coupled to the model evaluation system via one or more communication networks and configured to apply a machine learning financial credit model, wherein the decisioning system information identifies predictors used by the machine learning financial credit model;

access input rows used by the machine learning financial credit model, including attributes, and protected class membership information corresponding to each of the input rows;

repeatedly test and evaluate protected class machine learning models trained using the decisioning system information, the input rows, and the protected class membership information to automatically determine a set of the predictors that result in a protected class machine learning model that satisfies an accuracy threshold, wherein the protected class machine learning models are trained to predict membership in a protected class by using at least one of the predictors, each of the predictors is a set of one or more variables of the input rows, and the protected class includes at least one of a person's race, color, religion, national origin, sex, age, or disability status;

for each predictor of a plurality of subsets of the predictors, determine a protected class ranking value and a decisioning system ranking value, wherein the decisioning system ranking value is determined by providing one or more score requests to the decisioning system to cause the decisioning system to generate and return a decisioning output for at least one of the input rows by executing the machine learning financial credit model;

automatically identify one or more of the subsets of predictors having decisioning system ranking values below a score impact threshold and protected class ranking values above a prediction impact threshold;

provide a modification request via the one or more computer networks to the decisioning system to cause the decisioning system to modify the machine learning financial credit model to remove the one or more of the subsets of predictors to thereby reduce a disproportionately adverse impact on protected class members of the one of the predictors on one or more subsequent decisioning outputs generated by one or more subsequent executions of the modified machine learning financial credit model; and instruct the decisioning system to start operation in a production environment, wherein the modified machine learning financial credit model comprises a credit underwriting model for facilitating credit decisions and the operation of the decisioning system generates decisioning outputs responsive to evaluation requests and indicative of credit worthiness of persons associated with the score requests.

16. A non-transitory computer readable medium having stored thereon instructions for machine learning model dimensionality reduction evaluation comprising executable code that, when executed by one or more processors, causes the one or more processors to:

receive decisioning system information via one or more communication networks from a decisioning system configured to apply a machine learning financial credit model, wherein the decisioning system information identifies predictors used by the machine learning financial credit model;

access input rows used by the machine learning financial credit model, including attributes, and protected class membership information corresponding to each of the input rows;

repeatedly test and evaluate protected class machine learning models trained using the decisioning system information, the input rows, and the protected class membership information to automatically determine a set of the predictors that result in a protected class machine learning model that satisfies an accuracy threshold, wherein the protected class machine learning models are trained to predict membership in a protected class by using at least one of the predictors, each of the predictors is a set of one or more variables of the input rows, and the protected class includes at least one of a person's race, color, religion, national origin, sex, age, or disability status;

for each predictor of a plurality of subsets of the predictors, determine a protected class ranking value and a decisioning system ranking value, wherein the decisioning system ranking value is determined by providing one or more score requests to the decisioning system to cause the decisioning system to generate and return a decisioning output for at least one of the input rows by executing the machine learning financial credit model;

automatically identify one or more of the subsets of predictors having decisioning system ranking values below a score impact threshold and protected class ranking values above a prediction impact threshold;

provide a modification request via the one or more computer networks to the decisioning system to cause the decisioning system to modify the machine learning financial credit model to remove the one or more of the subsets of predictors to thereby reduce a disproportionately adverse impact on protected class members of the one of the predictors on one or more subsequent decisioning outputs generated by one or more subsequent executions of the modified machine learning financial credit model; and instruct the decisioning system to start operation in a production environment, wherein the modified machine learning financial credit model comprises a credit underwriting model for facilitating credit decisions and the operation of the decisioning system generates decisioning outputs responsive to score requests and indicative of credit worthiness of persons associated with the evaluation requests.

\* \* \* \* \*